(12) United States Patent
Manabe et al.

(10) Patent No.: US 11,795,398 B2
(45) Date of Patent: Oct. 24, 2023

(54) LIQUID-CRYSTALLINE MEDIUM AND LIQUID-CRYSTAL DISPLAY COMPRISING THE SAME AND COMPOUNDS

(71) Applicant: MERCK PATENT GMBH, Darmstadt (DE)

(72) Inventors: Atsutaka Manabe, Bensheim (DE); Constanze Brocke, Gross-gerau (DE); Brigitte Schuler, Grossostheim (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 17/624,721

(22) PCT Filed: Jul. 2, 2020

(86) PCT No.: PCT/EP2020/068616
§ 371 (c)(1),
(2) Date: Jan. 4, 2022

(87) PCT Pub. No.: WO2021/004868
PCT Pub. Date: Jan. 14, 2021

(65) Prior Publication Data
US 2022/0267676 A1  Aug. 25, 2022

(30) Foreign Application Priority Data
Jul. 5, 2019 (EP) .................................... 19184590

(51) Int. Cl.
*G02F 1/1333* (2006.01)
*C09K 19/34* (2006.01)
*C09K 19/54* (2006.01)
*C09K 19/58* (2006.01)
*C09K 19/04* (2006.01)
*G02F 1/1362* (2006.01)

(52) U.S. Cl.
CPC ...... *C09K 19/3402* (2013.01); *C09K 19/3491* (2013.01); *C09K 19/54* (2013.01); *C09K 19/586* (2013.01); *C09K 2019/0466* (2013.01); *C09K 2019/3422* (2013.01); *C09K 2019/3425* (2013.01); *G02F 1/1362* (2013.01)

(58) Field of Classification Search
CPC ............ C09K 19/3402; C09K 19/3491; C09K 19/54; C09K 19/586; C09K 19/062; C09K 19/44; C09K 19/0403; C09K 19/3048; C09K 19/3098; C09K 2019/0466; C09K 2019/3422; C09K 2019/3425; C09K 2019/122; C09K 2019/123; C09K 2019/124; C09K 2019/3408; C09K 2019/3004; C09K 2019/301; G02F 1/1362; G02F 1/1333
See application file for complete search history.

(56) References Cited

U.S. PATENT DOCUMENTS

| | | | |
|---|---|---|---|
| 6,329,027 B1 | 12/2001 | Kondo et al. | |
| 10,975,306 B2 * | 4/2021 | Liang | C09K 19/542 |
| 11,326,102 B2 * | 5/2022 | Manabe | C09K 19/32 |
| 2013/0207038 A1 | 8/2013 | Haensel et al. | |
| 2016/0046865 A1 | 2/2016 | Xie | |
| 2016/0090532 A1 | 3/2016 | Saito et al. | |
| 2016/0126817 A1 | 5/2016 | Hu | |
| 2020/0385636 A1 | 12/2020 | Manabe et al. | |
| 2022/0267676 A1 * | 8/2022 | Manabe | C09K 19/3402 |

FOREIGN PATENT DOCUMENTS

| | | |
|---|---|---|
| CN | 104232105 A | 12/2014 |
| CN | 109796990 A | 5/2019 |
| DE | 4333862 A1 | 4/1995 |
| EP | 0959060 A1 | 11/1999 |
| JP | 2004115475 A | 4/2004 |
| WO | 2014192390 A1 | 12/2014 |
| WO | 2015007131 A1 | 1/2015 |
| WO | 2019048444 A1 | 3/2019 |

OTHER PUBLICATIONS

International Search Report for PCT/EP2020/068616 dated Oct. 1, 2020 (pp. 1-4).

* cited by examiner

*Primary Examiner* — Geraldina Visconti
(74) *Attorney, Agent, or Firm* — MILLEN WHITE ZELANO & BRANIGAN, PC; Brion Heaney

(57) ABSTRACT

The invention relates to a liquid-crystalline medium having a nematic phase comprising one or more compounds of formula X

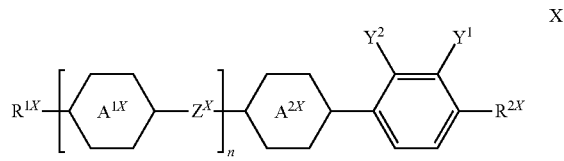

wherein the parameters have the meaning given in the text, to the use thereof in an electro-optical display, particularly in an active-matrix display based on the IPS or FFS effect, to displays of this type which contain a liquid-crystalline medium of this type and to the use of the compounds of formula X for improvement of the transmission and/or response times of a liquid-crystalline medium which comprises one or more additional mesogenic compounds, as well as to the compounds of formula X.

20 Claims, No Drawings

LIQUID-CRYSTALLINE MEDIUM AND LIQUID-CRYSTAL DISPLAY COMPRISING THE SAME AND COMPOUNDS

The present invention relates to novel liquid crystalline media, in particular for use in liquid-crystal displays, and to these liquid-crystal displays, particularly to liquid-crystal displays which use the IPS (in-plane switching) or, preferably, the FFS (fringe field switching) effect using dielectrically positive liquid crystals. The last one is also called SG-FFS (super grip FFS) effect occasionally and also XB-FFS (extra brightness FFS). For this effect dielectrically positive liquid crystals are used, which comprise one or more compounds having at the same time a high dielectric constant parallel to the molecular director and perpendicular to the molecular director, leading to a large average dielectric constant and a high dielectric ratio. The liquid crystalline media optionally additionally comprise dielectrically negative, dielectrically neutral compounds or both. The liquid crystalline media are used in a homogeneous (i.e. planar) initial alignment. The liquid-crystal media according to the invention have a positive dielectric anisotropy and comprise compounds having at the same time large dielectric constants parallel and perpendicular to the molecular director.

The media are distinguished by a particularly high transmission and reduced response time in respective displays, which is brought about by their unique combination of physical properties, especially by their dielectric properties and in particular by their high ratio of ($\varepsilon_\perp/\varepsilon_{av}$) respectively of the high values of their dielectric ratio ($\varepsilon_\perp/\Delta\varepsilon$). This also leads to their excellent performance in the displays according to the invention.

IPS and FFS displays using dielectrically positive liquid crystals are well known in the field and have been widely adopted for various types of displays like e.g. desk top monitors and TV sets, but also for mobile applications.

However, recently, IPS and in particular FFS displays using dielectrically negative liquid crystals are widely adopted. The latter ones are sometimes also called or UB-FFS (ultra bright FFS). Such displays are disclosed e.g. in US 2013/0207038 A1. These displays are characterized by a markedly increased transmission compared to the previously used IPS- and FFS displays, which have been dielectrically positive liquid crystals. These displays using conventional, dielectrically negative liquid crystals, however, have the severe disadvantage of requiring a higher operation voltage than the respective displays using dielectrically positive liquid crystals. Liquid crystalline media used for UB-FFS have a dielectric anisotropy of −0.5 or less and preferably of −1.5 or less.

Liquid crystalline media used for HB-FFS (high brightness FFS) have a dielectric anisotropy of 0.5 or more and preferably of 1.5 or more. Liquid crystalline media used for HB-FFS comprising both dielectrically negative and dielectrically positive liquid crystalline compounds, respectively mesogenic compounds are disclosed e.g. in US 2013/0207038 A1. These media feature rather large values of $\varepsilon_\perp$ and of $\varepsilon_{av}$. already, however, their ratio of ($\varepsilon_\perp/\Delta\varepsilon$) is relatively small.

According to the present application, however, the IPS or the FFS effect with dielectrically positive liquid crystalline media in a homogeneous alignment are preferred.

Industrial application of this effect in electro-optical display elements requires LC phases which have to meet a multiplicity of requirements. Particularly important here are chemical resistance to moisture, air and physical influences, such as heat, radiation in the infrared, visible and ultraviolet regions, and direct (DC) and alternating (AC) electric fields.

Furthermore, LC phases which can be used industrially are required to have a liquid-crystalline mesophase in a suitable temperature range and low viscosity.

None of the series of compounds having a liquid-crystalline mesophase that have been disclosed hitherto includes a single compound which meets all these requirements. Mixtures of two to 25, preferably three to 18, compounds are therefore generally prepared in order to obtain substances which can be used as LC phases.

Matrix liquid-crystal displays (MLC displays) are known. Non-linear elements which can be used for individual switching of the individual pixels are, for example, active elements (i.e. transistors). The term "active matrix" is then used, where in general use is made of thin-film transistors (TFTs), which are generally arranged on a glass plate as substrate.

A distinction is made between two technologies: TFTs comprising compound semiconductors, such as, for example, CdSe, or metal oxides like ZnO or TFTs based on polycrystalline and, inter alia, amorphous silicon. The latter technology currently has the greatest commercial importance worldwide.

The TFT matrix is applied to the inside of one glass plate of the display, while the other glass plate carries the transparent counter electrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is located opposite each switchable pixel.

The TFT displays most used hitherto usually operate with crossed polarisers in transmission and are backlit. For TV applications, ECB (or VAN) cells or FFS cells are used, whereas monitors usually use IPS cells or TN (twisted nematic) cells, and notebooks, laptops and mobile applications usually use TN, VA or FFS cells.

The term MLC displays here encompasses any matrix display having integrated non-linear elements, i.e., besides the active matrix, also displays with passive elements, such as varistors or diodes (MIM=metal-insulator-metal).

MLC displays of this type are particularly suitable for TV applications, monitors and notebooks or for displays with a high information density, for example in automobile manufacture or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

Displays which use the ECB effect have become established as so-called VAN (vertically aligned nematic) displays, besides IPS displays (for example: Yeo, S. D., Paper 15.3: "An LC Display for the TV Application", SID 2004 International Symposium, Digest of Technical Papers, XXXV, Book II, pp. 758 and 759) and the long-known TN displays, as one of the three more recent types of liquid-crystal display that are currently the most important, in particular for television applications.

The most important designs may be mentioned here: MVA (multi-domain vertical alignment, for example: Yoshide, H. et al., Paper 3.1: "MVA LCD for Notebook or Mobile PCs . . . ", SID 2004 International Symposium, Digest of Technical Papers, XXXV, Book I, pp. 6 to 9, and Liu, C. T. et al., Paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, Paper 15.4: "Super PVA Sets New State-of-the-Art for LCD-TV", SID 2004 International Symposium, Digest of Technical Papers, XXXV, Book II, pp. 760 to 763) and ASV (advanced super view, for example: Shigeta, Mitzuhiro and Fukuoka, Hirofumi, Paper 15.2: "Development of High Quality LCDTV", SID 2004 International Symposium, Digest of Technical Papers, XXXV, Book II, pp. 754 to 757). More modern versions of the VA effect, are the so called PAVA (photo-alignment VA) and PSVA (polymer-stabilized VA).

In general form, the technologies are compared, for example, in Souk, Jun, SID Seminar 2004, Seminar M-6: "Recent Advances in LCD Technology", Seminar Lecture Notes, M-6/1 to M-6/26, and Miller, Ian, SID Seminar 2004, Seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., Paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular in the switching of grey shades, is still a problem which has not yet been solved to a satisfactory extent.

ECB displays, like ASV displays, use liquid-crystalline media having negative dielectric anisotropy (As), whereas TN and to date all conventional IPS displays use liquid-crystalline media having positive dielectric anisotropy. However, presently there is an increasing demand for IPS and FFS displays utilizing dielectrically negative liquid crystalline media.

In liquid-crystal displays of this type, the liquid crystals are used as dielectrics, whose optical properties change reversibly on application of an electrical voltage.

Since in displays in general, i.e. also in displays in accordance with these mentioned effects, the operating voltage should be as low as possible, use is made of liquid-crystal media which are generally predominantly composed of liquid-crystal compounds, all of which have the same sign of the dielectric anisotropy and have the highest possible value of the dielectric anisotropy. In general, at most relatively small proportions of neutral compounds and if possible no compounds having a sign of the dielectric anisotropy which is opposite to that of the medium are employed. In the case of liquid-crystal media having negative dielectric anisotropy e.g. for ECB or UB-FFS displays, predominantly compounds having negative dielectric anisotropy are thus employed. The respective liquid-crystalline media employed generally consist predominantly and usually even essentially of liquid-crystal compounds having negative dielectric anisotropy.

In the media used in accordance with the present application, significant amounts of dielectrically positive liquid-crystal compounds and generally only very small amounts of dielectrically compounds or even none at all are typically employed, since in general the liquid-crystal displays are intended to have the lowest possible addressing voltages. At the same time small amounts of dielectrically neutral compounds may be beneficially used in some cases.

US 2013/0207038 A1 discloses liquid crystalline media for HB-FFS displays proposing to improve the performance of the FFS displays using liquid crystals having a positive dielectric anisotropy by the additional incorporation of dielectrically negative liquid crystals. This, however, leads to the necessity of a compensation of the negative contribution of these compounds to the overall dielectric anisotropy of the resultant media. To this end, either the concentration of the dielectrically positive materials has to be increased, which, in turn, leaves less room for the use of dielectrically neutral compounds as diluters in the mixtures, or, alternatively, compounds with a stronger positive dielectric anisotropy have to be used. Both of these alternatives have the strong drawback of increasing the response time of the liquid crystals in the displays.

Liquid crystalline media having a positive dielectric anisotropy for IPS and FFS displays have already been disclosed. In the following some examples will be given.

CN 104232105 A, WO 2014/192390 and WO 2015/007131 disclose liquid crystalline media with a positive dielectric anisotropy, some of which have a rather high dielectric constant perpendicular to the director.

Obviously, the phase range of the liquid-crystal mixture must be sufficiently broad for the intended application of the display.

The response times of the liquid-crystal media in the displays also have to be improved, i.e. reduced. This is particularly important for displays for television or multimedia applications. In order to improve the response times, it has repeatedly been proposed in the past to optimise the rotational viscosity of the liquid-crystal media ($\gamma_1$), i.e. to achieve media having the lowest possible rotational viscosity. However, the results achieved here are inadequate for many applications and therefore make it appear desirable to find further optimisation approaches.

Adequate stability of the media to extreme loads, in particular to UV exposure and heating, is very particularly important. In particular in the case of applications in displays in mobile equipment, such as, for example, mobile telephones, this may be crucial.

Besides their relatively poor transmission and their relatively long response times, the MLC displays disclosed hitherto, they have further disadvantages. These are e.g. their comparatively low contrast, their relatively high viewing-angle dependence and the difficulty in the reproduction of grey scales in these displays, especially when observed from an oblique viewing angle, as well as their inadequate VHR and their inadequate lifetime. The desired improvements of the transmission of the displays and of their response times are required in order to improve their energy efficiency, respectively their capacity to render rapidly moving pictures.

There thus continues to be a great demand for MLC displays having very high specific resistance at the same time as a large working-temperature range, short response times and a relatively low threshold voltage, with the aid of which various grey shades can be produced and which have, in particular, a good and stable VHR.

The invention has the object of providing MLC displays, not only for monitor and TV applications, but also for mobile applications such as e.g. telephones and navigation systems, which are based on the ECB, IPS or FFS effect, do not have the disadvantages indicated above, or only do so to a lesser extent, and at the same time have very high specific resistance values. In particular, it must be ensured for mobile telephones and navigation systems that they also work at extremely high and extremely low temperatures.

Surprisingly, it has been found that it is possible to achieve liquid-crystal displays which have, in particular in IPS and FFS displays, a low threshold voltage with short response times, a sufficiently broad nematic phase, favourable birefringence (Δn) and, at the same time, a high transmission, good stability to decomposition by heating and by UV exposure, and a stable, high VHR if use is made in these display elements of nematic liquid-crystal mixtures which comprise at least one compound, preferably two or more compounds of formula X, preferably selected from the group of the compounds of the sub-formulae X-1 and X-2, particularly preferably the sub-formula X-1-1 and/or X-2-2 and/or X-2-3 and/or X-2-4 and/or X-2-5, more preferably both of formula X-1 and of formula X-2, and preferably additionally one or more compounds selected from the group of the compounds of formulae I, B and S, preferably selected from the group of the compounds of the sub-formulae I-1, I-2, I-3 and I-4, and B-1, and B-2 and S-1 and S-2, respectively, particularly preferably from the sub-formula I-1 and/or I-2 and/or I-3 and/or I-4 and/or B-1 and/or B-2 and/or S-1 and/or S-2, most preferably of formula I-2, I-4, B-1, B-2 and S-2 and most preferably both of formula I-1 and of formula I-2 and of formula B-1 and/or of of formula B-2, and preferably additionally at least one compound, preferably two or more compounds, selected from the group of the compounds of the formulae II and III, the former preferably of formula II-1 and/or II-2, and/or at least one compound, preferably two or more compounds selected from the group of formulae IV and/or V and, preferably, one or more compounds selected from the group of formulae VII to IX (all formulae as defined herein below).

Media of this type can be used, in particular, for electro-optical displays having active-matrix addressing for IPS- or FFS displays.

The invention thus relates to a liquid-crystalline medium on a mixture of polar compounds comprising one or more compounds having a dielectric ratio of the dielectric constant perpendicular to the director to the dielectric anisotropy ($\varepsilon_\perp/\Delta\varepsilon$) of 2.0 or less and a high dielectric constant perpendicular to the director ($\varepsilon_\perp$) preferably of 3.8 or more, preferably of 4.5 or more, and, most preferably of 6.0 or more.

The ratio of the dielectric constant perpendicular to the director to the dielectric anisotropy ($\varepsilon_\perp/\Delta\varepsilon$) of 1.0 or more corresponds to the ratio of the dielectric constant parallel ($\varepsilon_\parallel$) to the director to dielectric constant perpendicular ($\varepsilon_\perp$) to the director, i.e. to the ratio of ($\varepsilon_\parallel/\varepsilon_\perp$) of 2.0 or less.

The media according to the present invention preferably additionally comprise a one or more compounds selected from the group of compounds of formulae II and III, preferably one or more compounds of formula II, more preferably in addition one or more compounds of formula III and, most preferably, additionally one or more compounds selected from the group of the compounds of formulae IV and V and, again preferably, one or more compounds selected from the group of compounds of formulae VI to IX (all formulae as defined below).

The mixtures according to the invention exhibit very broad nematic phase ranges with clearing points 70° C., very favourable values for the capacitive threshold, relatively high values for the holding ratio and at the same time good low-temperature stabilities at −20° C. and −30° C., as well as very low rotational viscosities. The mixtures according to the invention are furthermore distinguished by a good ratio of clearing point and rotational viscosity and by a relatively high positive dielectric anisotropy.

Now, it has been found surprisingly that LCDs of the FFS type using liquid crystals with positive dielectric anisotropy may be realised using specially selected liquid crystalline media. These media are characterised by a particular combination of physical properties. Most decisive amongst these are their dielectric properties and here a high average dielectric constant ($\varepsilon_{av}$), a high dielectric constant perpendicular to the director of the liquid crystal molecules ($\varepsilon_\perp$) and, in particular, the relatively high ratio of these latter two values: ($\varepsilon_\perp/\Delta\varepsilon$).

Preferably the liquid-crystalline media according to the present invention, on the one hand, have a value of the dielectric anisotropy of 1.5 or more, preferably of 3.5 or more preferably of 4.5 or more. At the other hand, they preferably have a dielectric anisotropy of 26 or less.

Preferably the liquid-crystalline media according to the present invention, on the one hand, have a value of the dielectric constant perpendicular to the director of 2 or more, more preferably of 6 or more and, on the other hand preferably of 20 or less.

Preferably the liquid crystalline media according to the present invention preferably have a dielectric ratio ($\varepsilon_\perp/\Delta\varepsilon$) of 2.0 or less, more preferably of 1.5 or less and, most preferably, of 1.0 or less.

The liquid crystalline media according to the present invention in a preferred embodiment have a positive dielectric anisotropy, preferably in the range from 1.5 or more to 20.0 or less, more preferably in the range from 3.0 or more to 8.0 or less and, most preferably in the range from 4.0 or more to 7.0. or less.

The liquid crystalline media according to the present invention in a preferred embodiment, which may be the same as the preferred embodiment mentioned above, have a dielectric constant perpendicular to the director of the liquid crystal molecules ($\varepsilon_\perp$) of 5.0 or more, more preferably of 6.0 or more, more preferably of 7.0 or more, more preferably of 8.0 or more, more preferably of 9.0 or more and, most preferably, of 10.0 or more.

The liquid crystalline medium of the present invention has a dielectric anisotropy of 0.5 or more, preferably of 1.5 or more and a dielectric ratio ($\varepsilon_\perp/\Delta\varepsilon$) of 2.0 or less and comprises a) one or more compounds of formula X, preferably in a concentration in the range from 1% to 60%, more preferably in the range from 5% to 40%, particularly preferably in the range from 8% to 35%,

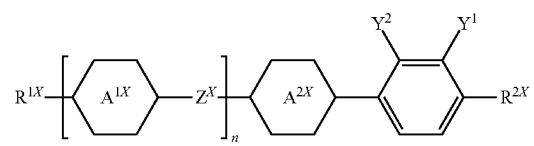

in which
R$^{1X}$ and R$^{2X}$ independently of each other denote H, an alkyl radical having 1 to 15 C atoms, wherein one or more CH$_2$ groups in these radicals may each be replaced, independently of one another, by —C≡C—, —CF$_2$O—, —OCF$_2$—, —CH=CH—,

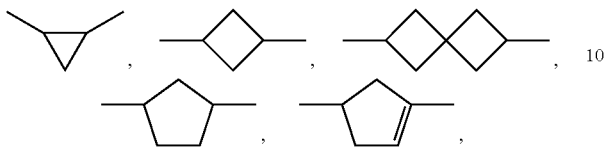

—O—, —CO—O— or —O—CO— in such a way that O atoms are not linked directly to one another, and in which one or more H atoms may be replaced by halogen, and R$^{1X}$ preferably denotes alkyl or alkoxy, preferably with 1 to 7 C atoms or alkenyl with 2 to 7 C atoms, more preferably alkyl or alkoxy with 2 to 5 C atoms or alkenyl with 2 to 5 C atoms, R$^{2X}$ alternatively and preferably denotes X$^X$,

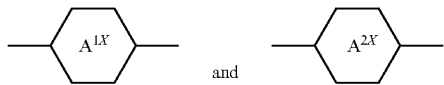

on each occurrence, identically or differently, denote a radical selected from the following groups:

a) the group consisting of trans-1,4-cyclohexylene, 1,4-cyclo-hexenylene, and decaline-2,6-diyl, in which one or more non-adjacent CH$_2$ groups may be replaced by —O— and/or —S— and in which one or more H atoms may be replaced by F, b) the group consisting of 1,4-phenylene and 2,6-naphthylene, in which one or two CH groups may be replaced by N and in which, in addition, one or more H atoms may be replaced by L, c) the group consisting of 1,3-dioxane-2,5-diyl, tetrahydrofuran-2,5-diyl, cyclobutane-1,3-diyl, thiophene-2,5-diyl, selenophene-2,5-diyl, and 1,2,3,4-tetrahydronanaphthaline-2,6-diyl, each of which may be mono- or polysubstituted by L, d) the group consisting of bicyclo[1.1.1]pentane-1,3-diyl, bicyclo[2.2.2]octane-1,4-diyl, and spiro[3.3]heptane-2,6-diyl, in which one or more H atoms may be replaced by F, L each, identically or differently, denote halogen, cyano, alkyl, alkoxy, alkylcarbonyl or alkoxycarbonyl group with 1 to 7 C atoms, wherein one or more H atoms may be substituted by F or Cl, Z$^X$ on each occurrence, identically or differently, denotes a single bond, —CF$_2$O—, —OCF$_2$—, —CH$_2$CH$_2$—, —CF$_2$CF$_2$—, —C(O)O—, —OC(O)—, —CH$_2$O—, —OCH$_2$—, —CF=CH—, —CH=CF—, —CF=CF—, —CH=CH— or —C≡C—, Y$^1$ denotes Cl, CF$_3$, CHF$_2$, OCF$_3$, CN or NCS, preferably Cl, CF$_3$ or OCF$_3$, more preferably CF$_3$ or OCF$_3$, Y$^2$ denotes H, F, Cl, CF$_3$, or CHF$_2$, preferably F, preferably one of Y$^1$ and Y$^2$, preferably Y$^1$, is CF$_3$ or OCF$_3$ and the other one denotes H, F, Cl, CF$_3$, OCF$_3$ or CHF$_2$, and X$^X$ denotes F, Cl, CN, NCS, SF$_5$, fluorinated alkyl, alkoxy, alkenyl or alkenyloxy each having up to 5 C atoms, preferably F, CF$_3$, OCF$_3$ or NCS, and n denotes 0, 1 or 2, preferably 0 or 1, most preferably 1, and one or more additional compounds, preferably selected from the groups of compounds according to the following conditions b) to f)

b) one or more dielectrically positive compounds selected from the group of compounds of formulae II and III, preferably of compounds having a dielectric anisotropy of greater than 3 each, preferably one or more compounds of formula II:

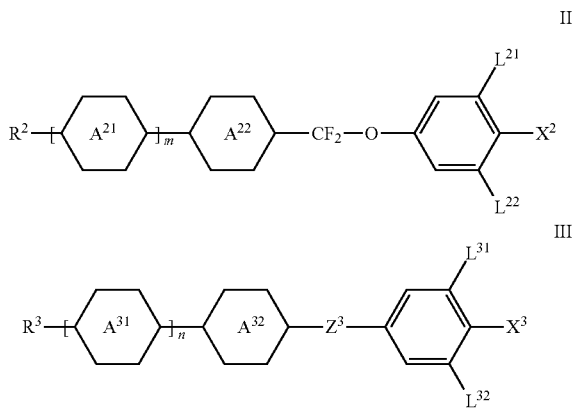

in which

R$^2$ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably alkyl or alkenyl,

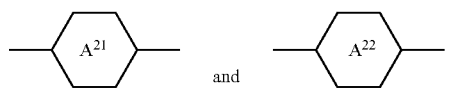

on each appearance, independently of one another, denote

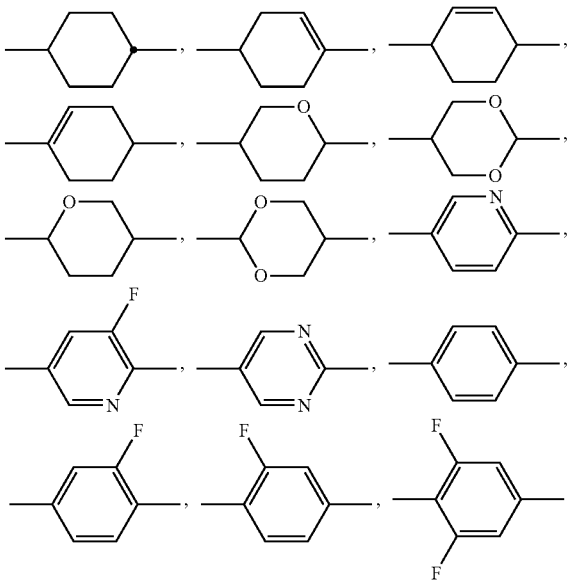

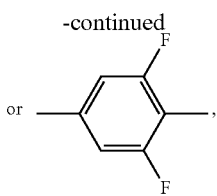

preferably

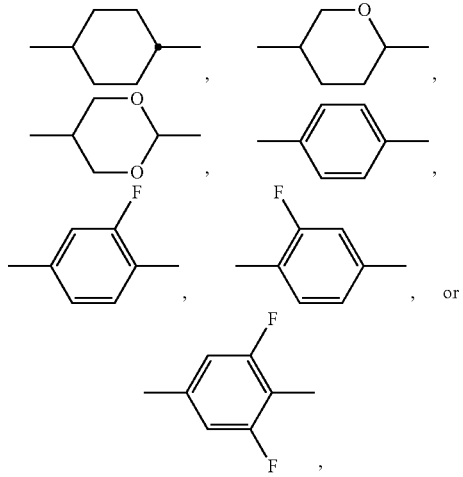

L²¹ and L²² denote H or F, preferably L²¹ denotes F,

X² denotes halogen, halogenated alkyl or alkoxy having 1 to 3 C atoms or halogenated alkenyl or alkenyloxy having 2 or 3 C atoms, preferably F, Cl, —OCF₃, —O—CH₂CF₃, —O—CH=CH₂, —O—CH=CF₂ or —CF₃, very preferably F, Cl, —O—CH=CF₂ or —OCF₃, m denotes 0, 1, 2 or 3, preferably 1 or 2 and particularly preferably 2, R³ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably alkyl or alkenyl,

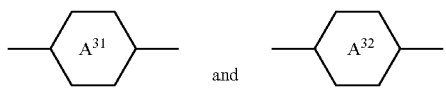

and on each appearance, independently of one another, are

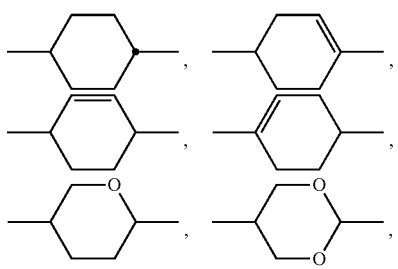

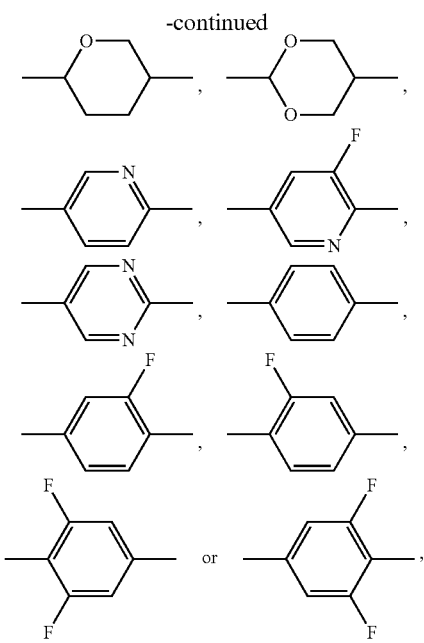

preferably

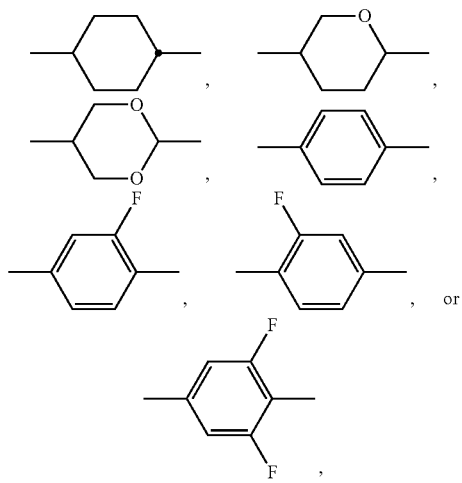

L³¹ and L³², independently of one another, denote H or F, preferably L³¹ denotes F, X³ denotes halogen, halogenated alkyl or alkoxy having 1 to 3 C atoms or halogenated alkenyl or alkenyloxy having 2 or 3 C atoms, F, Cl, —OCF₃, —OCHF₂, —O—CH₂CF₃, —O—CH=CF₂, —O—CH=CH₂ or —CF₃, very preferably F, Cl, —O—CH=CF₂, —OCHF₂ or —OCF₃, Z³ denotes —CH₂CH₂—, —CF₂CF₂—, —COO—, trans-CH=CH—, trans-CF=CF—, —CH₂O— or a single bond, preferably —CH₂CH₂—, —COO—, trans-CH=CH— or a single bond and very preferably —COO—, trans-CH=CH— or a single bond, and n denotes 0, 1, 2 or 3, preferably 1, 2 or 3 and particularly preferably 1, and c) optionally, preferably obligatory, one or more dielectrically neutral compounds selected from the group of formulae IV and V:

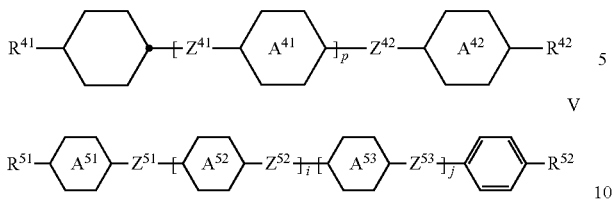

IV

V in which

R⁴¹ and R⁴², independently of one another, have the meaning indicated above for R² under formula II, preferably R⁴¹ denotes alkyl and R⁴² denotes alkyl or alkoxy or R⁴¹ denotes alkenyl and R⁴² denotes alkyl,

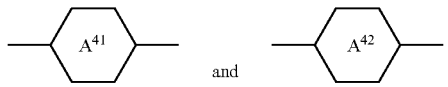

independently of one another and, if

occurs twice,
also these independently of one another, denote

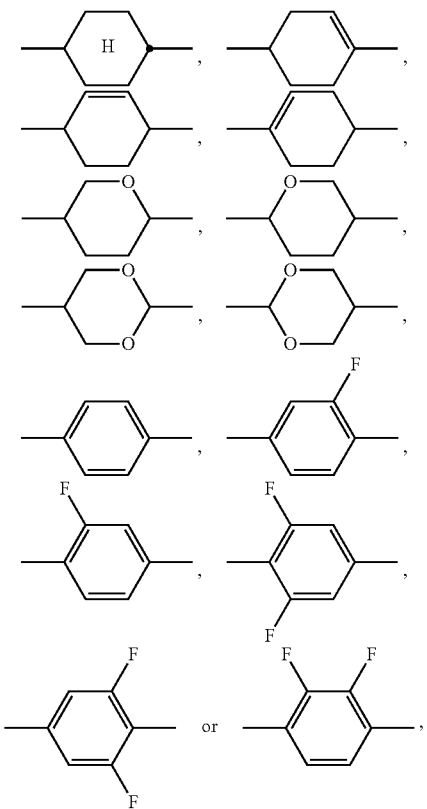

preferably one or more of

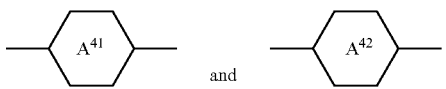

denotes or denote,

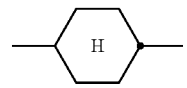

$Z^{41}$ and $Z^{42}$, independently of one another and, if $Z^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, preferably one or more thereof denotes/denote a single bond, and p denotes 0, 1 or 2, preferably 0 or 1, and $R^{51}$ and $R^{52}$, independently of one another, have one of the meanings given for $R^{41}$ and $R^{42}$ and preferably denote alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

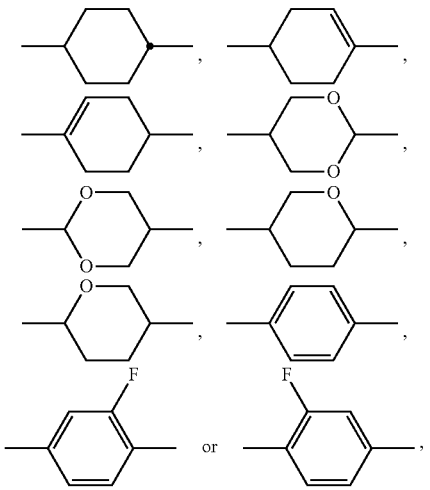

if present, each, independently of one another, denote

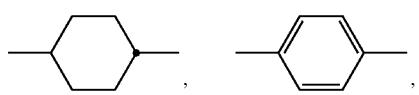

preferably

-continued

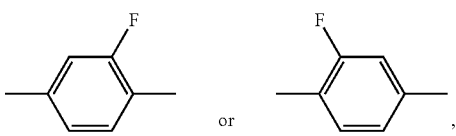

preferably

denotes

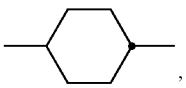

and, if present,

preferably denotes

$Z^{51}$ to $Z^{53}$ each, independently of one another, denote —CH₂—CH₂—, —CH₂—O—, —CH=CH—, —C≡C—, —COO— or a single bond, preferably —CH₂—CH₂—, —CH₂—O— or a single bond and particularly preferably a single bond, i and j each, independently of one another, denote 0 or 1, (i+j) preferably denotes 0, 1 or 2, more preferably 0 or 1 and, most preferably, 1.

d) again optionally, preferably obligatory, either alternatively or additionally, one or more dielectrically negative compounds selected from the group of formulae VI to IX:

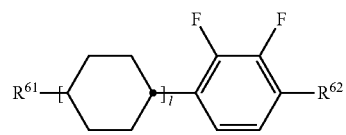  VI

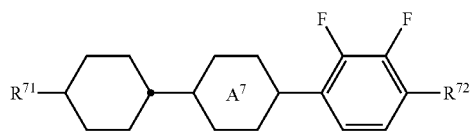  VII

-continued

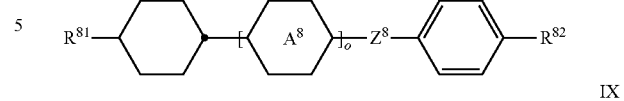  VIII

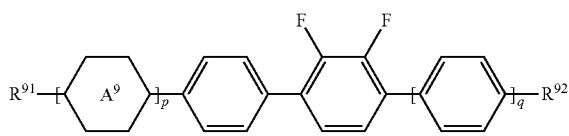  IX wherein $R^{61}$ denotes an unsubstituted alkyl radical having 1 to 7 C atoms, preferably a straight-chain alkyl radical, more preferably an n-alkyl radical, most preferably propyl or pentyl, an unsubstituted alkenyl radical having 2 to 7 C atoms, preferably a straight-chain alkenyl radical, particularly preferably having 2 to 5 C atoms, an unsubstituted alkoxy radical having 1 to 6 C atoms or an unsubstituted alkenyloxy radical having 2 to 6 C atoms, $R^{62}$ denotes an unsubstituted alkyl radical having 1 to 7 C atoms, an unsubstituted alkoxy radical having 1 to 6 C atoms or an unsubstituted alkenyloxy radical having 2 to 6 C atoms, and l denotes 0 or 1, $R^{71}$ denotes an unsubstituted alkyl radical having 1 to 7 C atoms, preferably a straight-chain alkyl radical, more preferably an n-alkyl radical, most preferably propyl or pentyl, or an unsubstituted alkenyl radical having 2 to 7 C atoms, preferably a straight-chain alkenyl radical, particularly preferably having 2 to 5 C atoms, $R^{72}$ denotes an unsubstituted alkyl radical having 1 to 7 C atoms, preferably having 2 to 5 C atoms, an unsubstituted alkoxy radical having 1 to 6 C atoms, preferably having 1, 2, 3 or 4 C atoms, or an unsubstituted alkenyloxy radical having 2 to 6 C atoms, preferably having 2, 3 or 4 C atoms, and

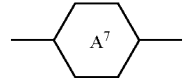

denotes

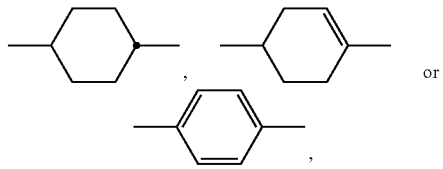

$R^{81}$ denotes an unsubstituted alkyl radical having 1 to 7 C atoms, preferably a straight-chain alkyl radical, more preferably an n-alkyl radical, most preferably propyl or pentyl, or an unsubstituted alkenyl radical having 2 to 7 C atoms, preferably a straight-chain alkenyl radical, particularly preferably having 2 to 5 C atoms, $R^{82}$ denotes an unsubstituted alkyl radical having 1 to 7 C atoms, preferably having 2 to 5 C atoms, an unsubstituted alkoxy radical having 1 to 6 C atoms, preferably having 1, 2, 3 or 4 C atoms, or an unsubstituted alkenyloxy radical having 2 to 6 C atoms, preferably having 2, 3 or 4 C atoms,

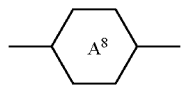

denotes

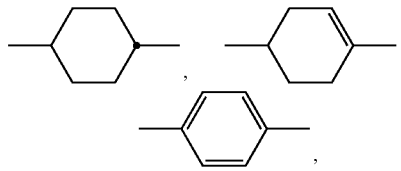

preferably

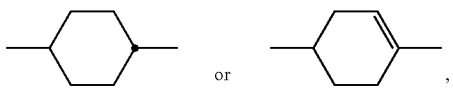

more preferably

, $Z^8$ denotes —(C=O)—O—, —CH$_2$—O—, —CF$_2$—O— or —CH$_2$—CH$_2$—, preferably —(C=O)—O— or —CH$_2$—O—, and denotes 0 or 1, $R^{91}$ and $R^{92}$ independently of one another have the meaning given for $R^{72}$ above, $R^{91}$ preferably denotes an alkyl radical having 2 to 5 C atoms, preferably having 3 to 5 C atoms, $R^{92}$ preferably denotes an alkyl or alkoxy radical having 2 to 5 C atoms, more preferably an alkoxy radical having 2 to 4 C atoms, or an alkenyloxy radical having 2 to 4 C atoms.

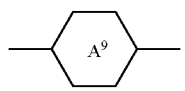

denotes

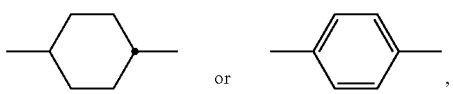

p and q independently of each other denote 0 or 1, and (p+q) preferably denotes 0 or 1, in case

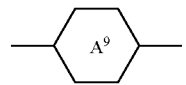

denotes

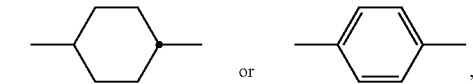

, alternatively, preferably p=q=1.

e) optionally, preferably obligatory, one or more compounds of formulae B and or S, preferably selected from the group of compounds of formulae B-1 and B-2, S-1 and S-2, preferably in a concentration in the range from 1% to 60%, more preferably in the range from 5% to 40%, particularly preferably in the range from 8% to 35%,

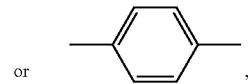 B in which

denotes

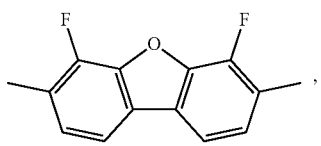

,

denotes, in each occurrence independently of one another,

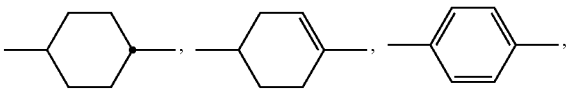

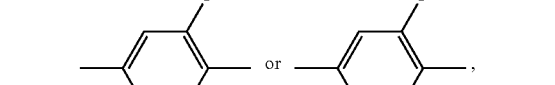

preferably

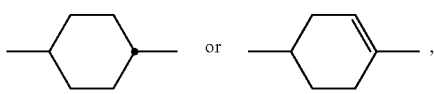

n denotes 1 or 2, preferably 1,

R¹ denotes alkyl, alkoxy, fluorinated alkyl or fluorinated alkoxy, preferably having 1 to 7 C atoms, alkenyl, alkenyloxy, alkoxyalkyl or fluorinated alkenyl having 2 to 7 C atoms, preferably alkyl, alkoxy, alkenyl or alkenyloxy, more preferably alkyl, alkenyl, alkoxy or alkenyloxy, and, most preferably alkyl, and X¹ denotes F, Cl, fluorinated alkyl, fluorinated alkenyl, fluorinated alkoxy or fluorinated alkenlyoxy, the latter four groups preferably having 1 to 4 C atoms, more preferably F, Cl, CF₃ or OCF₃, and

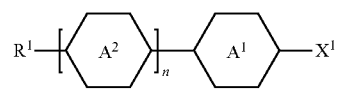

in which

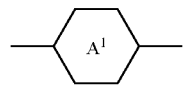

denotes

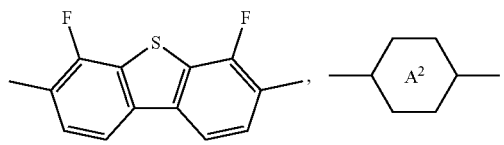

denotes, in each occurrence independently of one another,

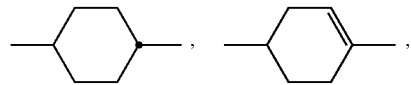

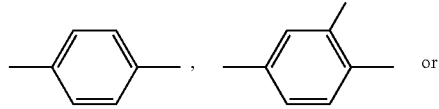
or
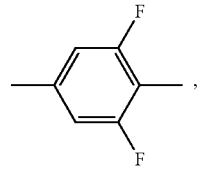

preferably

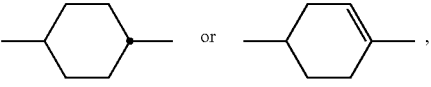

n denotes 1 or 2, preferably 1,

R¹ denotes alkyl, alkoxy, fluorinated alkyl or fluorinated alkoxy, preferably having 1 to 7 C atoms, alkenyl, alkenyloxy, alkoxyalkyl or fluorinated alkenyl having 2 to 7 C atoms, preferably alkyl, alkoxy, alkenyl or alkenyloxy, more preferably alkyl, alkenyl, alkoxy or alkenyloxy, and, most preferably alkyl, and X¹ denotes F, Cl, fluorinated alkyl, fluorinated alkenyl, fluorinated alkoxy or fluorinated alkenlyoxy, the latter four groups preferably having 1 to 4 C atoms, more preferably F, Cl, CF₃ or OCF₃, and f) again optionally, preferably obligatory, either alternatively or additionally, one or more compounds of formula I:

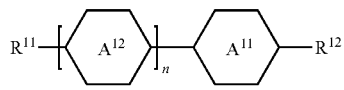

in which

denotes

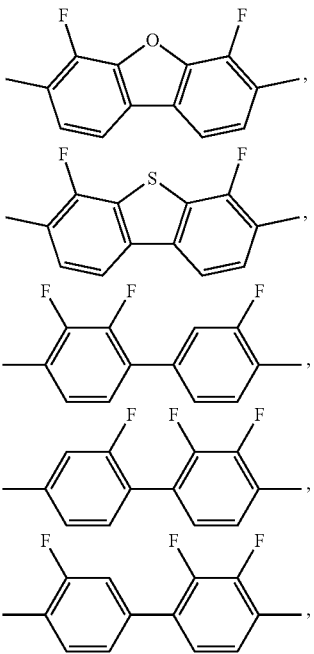

-continued

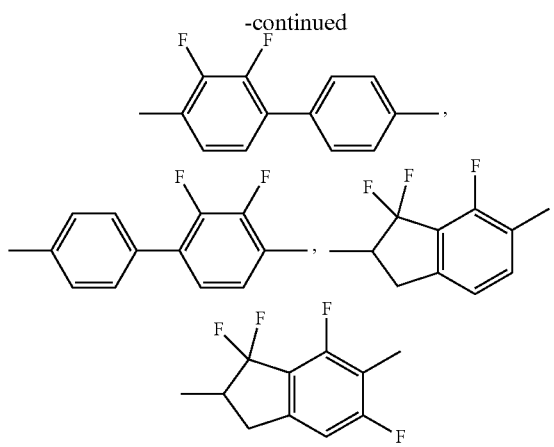

denotes

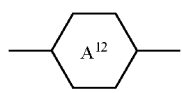

preferably

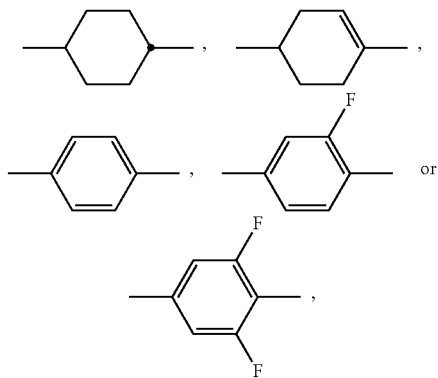

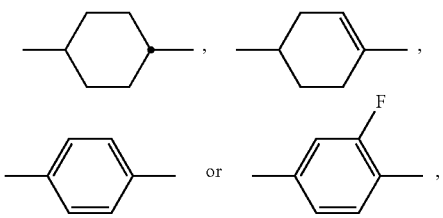

n denotes 0 or 1, $R^{11}$ and $R^{12}$ independently of each other denote alkyl, alkoxy, fluorinated alkyl or fluorinated alkoxy, preferably having 1 to 7 C atoms, alkenyl, alkenyloxy, alkoxyalkyl or fluorinated alkenyl having 2 to 7 C atoms and preferably alkyl, alkoxy, alkenyl or alkenyloxy, most preferably alkyl, alkoxy or alkenyloxy, and $R^{11}$ alternatively denotes $R^1$ and $R^{12}$ alternatively denotes $X^1$, $R^1$ denotes alkyl, alkoxy, fluorinated alkyl or fluorinated alkoxy, preferably having 1 to 7 C atoms, alkenyl, alkenyloxy, alkoxyalkyl or fluorinated alkenyl, preferably having 2 to 7 C atoms and preferably alkyl or alkenyl, and $X^1$ denotes F, Cl, fluorinated alkyl, fluorinated alkenyl, fluorinated alkoxy or fluorinated alkenyoxy, the latter four groups preferably having 1 to 4 C atoms, more preferably F, Cl, $CF_3$ or $OCF_3$, from which the compounds of formulae B and S are excluded.

The present invention is also related to the compounds of formula X.

Preferably the media according to the present application comprise one or more compounds of formula X selected from the group of preferred compounds of its subformulae X-1 and X-2,

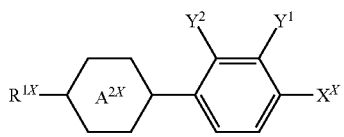

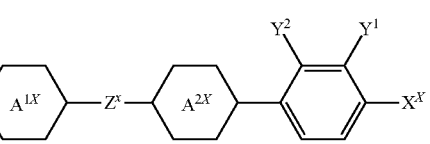

wherein the parameters have the respective meanings given above under formula X and preferably

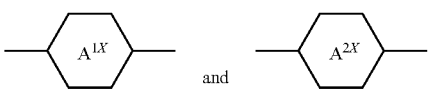

denote independently of each other

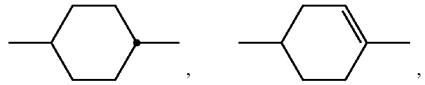

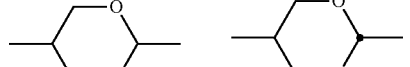

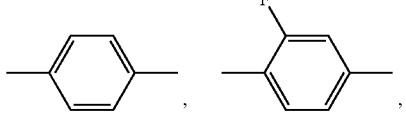

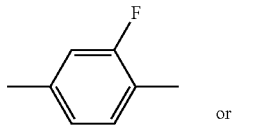

preferably

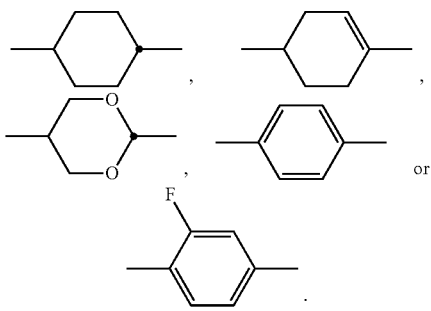

In a more preferred embodiment the media according to the present application comprise one or more compounds of more compounds of formula X-1, selected from the group of preferred compounds of its subformulae X-1-1 to X-1-4,

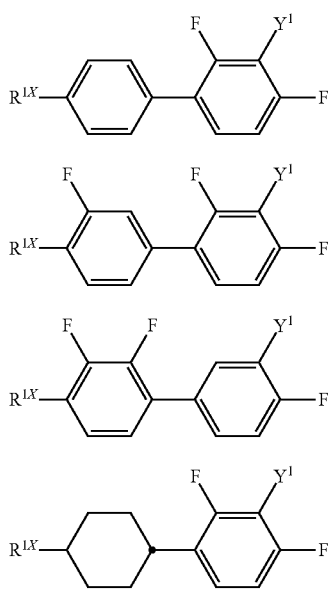

wherein the parameters have the respective meanings given above.

In a more preferred embodiment the media according to the present application comprise one or more compounds of more compounds of formula X-1, selected from the group of preferred compounds of its subformulae X-2-1 to X-2-6,

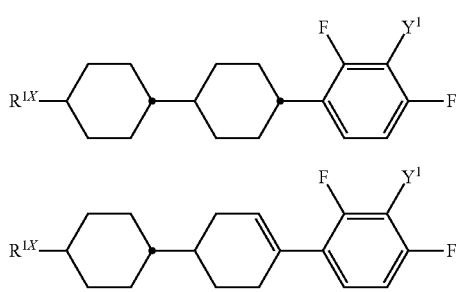

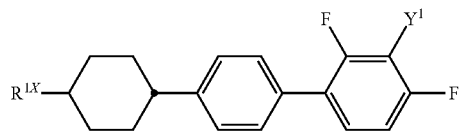

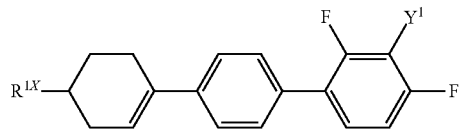

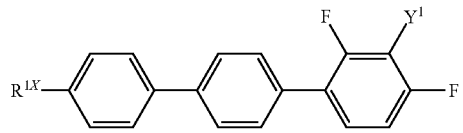

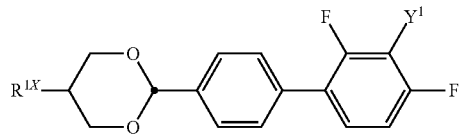

wherein the parameters have the respective meanings given above.

The liquid-crystalline media in accordance with the present application preferably have a nematic phase.

Throughout this application and especially for the definition of $R^1$ alkyl means an alkyl group, which may be straight-chain or branched. Each of these radicals is preferably straight-chain and preferably has 1, 2, 3, 4, 5, 6, 7 or 8 C atoms and is accordingly preferably methyl, ethyl, n-propyl, n-butyl, n-pentyl, n-hexyl or n-heptyl.

In case alkyl means a branched alkyl group it preferably means 2-alkyl, 2-methylalkyl or 2-(2-ethyl)-alkyl, preferably 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy 4-methylhexyl, 2-hexyl, 2-octyl, 2-nonyl, 2-decyl and 2-dodecyl. Most preferred of these groups are 2-hexyl and 2-octyl.

Respective branched groups, especially for $R^1$, which lead to chiral compounds are also called chiral groups in this application. Particularly preferred chiral groups are 2-alkyl, 2-alkoxy, 2-methylalkyl, 2-methylalkoxy, 2-fluoroalkyl, 2-fluoroalkoxy, 2-(2-ethin)-alkyl, 2-(2-ethin)-alkoxy, 1,1,1-trifluoro-2-alkyl and 1,1,1-trifluoro-2-alkoxy.

Particularly preferred chiral groups are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methyl heptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

Preferably the compounds of formula B are selected from the group of compounds of formulae B-1 and B-2:

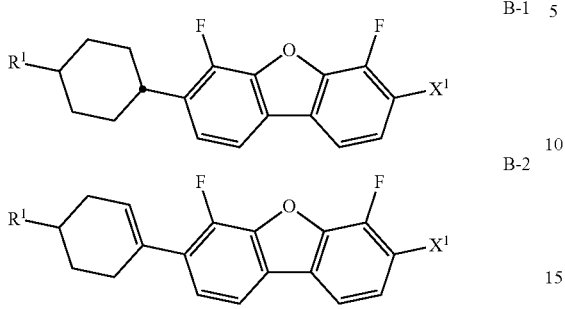

in which
R$^1$ denotes alkyl, alkoxy, fluorinated alkyl or fluorinated alkoxy, preferably having 1 to 7 C atoms, alkenyl, alkenyloxy, alkoxyalkyl or fluorinated alkenyl having 2 to 7 C atoms and preferably alkyl or alkenyl, and X$^1$ denotes F, Cl, CN, NCS, fluorinated alkyl, fluorinated alkenyl, fluorinated alkoxy or fluorinated alkenlyoxy, the latter four groups preferably having 1 to 4 C atoms, preferably F, Cl, CF$_3$ or OCF$_3$, more preferably F, CF$_3$, or OCF$_3$ and, most preferably, OCF$_3$ or CF$_3$.

Preferably the compounds of formula S are selected from the group of compounds of formulae S-1 and S-2:

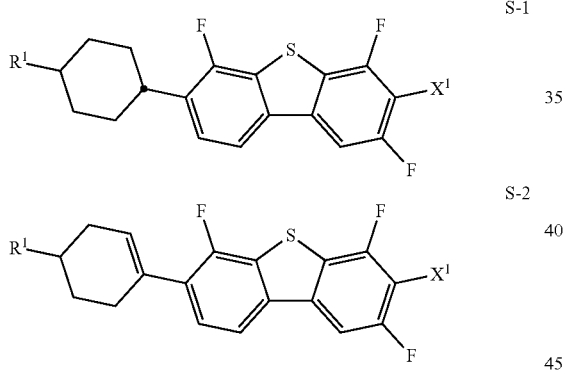

in which
R$^1$ denotes alkyl, alkoxy, fluorinated alkyl or fluorinated alkoxy, preferably having 1 to 7 C atoms, alkenyl, alkenyloxy, alkoxyalkyl or fluorinated alkenyl having 2 to 7 C atoms and preferably alkyl or alkenyl, and X$^1$ denotes F, Cl, CN, NCS, fluorinated alkyl, fluorinated alkenyl, fluorinated alkoxy or fluorinated alkenlyoxy, the latter four groups preferably having 1 to 4 C atoms, preferably F, Cl, CF$_3$ or OCF$_3$, more preferably F, CF$_3$, or OCF$_3$ and, most preferably, OCF$_3$ or CF$_3$.

Preferably the compounds of formula I are selected from the group of compounds of formulae I-1, I-2, I-3 and I-4:

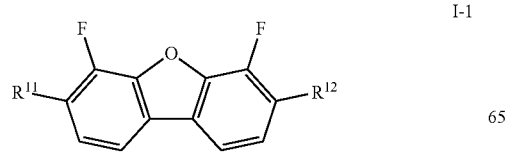

in which
R$^{11}$ and R$^{12}$ independently of each other denote alkyl, alkoxy, fluorinated alkyl or fluorinated alkoxy, preferably having 1 to 7 C atoms, alkenyl, alkenyloxy, alkoxyalkyl or fluorinated alkenyl having 2 to 7 C atoms and preferably alkyl, alkoxy, alkenyl or alkenyloxy, most preferably alkoxy or alkenyloxy, R$^1$ denotes alkyl, alkoxy, fluorinated alkyl or fluorinated alkoxy, preferably having 1 to 7 C atoms, alkenyl, alkenyloxy, alkoxyalkyl or fluorinated alkenyl having 2 to 7 C atoms and preferably alkyl or alkenyl, and X$^1$ denotes F, Cl, CN, NCS, fluorinated alkyl, fluorinated alkenyl, fluorinated alkoxy or fluorinated alkenlyoxy, the latter four groups preferably having 1 to 4 C atoms, preferably F, Cl, CF$_3$ or OCF$_3$, more preferably F, CF$_3$ or OCF$_3$ and, most preferably, CF$_3$ or OCF$_3$.

The compounds of the general formula X are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and are suitable for the said reactions. Use can be made here of variants which are known per se, but are not mentioned here in greater detail.

If desired, the starting materials can also be formed in situ by not isolating them from the reaction mixture, but instead immediately converting them further into the compounds of the general formula X.

Preferred synthetic pathways towards compounds according to the invention is shown in the schemes below and is further illustrated by means of the working examples. The syntheses can be adapted to the particular desired compounds of the general formula X by choice of suitable starting materials.

Scheme 1

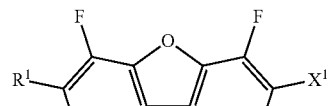

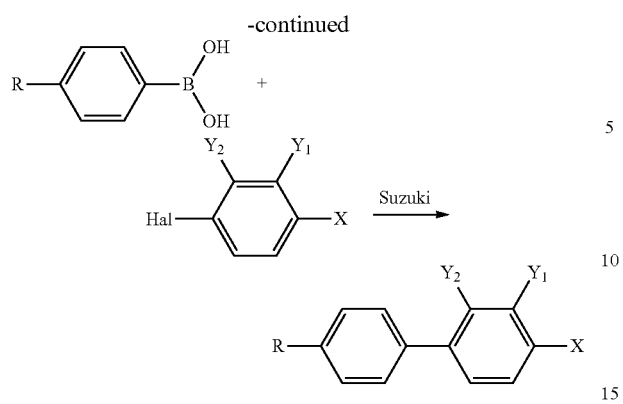

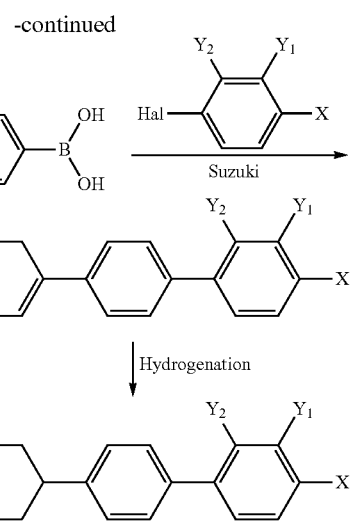

wherein the parameters R, $Y_1$, $Y_2$ and X have the respective meanings given for $R^{1X}$, Y, Y and $X^X$ under formula X above and Hal is a halogen, preferably Br or I and, wherein the 1,4-phenylene moiety of the halogenide, e.g. bromide, may optionally be substituted by one or two F atoms.

Scheme 2

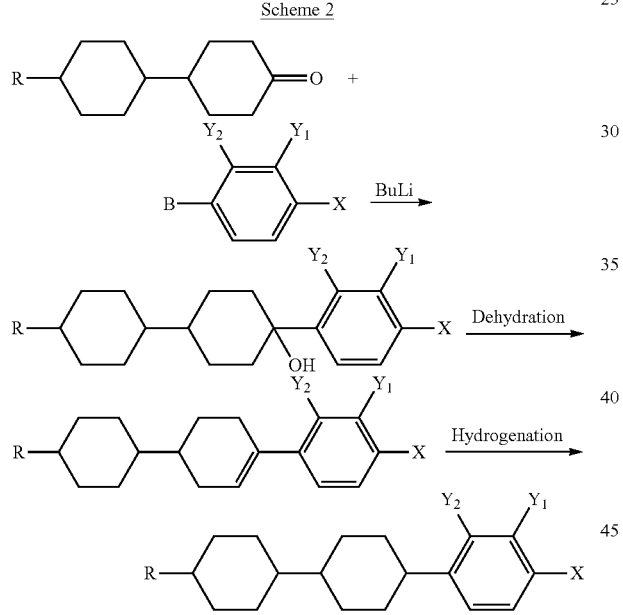

wherein the parameters R, $Y_1$, $Y_2$ and X have the respective meanings given for $R^{1X}$, $Y^1$, $Y^2$ and $X^X$ under formula X above.

Scheme 3

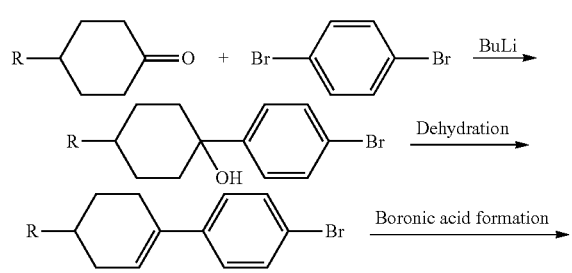

wherein the parameters R, $Y_1$, $Y_2$ and X have the respective meanings given for $R^{1X}$, $Y^1$, $Y^2$ and $X^X$ under formula X above and Hal is a halogen, preferably Br or I, wherein the 1,4-phenylene moiety of the bromide may optionally be substituted by one or two F atoms.

Scheme 4

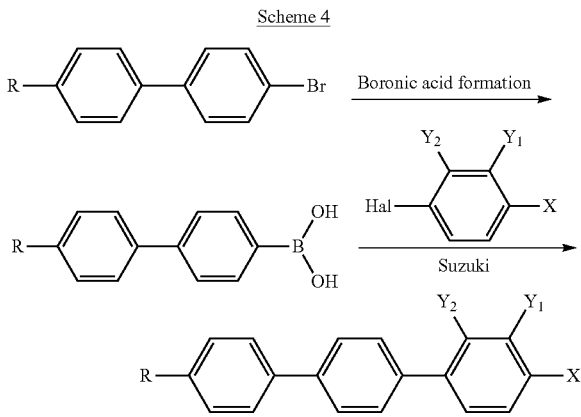

wherein the parameters R, $Y_1$, $Y_2$ and X have the respective meanings given for $R^{1X}$, $Y_1$, $Y_2$ and $X^X$ under formula X above and Hal is a halogen, preferably Br or I, wherein the each one of the 4,4'-phenylene moieties of the bromide, may optionally substituted by one, two or more F atoms.

A further object of the present invention is a process for the synthesis of the compound of formula X from a compound of formula 1-Hal-2-$Y^2$-3-$Y^1$-4-X-phenyl, preferably following the synthetic pathway depicted in schemes 2 and 3 above. In a key step of the synthesis, building block 1-Hal-2-$Y^2$-3-$Y^1$-4-X-phenyl is reacted with a ketone by a metal-mediated coupling reaction to give the respective tertiary alcohol, which is subsequently dehydrated to the corresponding stryene derivative that can undergo hydrogenation in the following step. Alternatively, the building block 1-Hal-2-$Y^2$-3-$Y^1$-4-X-phenyl is reacted with an aromatic boronic acid derivative preferably in a Suzuki coupling reaction to give the corresponding biphenyl derivative that can also undergo hydrogenation.

The reactions described should only be regarded as illustrative. The person skilled in the art can carry out corresponding variations of the syntheses described and also follow other suitable synthetic routes in order to obtain compounds of the formula X.

The compounds of the general formula X can be used in liquid-crystalline media. The present invention therefore also relates to a liquid-crystalline medium comprising two or more liquid-crystalline compounds, comprising one or more compounds of the general formula X.

The invention furthermore relates to a liquid-crystal display containing a liquid-crystalline medium according to the invention, in particular an IPS or FFS display, particularly preferably a FFS or SG-FFS display.

The invention furthermore relates to a liquid-crystal display of the IPS or FFS type comprising a liquid-crystal cell consisting of two substrates, where at least one substrate is transparent to light and at least one substrate has an electrode layer, and a layer, located between the substrates, of a liquid-crystalline medium comprising a polymerised component and a low-molecular-weight component, where the polymerised component is obtainable by polymerisation of one or more polymerisable compounds in the liquid-crystalline medium between the substrates of the liquid-crystal cell, preferably with application of an electrical voltage and where the low-molecular-weight component is a liquid-crystal mixture according to the invention as described above and below.

The displays in accordance with the present invention are preferably addressed by an active matrix (active matrix LCDs, AMDs for short), preferably by a matrix of thin-film transistors (TFTs). However, the liquid crystals according to the invention can also be used in an advantageous manner in displays having other known addressing means.

The invention furthermore relates to a process for the preparation of a liquid-crystalline medium according to the invention by mixing one or more compounds of formula X, preferably selected from the group of compounds of formulae XA and XB, with one or more low-molecular-weight liquid-crystalline compounds, or a liquid-crystal mixture and optionally with further liquid-crystalline compounds and/or additives.

The following meanings apply above and below:

The term "FFS" is, unless indicated otherwise, used to represent FFS and SG-FFS displays.

The term "mesogenic group" is known to the person skilled in the art and is described in the literature, and denotes a group which, due to the anisotropy of its attracting and repelling interactions, essentially contributes to causing a liquid-crystalline (LC) phase in low-molecular-weight or polymeric substances. Compounds containing mesogenic groups (mesogenic compounds) do not necessarily have to have a liquid-crystalline phase themselves. It is also possible for mesogenic compounds to exhibit liquid-crystalline phase behaviour only after mixing with other compounds and/or after polymerisation. Typical mesogenic groups are, for example, rigid rod- or disc-shaped units. An overview of the terms and definitions used in connection with mesogenic or liquid-crystalline compounds is given in Pure Appl. Chem. 73(5), 888 (2001) and C. Tschierske, G. Pelzl, S. Diele, Angew. Chem. 2004, 116, 6340-6368.

The term "spacer group" or "spacer" for short, also referred to as "Sp" above and below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless indicated otherwise, the term "spacer group" or "spacer" above and below denotes a flexible group which connects the mesogenic group and the polymerisable group(s) to one another in a polymerisable mesogenic compound.

For the purposes of this invention, the term "liquid-crystalline medium" is intended to denote a medium which comprises a liquid-crystal mixture and one or more polymerisable compounds (such as, for example, reactive mesogens). The term "liquid-crystal mixture" (or "host mixture") is intended to denote a liquid-crystalline mixture which consists exclusively of unpolymerisable, low-molecular-weight compounds, preferably of two or more liquid-crystalline compounds and optionally further additives, such as, for example, chiral dopants or stabilisers.

Particular preference is given to liquid-crystal mixtures and liquid-crystalline media which have a nematic phase, in particular at room temperature.

In a preferred embodiment of the present invention, the liquid-crystal medium comprises one or more dielectrically positive compounds having a dielectric anisotropy of greater than 3, selected from the group of the compounds of the formulae II-1 and II-2:

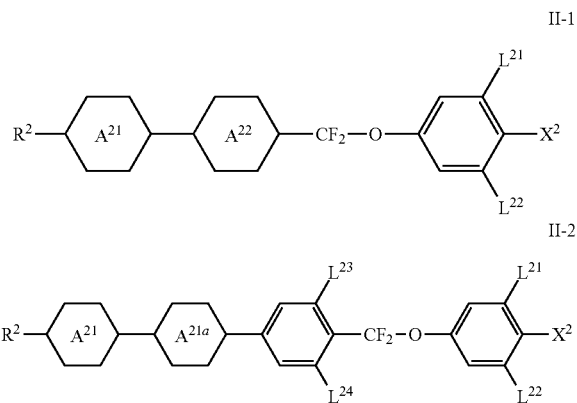

in which the parameters have the respective meanings indicated above under formula II, and $L^{23}$ and $L^{24}$, independently of one another, denote H or F, preferably $L^{23}$ denotes F, and

has one of the meanings given for

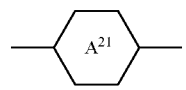

and, in the case of formulae II-1 and II-2, $X^2$ preferably denotes F or $OCF_3$, particularly preferably F, and, in the case of formula II-2,

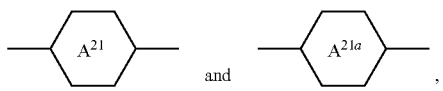

independently of one another, preferably denote

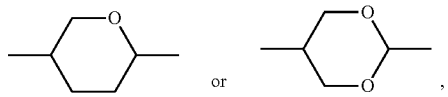

and/or selected from the group of the compounds of the formulae III-1 and III-2:

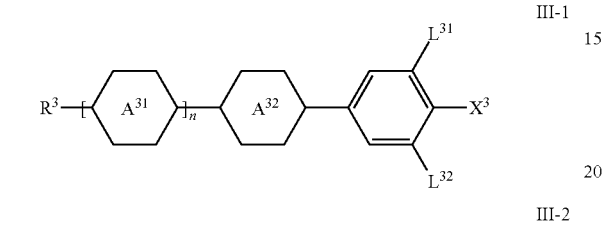

in which the parameters have the meanings given under formula III, and the media in accordance with the present invention may comprise, alternatively or in addition to the compounds of the formulae III-1 and/or III-2, one or more compounds of the formula III-3

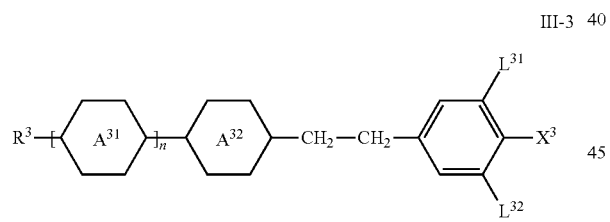

in which the parameters have the respective meanings indicated above, and the parameters $L^{31}$ and $L^{32}$, independently of one another and of the other parameters, denote H or F.

The liquid-crystal medium preferably comprises compounds selected from the group of the compounds of the formulae II-1 and II-2 in which $L^{21}$ and $L^{22}$ and/or $L^{23}$ and $L^{24}$ both denote F.

In a preferred embodiment, the liquid-crystal medium comprises compounds selected from the group of the compounds of the formulae II-1 and II-2 in which $L^{21}$, $L^{22}$, $L^{23}$ and $L^{24}$ all denote F.

The liquid-crystal medium preferably comprises one or more compounds of the formula II-1. The compounds of the formula II-1 are preferably selected from the group of the compounds of the formulae II-1a to II-1e, preferably one or more compounds of formulae II-1a and/or II-1b and/or II-1d, preferably of formula II-1a and/or II-1d or II-1 b and/or II-1d, most preferably of formula II-1d:

II-1a
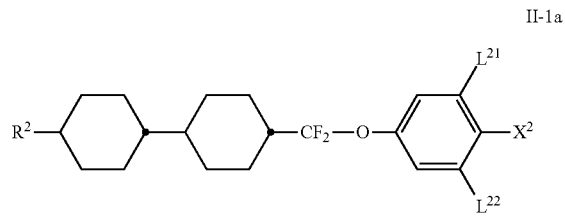

II-1b

II-1c
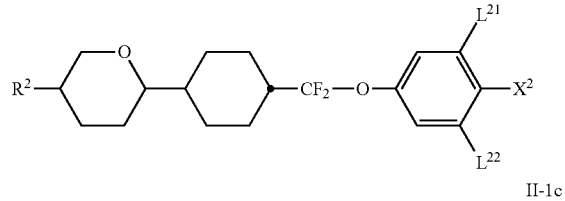

II-1d
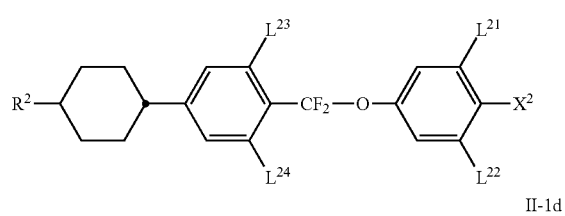

II-1e
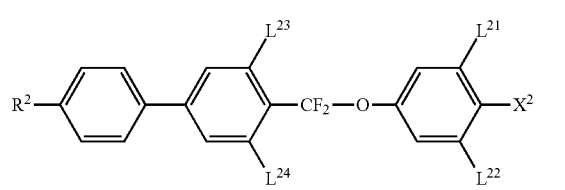

in which the parameters have the respective meanings indicated above, and $L^{25}$ and $L^{26}$, independently of one another and of the other parameters, denote H or F, and preferably in the formulae II-1a and II-1b, $L^{21}$ and $L^{22}$ both denote F, in the formulae II-1c and II-1d, $L^{21}$ and $L^{22}$ both denote F and/or $L^{23}$ and $L^{24}$ both denote F, and in formula II-1e, $L^{21}$, $L^{22}$ and $L^{23}$ denote F.

The liquid-crystal medium preferably comprises one or more compounds of the formula II-2, which are preferably selected from the group of the compounds of the formulae II-2a to II-2k, preferably one or more compounds each of formulae II-2a and/or II-2h and/or II-2j:

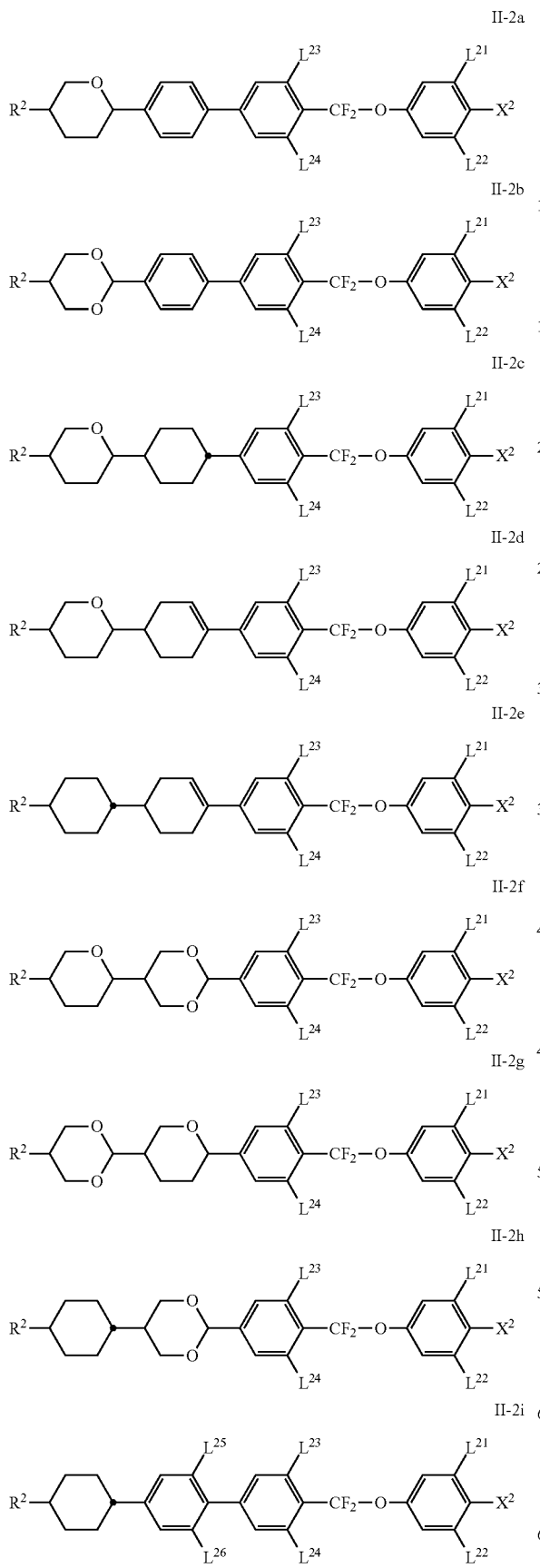

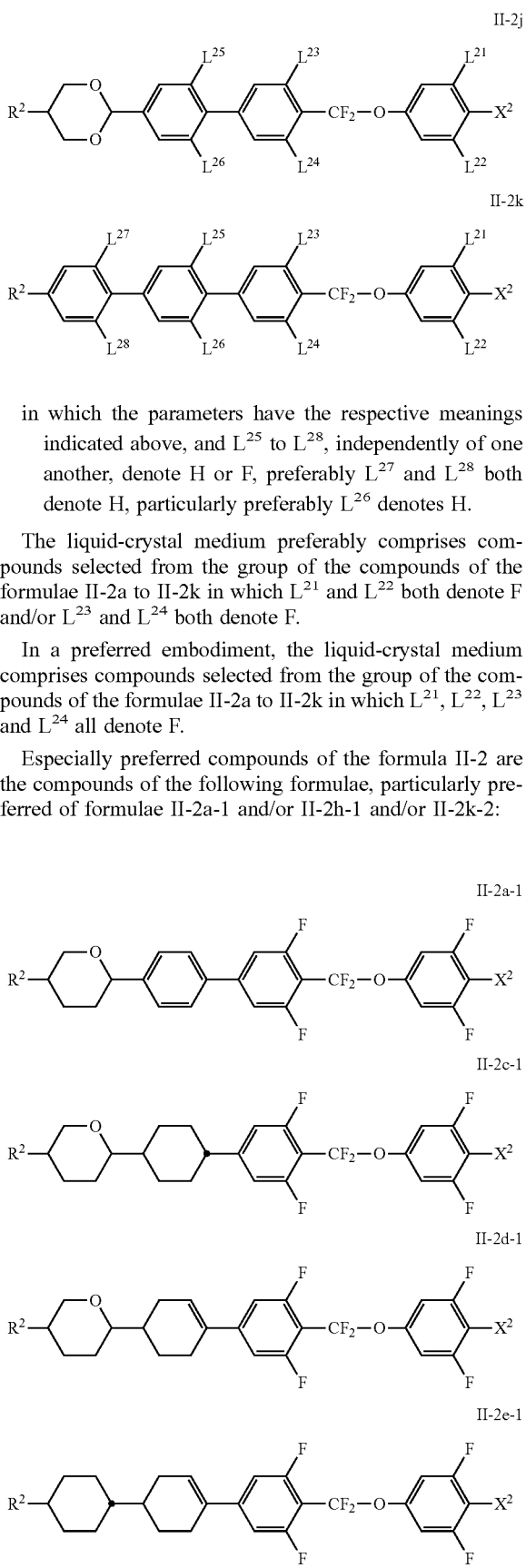

in which the parameters have the respective meanings indicated above, and $L^{25}$ to $L^{28}$, independently of one another, denote H or F, preferably $L^{27}$ and $L^{28}$ both denote H, particularly preferably $L^{26}$ denotes H.

The liquid-crystal medium preferably comprises compounds selected from the group of the compounds of the formulae II-2a to II-2k in which $L^{21}$ and $L^{22}$ both denote F and/or $L^{23}$ and $L^{24}$ both denote F.

In a preferred embodiment, the liquid-crystal medium comprises compounds selected from the group of the compounds of the formulae II-2a to II-2k in which $L^{21}$, $L^{22}$, $L^{23}$ and $L^{24}$ all denote F.

Especially preferred compounds of the formula II-2 are the compounds of the following formulae, particularly preferred of formulae II-2a-1 and/or II-2h-1 and/or II-2k-2:

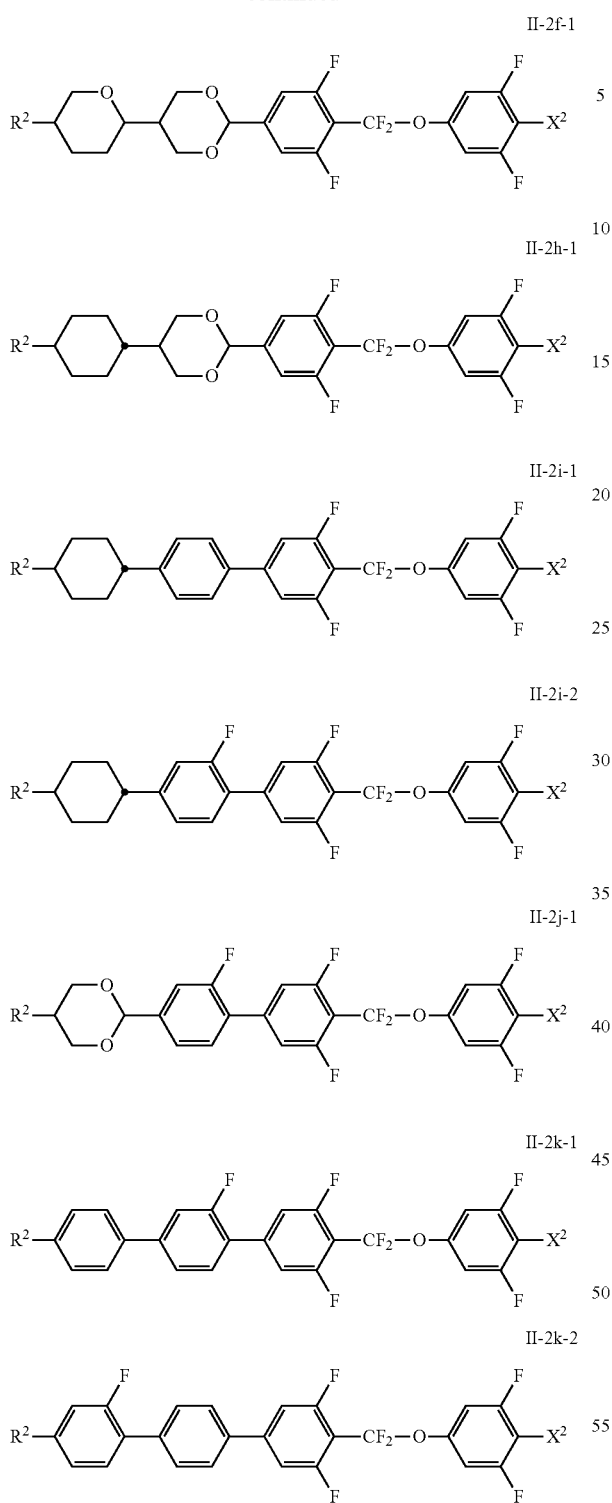
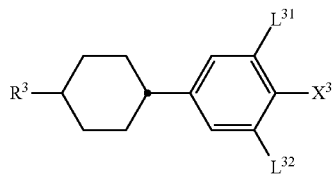
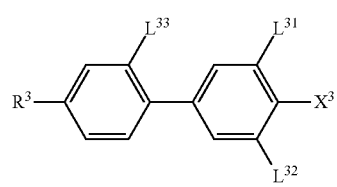
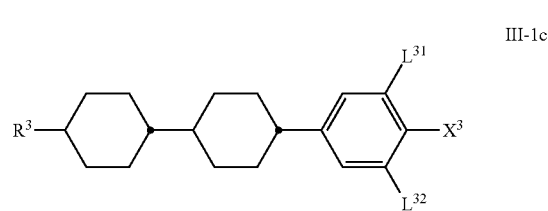
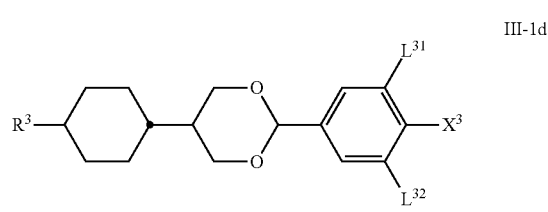
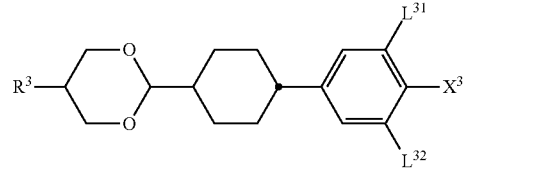
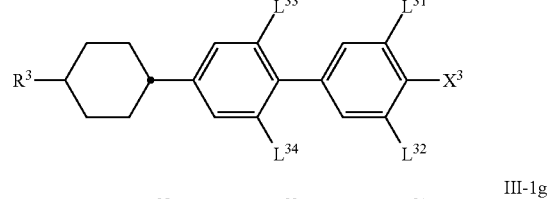
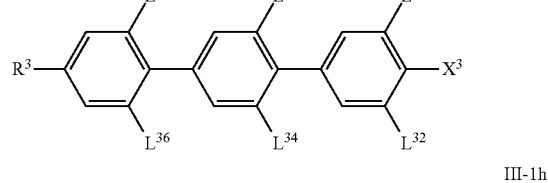
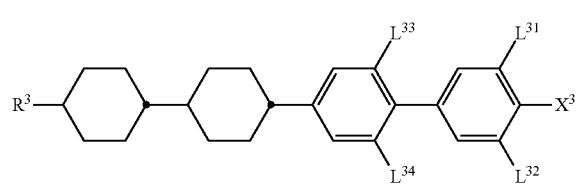
in which $R^2$ and $X^2$ have the meanings indicated above, and $X^2$ preferably denotes F.
The liquid-crystal medium preferably comprises one or more compounds of the formula III-1. The compounds of the formula III-1 are preferably selected from the group of the compounds of the formulae III-1a to III-1j, preferably from formulae III-1c, III-1f, III-1g and III-1j:

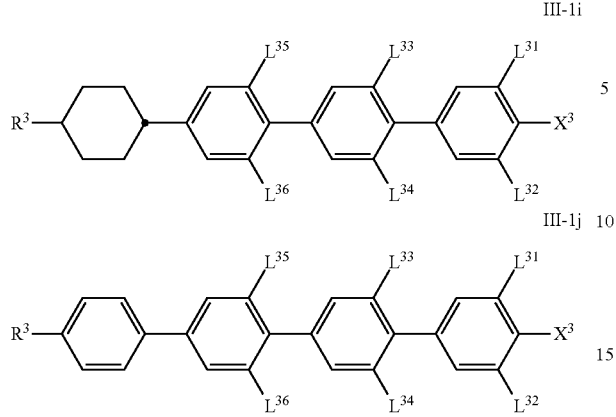

in which the parameters have the meanings given above and preferably in which the parameters have the respective meanings indicated above, the parameters $L^{33}$ and $L^{34}$, independently of one another and of the other parameters, denote H or F and the parameters $L^{35}$ and $L^{36}$, independently of one another and of the other parameters, denote H or F.

The liquid-crystal medium preferably comprises one or more compounds of the formula III-1c, which are preferably selected from the group of the compounds of the formulae III-1c-1 to III-1c-5, preferably of formulae III-1c-1 and/or III-1c-2, most preferably of formula III-1c-1:

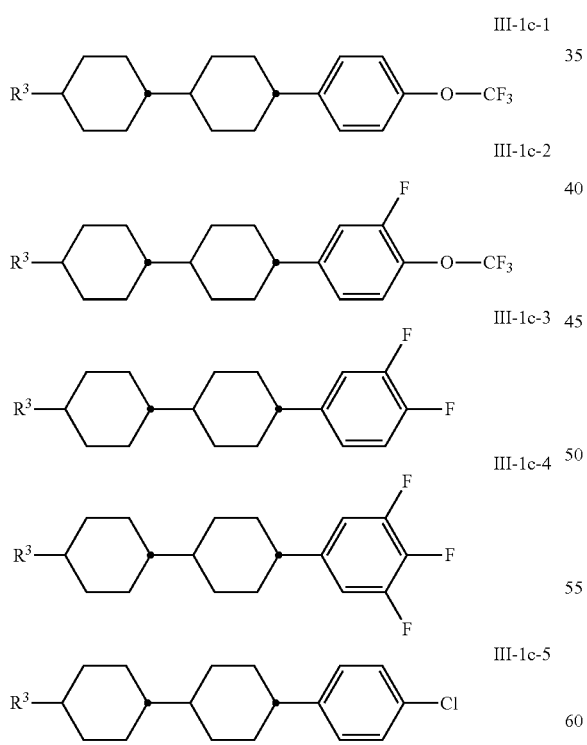

in which $R^3$ has the meaning indicated above.

The liquid-crystal medium preferably comprises one or more compounds of the formula III-1f, which are preferably selected from the group of the compounds of the formulae III-1f-1 to III-1f-6, preferably of formulae III-1f-1 and/or III-1f-2 and/or III-1f-3 and/or III-1f-6, more preferably of formula III-1f-3 and/or III-1f-6, more preferably of formula III-1f-6:

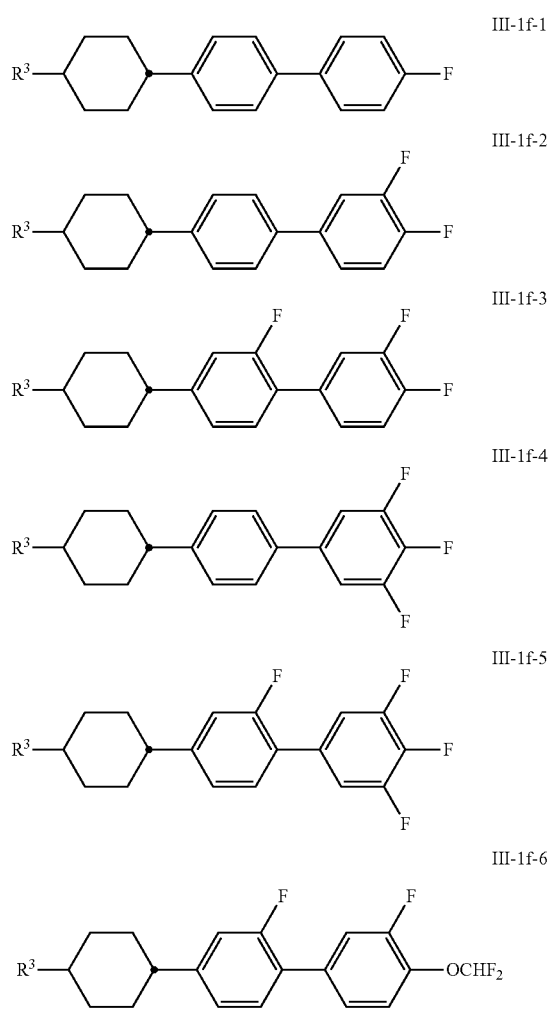

in which $R^3$ has the meaning indicated above.

The liquid-crystal medium preferably comprises one or more compounds of the formula III-1g, which are preferably selected from the group of the compounds of the formulae III-1g-1 to III-1g-5, preferably of formula III-1g-3:

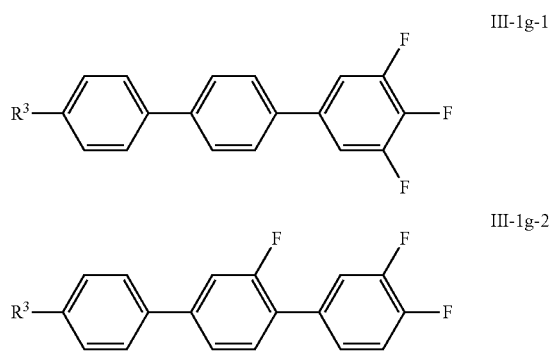

III-1g-3

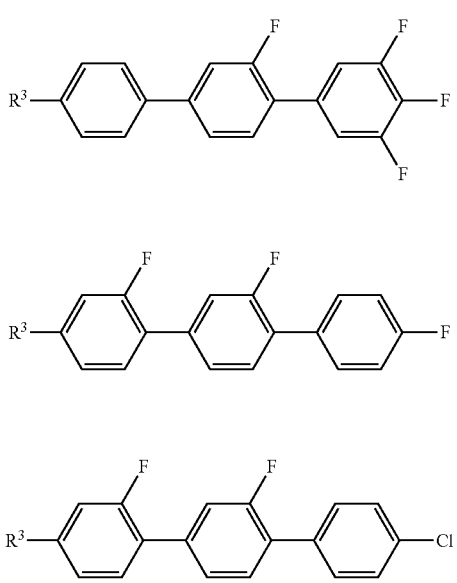

III-1g-4

III-1g-5 in which R³ has the meaning indicated above.

The liquid-crystal medium preferably comprises one or more compounds of the formula III-1 h, which are preferably selected from the group of the compounds of the formulae III-1h-1 to III-1 h-3, preferably of the formula III-1 h-3:

III-1h-1

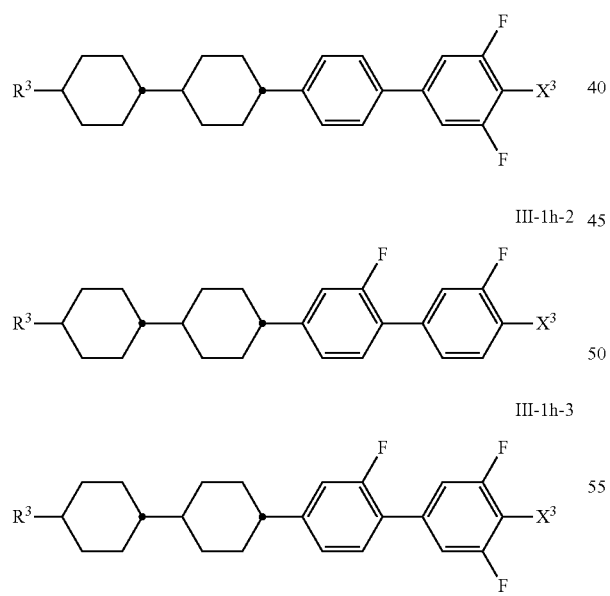

III-1h-2

III-1h-3 in which the parameters have the meanings given above, and X³ preferably denotes F.

The liquid-crystal medium preferably comprises one or more compounds of the formula III-1i, which are preferably selected from the group of the compounds of the formulae III-1i-1 and III-1i-2, preferably of the formula III-1i-2:

III-1i-1

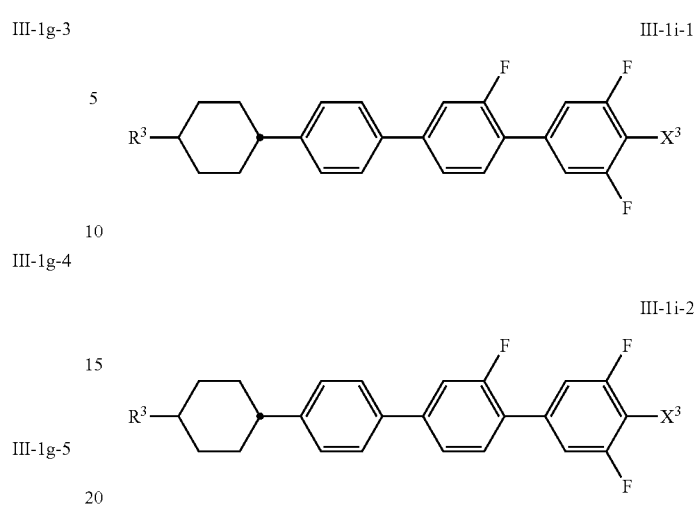

III-1i-2 in which the parameters have the meanings given above, and X³ preferably denotes F.

The liquid-crystal medium preferably comprises one or more compounds of the formula III-1j, which are preferably selected from the group of the compounds of the formulae III-1j-1 and III-1j-2, preferably of the formula III-1j-1:

III-1j-1

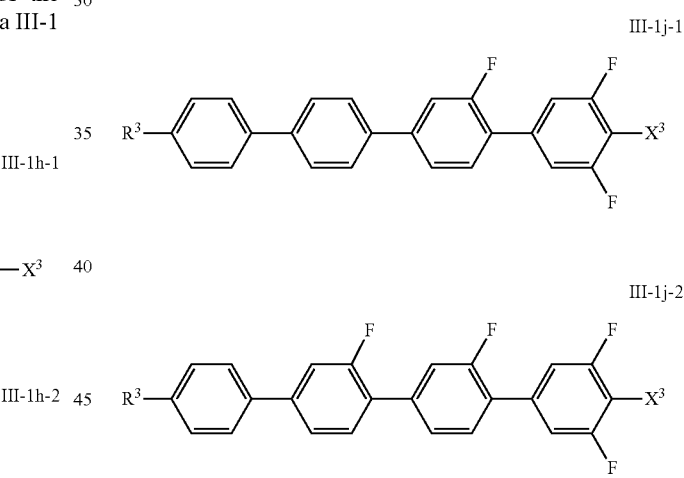

III-1j-2 in which the parameters have the meanings given above.

The liquid-crystal medium preferably comprises one or more compounds of the formula III-2. The compounds of the formula III-2 are preferably selected from the group of the compounds of the formulae III-2a and III-2b, preferably of formula III-2b:

III-2a

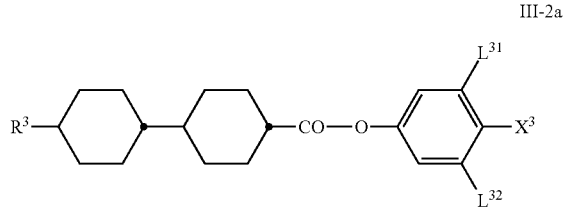

III-2b

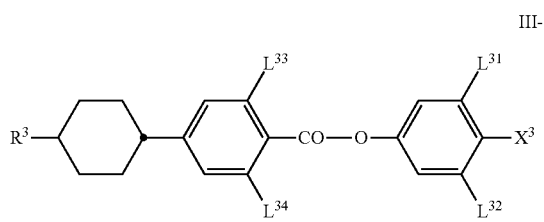

in which the parameters have the respective meanings indicated above, and the parameters $L^{33}$ and $L^{34}$, independently of one another and of the other parameters, denote H or F.

The liquid-crystal medium preferably comprises one or more compounds of the formula III-2a, which are preferably selected from the group of the compounds of the formulae III-2a-1 to III-2a-6:

III-2a-1

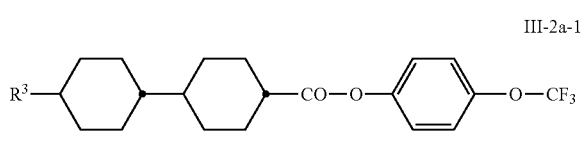

III-2a-2

III-2a-3

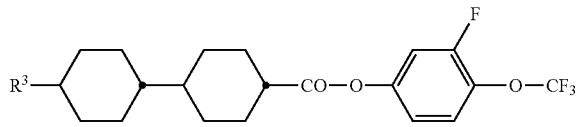

III-2a-4

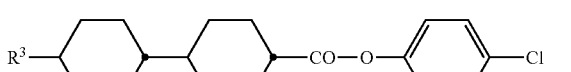

III-2a-5

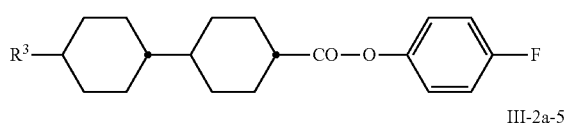

III-2a-6

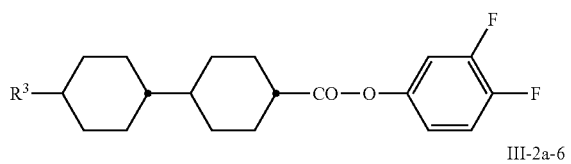

in which $R^3$ has the meaning indicated above.

The liquid-crystal medium preferably comprises one or more compounds of the formula III-2b, which are preferably selected from the group of the compounds of the formulae III-2b-1 to III-2b-4, preferably III-2b-4:

III-2b-1

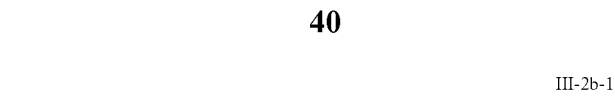

III-2b-2

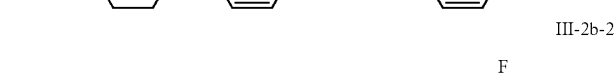

III-2b-3

III-2b-4

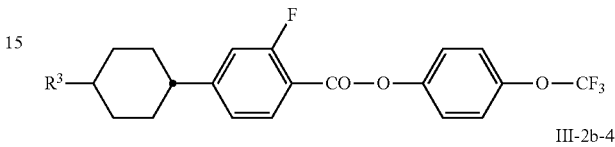

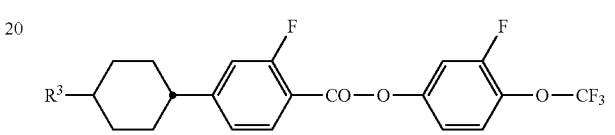

in which $R^3$ has the meaning indicated above.

Alternatively or in addition to the compounds of the formulae III-1 and/or III-2, the media in accordance with the present invention may comprise one or more compounds of the formula III-3

III-3

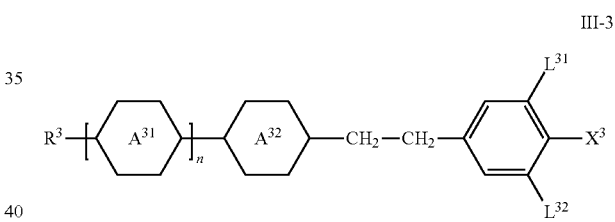

in which the parameters have the respective meanings indicated above under formula III.

These compounds are preferably selected from the group of the formulae III-3a and III-3b:

III-3a

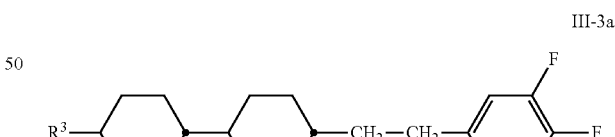

III-3b

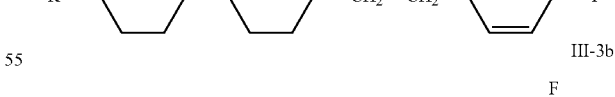

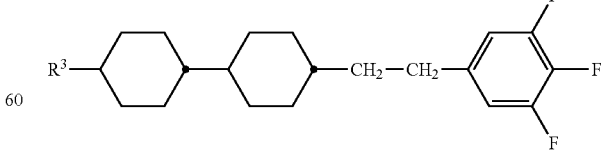

in which $R^3$ has the meaning indicated above.

The liquid-crystalline media in accordance with the present invention preferably comprise one or more dielectrically neutral compounds having a dielectric anisotropy in the range from −1.5 to 3, preferably selected from the group of the compounds of the formulae VI, VII, VIII and IX.

In the present application, the elements all include their respective isotopes.

In particular, one or more H in the compounds may be replaced by D, and this is also particularly preferred in some embodiments. A correspondingly high degree of deuteration of the corresponding compounds enables, for example, detection and recognition of the compounds. This is very helpful in some cases, in particular in the case of the compounds of formula I.

In the present application, alkyl particularly preferably denotes straight-chain alkyl, in particular $CH_3-$, $C_2H_5-$, $n-C_3H_7-$, $n-C_4H_9-$ or $n-C_5H_{11}-$, and alkenyl particularly preferably denotes $CH_2=CH-$, $E-CH_3-CH=CH-$, $CH_2=CH-CH_2-CH_2-$, $E-CH_3-CH=CH-CH_2-CH_2-$ or $E-(n-C_3H_7)-CH=CH-$.

In a preferred embodiment of the present invention, the media according to the invention in each case comprise one or more compounds of formula VI selected from the group of the compounds of the formulae VI-1 and VI-2, preferably one or more compounds each of formulae VI-1 and one or more compounds of formula VI-2,

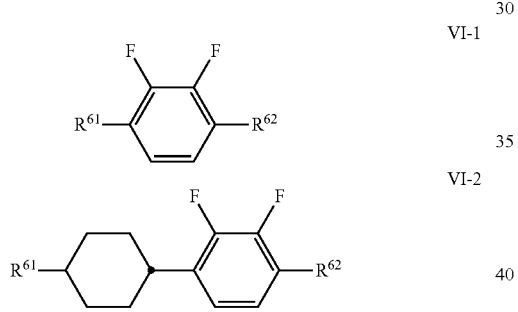

in which the parameters have the respective meanings given above under formula VI, and preferably in formula VI-1

$R^{61}$ and $R^{62}$ independently of each other denote methoxy, ethoxy, propoxy, butoxy (also or pentoxy, preferably ethoxy, butoxy or pentoxy, more preferably ethoxy or butoxy and, most preferably butoxy.

in formula VI-2

$R^{61}$ preferably denotes vinyl, 1-E-propenyl, but-4-en-1-yl, pent-1-en-1-yl or pent-3-en-1-yl and n-propyl or n-pentyl and $R^{62}$ denotes an unsubstituted alkyl radical having 1 to 7 C atoms, preferably having 2 to 5 C atoms, or, preferably, an unsubstituted alkoxy radical having 1 to 6 C atoms, particularly preferably having 2 or 4 C atoms and, most preferably, ethoxy, and In a preferred embodiment of the present invention, the media according to the invention in each case comprise one or more compounds of formula VII selected from the group of the compounds of the formulae VII-1 to VII-3, preferably one or more compounds each of the formulae VII-1 and one or more compounds of formula VII-2,

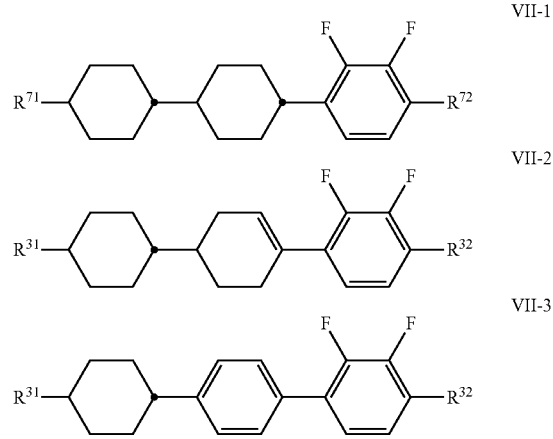

in which the parameters have the respective meanings given above under formula VII, and preferably $R^{71}$ denotes vinyl, 1-E-propenyl, but-4-en-1-yl, pent-1-en-1-yl or pent-3-en-1-yl, n-propyl or n-pentyl and $R^{72}$ denotes an unsubstituted alkyl radical having 1 to 7 C atoms, preferably having 2 to 5 C atoms, or, preferably, an unsubstituted alkoxy radical having 1 to 6 C atoms, particularly preferably having 2 or 4 C atoms and, most preferably, ethoxy.

In a preferred embodiment of the present invention, the media according to the invention in each case comprise one or more compounds of formula VI-1 selected from the group of the following compounds:

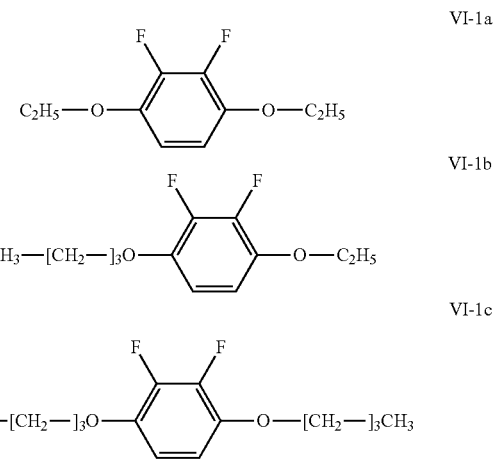

In a preferred embodiment of the present invention, the media according to the invention in each case comprise one or more compounds of formula VI-2 selected from the group of the following compounds:

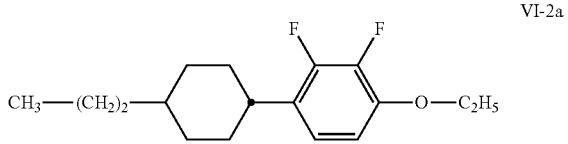

VI-2b

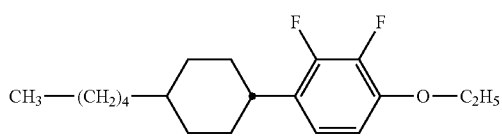

In a preferred embodiment of the present invention, the media according to the invention in each case comprise one or more compounds of formula VII-1 selected from the group of the following compounds:

VII-1a

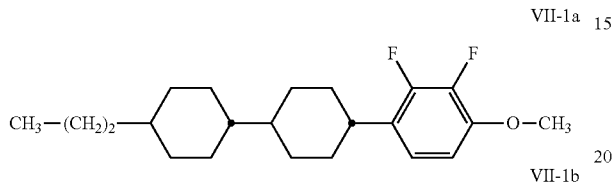

VII-1b

VII-1c

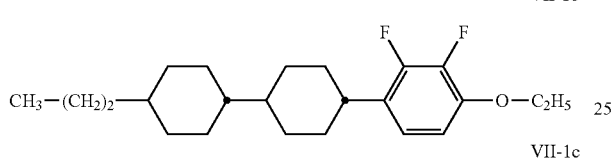

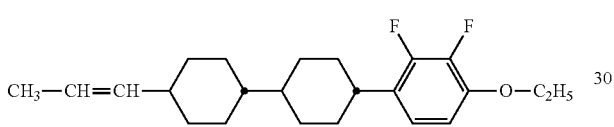

In a preferred embodiment of the present invention, the media according to the invention in each case comprise one or more compounds of formula VII-2 selected from the group of the following compounds:

VII-2a

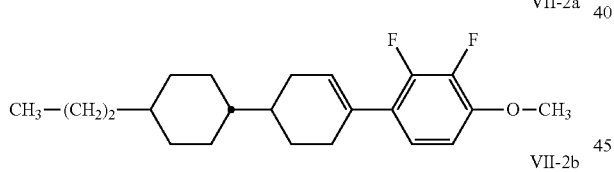

VII-2b

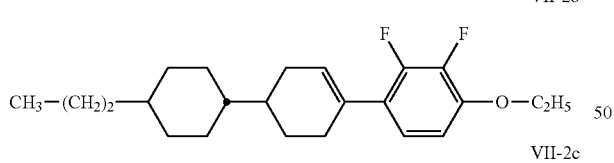

VII-2c

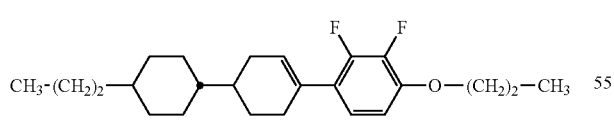

In addition to the compounds of formula B or the preferred sub-formulae thereof, the media in accordance with the present invention preferably comprise one or more dielectrically negative compounds selected from the group of compounds of the formulae VI and VII preferably in a total concentration in the range from 5% or more to 90% or less, preferably from 10% or more to 80% or less, particularly preferably from 20% or more to 70% or less.

In a preferred embodiment of the present invention, the media according to the invention in each case comprise one or more compounds of formula VIII selected from the group of the compounds of the formulae VIII-1 to VIII-3, preferably one or more compounds each of the formulae VIII-1 and/or one or more compounds of formula VIII-3,

VIII-1

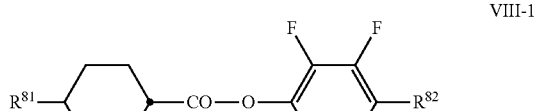

VIII-2

VIII-3

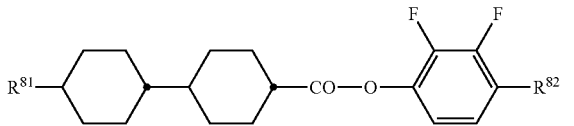

in which the parameters have the respective meanings given above under formula VIII, and preferably $R^{81}$ denotes vinyl, 1-E-propenyl, but-4-en-1-yl, pent-1-en-1-yl or pent-3-en-1-yl, ethyl, n-propyl or n-pentyl, alkyl, preferably ethyl, n-propyl or n-pentyl and $R^{82}$ denotes an unsubstituted alkyl radical having 1 to 7 C atoms, preferably having 1 to 5 C atoms or an unsubstituted alkoxy radical having 1 to 6 C atoms.

In formulae VIII-1 and VIII-2 $R^{82}$ denotes preferably alkoxy having 2 or 4 C atoms and, most preferably, ethoxy and in formula VIII-3 it denotes preferably alky, preferably methyl, ethyl or n-propyl, most preferably methyl.

In a further preferred embodiment, the medium comprises one or more compounds of formula IV, preferably of formula IVa IVa

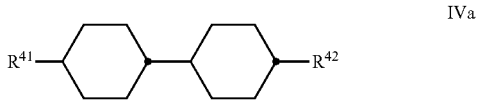

in which $R^{41}$ denotes an unsubstituted alkyl radical having 1 to 7 C atoms or an unsubstituted alkenyl radical having 2 to 7 C atoms, preferably an n-alkyl radical, particularly preferably having 2, 3, 4 or 5 C atoms, and $R^{42}$ denotes an unsubstituted alkyl radical having 1 to 7 C atoms, an unsubstituted alkenyl radical having 2 to 7 C atoms, or an unsubstituted alkoxy radical having 1 to 6 C atoms, both preferably having 2 to 5 C atoms, an unsubstituted alkenyl radical preferably having 2, 3 or 4 C atoms, more preferably a vinyl radical or 1-propenyl radical and in particular a vinyl radical.

In a particularly preferred embodiment, the medium comprises one or more compounds of formula IV selected from the group of the compounds of the formulae IV-1 to IV-4, preferably of formula IV-1,

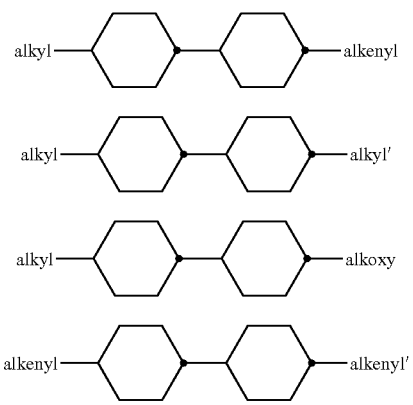

in which
- alkyl and alkyl', independently of one another, denote alkyl having 1 to 7 C atoms, preferably having 2 to 5 C atoms,
- alkenyl and alkenyl', independently of one another, denote alkenyl having 2 to 5 C atoms, preferably having 2 to 4 C atoms, particularly preferably 2 C atoms,
- alkenyl' preferably denotes alkenyl having 2 to 5 C atoms, preferably having 2 to 4 C atoms, particularly preferably having 2 to 3 C atoms, and
- alkoxy denotes alkoxy having 1 to 5 C atoms, preferably having 2 to 4 C atoms.

In a particularly preferred embodiment, the media according to the invention comprise one or more compounds of formula IV-1 and/or one or more compounds of formula IV-2.

In a further preferred embodiment, the medium comprises one or more compounds of formula V.

The media according to the invention preferably comprise the following compounds in the total concentrations indicated:
- 1-60% by weight of one or more compounds selected from the group of the compounds of formula X and
- 1-60% by weight of one or more compounds selected from the group of the compounds of formula B and
- 0-60% by weight of one or more compounds of formula I, preferably selected from the group of the compounds of the formulae I-1 and 1-2, most preferably of formula I-2 and/or
- 5-60% by weight of one or more compounds of formula II, preferably selected from the group of the compounds of the formulae II-1 and II-2 and/or
- 5-25% by weight of one or more compounds of formula III, and/or
- 5-45% by weight of one or more compounds of formula IV, and/or
- 5-25% by weight of one or more compounds of formula V, and/or
- 5-25% by weight of one or more compounds of formula VI, and/or
- 5-20% by weight of one or more compounds of formula VII, and/or
- 5-30% by weight of one or more compounds of formula VIII, preferably selected from the group of the compounds of the formulae VIII-1 and VIII-2 and/or
- 0-60% by weight of one or more compounds of formula IX where the total content of all compounds of formula X, of formula B and of formulae I to IX, which are present in the medium, preferably is 95% or more, more preferably 97% or more and, most preferably, 100%.

The latter condition holds for all media according to the present application.

In a further preferred embodiment, the media in accordance with the present invention in addition to the compounds of formula X or the preferred sub-formulae thereof, and to the compounds of formulae II and/or III and/or VI and/or VII and/or VIII and/or IX and/or I and/or B, preferably comprise one or more dielectrically neutral compounds selected from the group of compounds of formulae IV and V preferably in a total concentration in the range from 5% or more to 90% or less, preferably from 10% or more to 80% or less, particularly preferably from 20% or more to 70% or less.

The medium according to the invention in a particularly preferred embodiment comprises
- one or more compounds of formula X in a total concentration in the range from 3% or more to 50% or less, preferably in the range from 5% or more to 30% or less, and
- one or more compounds of formula B in a total concentration in the range from 3% or more to 50% or less, preferably in the range from 5% or more to 30% or less, and
- one or more compounds of formula I in a total concentration in the range from 3% or more to 50% or less, preferably in the range from 5% or more to 30% or less, and/or
- one or more compounds of formula II in a total concentration in the range from 5% or more to 50% or less, preferably in the range from 10% or more to 40% or less, and/or
- one or more compounds of formula VII-1 in a total concentration in the range from 5% or more to 30% or less, and/or
- one or more compounds of formula VII-2 in a total concentration in the range from 3% or more to 30% or less.

Preferably the concentration of the compounds of formula X in the media according to the invention is in the range from 1% or more to 60% or less, more preferably from 5% or more to 40% or less, most preferably from 8% or more to 35% or less.

Preferably the concentration of the compounds of formulae B in the media according to the invention is in the range from 1% or more to 60% or less, more preferably from 5% or more to 40% or less, most preferably from 8% or more to 35% or less.

Preferably the concentration of the compounds of formulae S in the media according to the invention is in the range from 1% or more to 60% or less, more preferably from 5% or more to 40% or less, most preferably from 8% or more to 35% or less.

In a preferred embodiment of the present invention the concentration of the compounds of formula I in the media according to the invention is in the range from 1% or more to 60% or less, more preferably from 5% or more to 40% or less, most preferably from 8% or more to 35% or less In a preferred embodiment of the present invention the concentration of the compounds of formula II in the media is in the range from 3% or more to 60% or less, more preferably from 5% or more to 55% or less, more preferably from 10% or more to 50% or less and, most preferably, from 15% or more to 45% or less.

In a preferred embodiment of the present invention the concentration of the compounds of formula VII in the media is in the range from 2% or more to 50% or less, more preferably from 5% or more to 40% or less, more preferably from 10% or more to 35% or less and, most preferably, from 15% or more to 30% or less.

In a preferred embodiment of the present invention the concentration of the compounds of formula VII-1 in the media is in the range from 1% or more to 40% or less, more preferably either from 2% or more to 35% or less, or, alternatively, from 15% or more to 25% or less.

In a preferred embodiment of the present invention the concentration of the compounds of formula VII-2 in the media, if present, is in the range from 1% or more to 40% or less, more preferably from 5% or more to 35% or less and, most preferably, from 10% or more to 30% or less.

The present invention also relates to electro-optical displays or electro-optical components which contain liquid-crystalline media according to the invention. Preference is given to electro-optical displays which are based on the VA, ECB, IPS or FFS effect, preferably on the VA, IPS or FFS effect, and in particular those which are addressed by means of an active-matrix addressing device.

Accordingly, the present invention likewise relates to the use of a liquid-crystalline medium according to the invention in an electro-optical display or in an electro-optical component, and to a process for the preparation of the liquid-crystalline media according to the invention, characterised in that one or more compounds of formula B are mixed with one or more compounds of formula I, preferably with one or more compounds of the sub-formulae I-1 and/or I-2, preferably of formula I-2 and/or one or more compounds of formula II, preferably with one or more compounds of the sub-formulae II-1 and/or II-2 with one or more compounds of formula VII, preferably with one or more compounds of the sub-formulae VII-1 and/or VII-2, particularly preferably one or more compounds from two or more, preferably from three or more, different formulae thereof and very particularly preferably from all four of these formulae II-1, II-2, VII-1 and VII-2 and one or more further compounds, preferably selected from the group of the compounds of the formulae IV and V, more preferably with one or more compounds both of formula IV and of formula V.

In a further preferred embodiment, the medium comprises one or more compounds of formula IV, selected from the group of the compounds of the formulae IV-2 and IV-3,

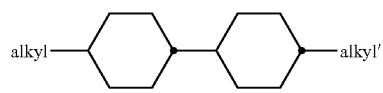

IV-2

IV-3 in which
alkyl and alkyl', independently of one another, denote alkyl having 1 to 7 C atoms, preferably having 2 to 5 C atoms,
alkoxy denotes alkoxy having 1 to 5 C atoms, preferably having 2 to 4 C atoms.

In a further preferred embodiment, the medium comprises one or more compounds of formula V selected from the group of the compounds of the formulae V-1 and V-2, preferably of formulae V-1,

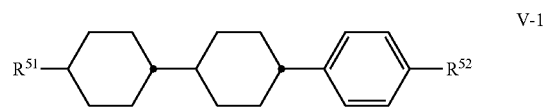

V-1

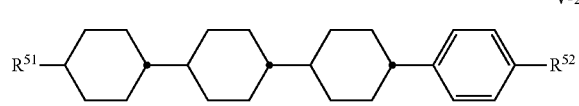

V-2 in which the parameters have the meanings given above under formula V, and preferably
$R^{51}$ denotes alkyl having 1 to 7 C atoms or alkenyl having 2 to 7 C atoms, and
$R^{52}$ denotes alkyl having 1 to 7 C atoms, alkenyl having 2 to 7 C atoms or alkoxy having 1 to 6 C atoms, preferably alkyl or alkenyl, particularly preferably alkyl.

In a further preferred embodiment, the medium comprises one or more compounds of formula V-1 selected from the group of the compounds of the formulae V-1a and V-1b,

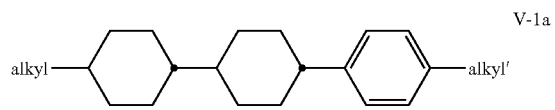

V-1a

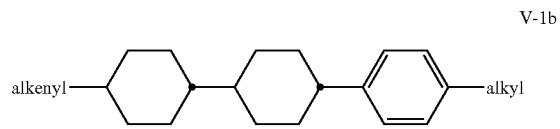

V-1b in which
alkyl and alkyl', independently of one another, denote alkyl having 1 to 7 C atoms, preferably having 2 to 5 C atoms, and
alkenyl denotes alkenyl having 2 to 7 C atoms, preferably having 2 to 5 C atoms.

In addition, the present invention relates to a method for the reduction of the wavelength dispersion of the birefringence of a liquid-crystalline medium which comprises one or more compounds of formula II, optionally one or more compounds selected from the group of the compounds of the formulae VII-1 and VII-2 and/or one or more compounds of formula IV and/or one or more compounds of formula V, characterised in that one or more compounds of formula B are used in the medium.

Besides compounds of the formulae X, B and I to IX, other constituents may also be present, for example in an amount of up to 45%, but preferably up to 35%, in particular up to 10%, of the mixture as a whole.

The media according to the invention may optionally also comprise a dielectrically positive component, whose total concentration is preferably 20% or less, more preferably 10% or less, based on the entire medium.

In a preferred embodiment, the liquid-crystal media according to the invention comprise in total, based on the mixture as a whole,
1% or more to 20% or less, preferably 2% or more to 15% or less, particularly preferably 3% or more to 12% or less, of the compound of formula X, and/or
1% or more to 20% or less, preferably 2% or more to 15% or less, particularly preferably 3% or more to 12% or less, of the compound of formula B, and/or 1% or more to 20% or less, preferably 2% or more to 15% or less, particularly preferably 3% or more to 12% or less, of the compound of formula S, and/or 1% or more to 20% or less, preferably 2% or more to 15% or less, particularly preferably 3% or more to 12% or less, of the compound of formula I, and/or 20% or more to 50% or less, preferably 25% or more to 45% or less, particularly preferably 30% or more to 40% or less, of compounds of formulae II and/or III, and/or 0% or more to 35% or less, preferably 2% or more to 30% or less, particularly preferably 3% or more to 25% or less, of compounds of formulae IV and/or V, and/or 5% or more to 50% or less 10% or more to 45% or less, preferably 15% or more to 40% or less of compounds of the formulae VI and/or VII and/or VIII and/or IX.

The liquid-crystal media in accordance with the present invention may comprise one or more chiral compounds.

Particularly preferred embodiments of the present invention meet one or more of the following conditions, where the acronyms (abbreviations) are explained in Tables A to C and illustrated by examples in Table D.

Preferably the media according to the present invention fulfil one or more of the following conditions.

i. The liquid-crystalline medium has a birefringence of 0.060 or more, particularly preferably 0.070 or more.
ii. The liquid-crystalline medium has a birefringence of 0.200 or less, particularly preferably 0.180 or less.
iii. The liquid-crystalline medium has a birefringence in the range from 0.090 or more to 0.160 or less.
iv. The liquid-crystalline medium comprises one or more particularly preferred compounds of formula X, preferably selected from the (sub-) formulae X-1 and X-2, most preferably of (sub-)formula(e) X-1-1 and/or X-2-2 and/or X-2-3 X-2-4 and/or X-2-5.
v. The liquid-crystalline medium comprises one or more particularly preferred compounds of formula B, preferably selected from the (sub-) formulae B-1 and B-2, most preferably of (sub-)formula B-2.
vi. The liquid-crystalline medium comprises one or more particularly preferred compounds of formula S, preferably selected from the (sub-) formulae S-1 and S-2, most preferably of (sub-)formula S-2.
vii. The liquid-crystalline medium comprises one or more particularly preferred compounds of formula I, preferably selected from the (sub-) formulae I-1 and I-2, most preferably of (sub-)formula I-2.
viii. The total concentration of the compounds of formula II in the mixture as a whole is 25% or more, preferably 30% or more, and is preferably in the range from 25% or more to 49% or less, particularly preferably in the range from 29% or more to 47% or less, and very particularly preferably in the range from 37% or more to 44% or less.
ix. The liquid-crystalline medium comprises one or more compounds of formula IV selected from the group of the compounds of the following formulae: CC-n-V and/or CC-n-Vm and/or CC-V-V and/or CC-V-Vn and/or CC-nV-Vn, particularly preferably CC-3-V, preferably in a concentration of up to 60% or less, particularly preferably up to 50% or less, and optionally additionally CC-3-V1, preferably in a concentration of up to 15% or less, and/or CC-4-V, preferably in a concentration of up to 40% or less, particularly preferably up to 30% or less.
x. The media comprise the compound of formula CC-n-V, preferably CC-3-V, preferably in a concentration of 1% or more to 60% or less, more preferably in a concentration of 3% or more to 35% or less.
xi. The total concentration of the compounds of formula CC-3-V in the mixture as a whole preferably either is 15% or less, preferably 10% or less or 20% or more, preferably 25% or more.
xii. The total concentration of the compounds of formula Y-nO-Om in the mixture as a whole is 2% or more to 30% or less, preferably 5% or more to 15% or less.
xiii. The total concentration of the compounds of formula CY-n-Om in the mixture as a whole is 5% or more to 60% or less, preferably 15% or more to 45% or less.
xiv. The total concentration of the compounds of formula CCY-n-Om and/or CCY-n-m, preferably of CCY-n-Om, in the mixture as a whole is 5% or more to 40% or less, preferably 1% or more to 25% or less.
xv. The total concentration of the compounds of formula CLY-n-Om in the mixture as a whole is 5% or more to 40% or less, preferably 10% or more to 30% or less.
xvi. The liquid-crystalline medium comprises one or more compounds of formula IV, preferably of the formulae IV-1 and/or IV-2, preferably in a total concentration of 1% or more, in particular 2% or more, and very particularly preferably 3% or more to 50% or less, preferably 35% or less.
xvii. The liquid-crystalline medium comprises one or more compounds of formula V, preferably of the formulae V-1 and/or V-2, preferably in a total concentration of 1% or more, in particular 2% or more, and very particularly preferably 15% or more to 35% or less, preferably to 30% or less.
xviii. The total concentration of the compounds of formula CCP-V-n, preferably CCP-V-1, in the mixture as a whole preferably is 5% or more to 30% or less, preferably 15% or more to 25% or less.
xix. The total concentration of the compounds of formula CCP-V2-n, preferably CCP-V2-1, in the mixture as a whole preferably is 1% or more to 15% or less, preferably 2% or more to 10% or less.

The invention furthermore relates to an electro-optical display having active-matrix addressing based on the VA, ECB, IPS, FFS or UB-FFS effect, characterised in that it contains, as dielectric, a liquid-crystalline medium in accordance with the present invention.

The liquid-crystal mixture preferably has a nematic phase range having a width of at least 70 degrees.

The rotational viscosity $\gamma_1$ is preferably 350 mPa·s or less, preferably 250 mPa·s or less and, in particular, 150 mPa·s or less.

The mixtures according to the invention are suitable for all IPS and FFS-TFT applications using dielectrically positive liquid crystalline media, such as, e.g. SG-FFS.

The liquid-crystalline media according to the invention preferably virtually completely consist of 4 to 15, in particular 5 to 12, and particularly preferably 10 or less, compounds. These are preferably selected from the group of the compounds of the formulae X, B, I, II, III, IV, V, VI, VII, VIII and IX.

The liquid-crystalline media according to the invention may optionally also comprise more than 18 compounds. In this case, they preferably comprise 18 to 25 compounds.

In a preferred embodiment, the liquid-crystal media according to the invention predominantly comprise, preferably essentially consist of and, most preferably, virtually completely consist of compounds, which do not comprise a cyano group.

In a preferred embodiment, the liquid-crystal media according to the invention comprise compounds selected from the group of the compounds of the formulae X, B, I, II, and II, IV and V and VI to IX, preferably selected from the group of the compounds of the formulae XA, XB, B-1, B-2, I-1, I-2, II-1, II-2, III-1, III-2, IV, V, VII-1, VII-2, VIII and IX; they preferably consist predominantly, particularly preferably essentially and very particularly preferably virtually completely of the compounds of the said formulae.

The liquid-crystal media according to the invention preferably have a nematic phase from in each case at least −10° C. or less to 70° C. or more, particularly preferably from −20° C. or less to 80° C. or more, very particularly preferably from −30° C. or less to 85° C. or more and most preferably from −40° C. or less to 90° C. or more.

The expression "have a nematic phase" here means on the one hand that no smectic phase and no crystallisation are observed at low temperatures at the corresponding temperature and on the other hand that no clearing occurs on heating out of the nematic phase. The investigation at low temperatures is carried out in a flow viscometer at the corresponding temperature and checked by storage in test cells having a cell thickness corresponding to the electro-optical application for at least 100 hours. If the storage stability at a temperature of −20° C. in a corresponding test cell is 1,000 h or more, the medium is regarded as stable at this temperature. At temperatures of −30° C. and −40° C., the corresponding times are 500 h and 250 h respectively. At high temperatures, the clearing point is measured in capillaries by conventional methods.

In a preferred embodiment, the liquid-crystal media according to the invention are characterised by optical anisotropy values in the moderate to low range. The birefringence values are preferably in the range from 0.075 or more to 0.130 or less, particularly preferably in the range from 0.085 or more to 0.120 or less and very particularly preferably in the range from 0.090 or more to 0.115 or less.

In this embodiment, the liquid-crystal media according to the invention have a positive dielectric anisotropy and relatively high absolute values of the dielectric anisotropy $\Delta\varepsilon$, which preferably is in the range from 2.0 or more to 20 or less, more preferably to 15 or less, more preferably from 3.0 or more to 10 or less, particularly preferably from 4.0 or more to 9.0 or less and very particularly preferably from 4.5 or more to 8.0 or less.

The liquid-crystal media according to the invention preferably have relatively low values for the threshold voltage ($V_0$) in the range from 1.0 V or more to 5.0 V or less, preferably to 2.5 V or less, preferably from 1.2 V or more to 2.2 V or less, particularly preferably from 1.3 V or more to 2.0 V or less.

In a further preferred embodiment, the liquid-crystal media according to the invention preferably have relatively high values of the average dielectric constant ($\varepsilon_{av.} \equiv (\varepsilon_{\parallel} + 2\varepsilon_{\perp})/3$) which are preferably in the range from 8.0 or more to 25.0 or less, preferably from 8.5 or more to 20.0 or less, still more preferably from 9.0 or more to 19.0 or less, particularly preferably from 10.0 or more to 18.0 or less and very particularly preferably from 11.0 or more to 16.5 or less.

In addition, the liquid-crystal media according to the invention have high values for the VHR in liquid-crystal cells.

In freshly filled cells at 20° C. in the cells, the values of the VHR of these media are greater than or equal to 95%, preferably greater than or equal to 97%, particularly preferably greater than or equal to 98% and very particularly preferably greater than or equal to 99%, and after 5 minutes in the oven at 100° C. in the cells, these are greater than or equal to 90%, preferably greater than or equal to 93%, particularly preferably greater than or equal to 96% and very particularly preferably greater than or equal to 98%.

In general, liquid-crystal media having a low addressing voltage or threshold voltage here have a lower VHR than those having a higher addressing voltage or threshold voltage, and vice versa.

These preferred values for the individual physical properties are preferably also in each case maintained by the media according to the invention in combination with one another.

In the present application, the term "compounds", also written as "compound(s)", means both one and also a plurality of compounds, unless explicitly indicated otherwise.

In a preferred embodiment, the liquid-crystalline media according to the invention comprise one or more compounds of formula X, and one or more compounds of formula B, preferably selected from the group of formulae CB-n-F, CB-n-OT, CB-n-T, LB-n-F, LB-n-OT and LB-n-T, more preferably selected from the group of formulae CB-n-OT, CB-n-T, LB-n-OT and LB-n-T, preferably selected from the group of formulae CB-n-OT, CB-n-T, and/or one or more compounds of formula I, preferably selected from the group of the formulae B-nO-Om, B(S)-nO-Om, B-nO-OT, B-nO-T, B-n-OT and B-n-F, more preferably selected from the group of formulae B-nO-OT, B-nO-T, B-n-OT and B-n-F, and/or one or more compounds of formula II, preferably selected from the group of formulae PUQU-n-F, CDUQU-n-F, APUQU-n-F and PGUQU-n-F, and/or one or more compounds of formula III, preferably selected from the group of formulae CCP-n-OT, CGG-n-F, and CGG-n-OD, and/or one or more compounds of formulae IV and/or V, preferably selected from the group of formulae CC-n-V, CCP-n-m, CCP-V-n, CCP-V2-n and CGP-n-n and/or one or more compounds of formula VI, preferably selected from the group of formulae Y-n-Om, Y-nO-Om and/or CY-n-Om, preferably selected from the group of the compounds of the formulae Y-3-O1, Y-4O-O4, CY-3-O2, CY-3-O4, CY-5-O2 and CY-5-O4, and/or optionally, preferably obligatorily, one or more compounds of formula VII-1, preferably selected from the group of compounds of the formulae CCY-n-m and CCY-n-Om, preferably of formula CCY-n-Om, preferably selected from the group of the compounds of the formulae CCY-3-O2, CCY-2-O2, CCY-3-O1, CCY-3-O3, CCY-4-O2, CCY-3-O2 and CCY-5-O2, and/or optionally, preferably obligatorily, one or more compounds of formula VII-2, preferably of formula CLY-n-Om, preferably selected from the group of the compounds of the formulae CLY-2-O4, CLY-3-O2, CLY-3-O3, and/or one or more compounds of formula VIII, preferably selected from the group of formulae CZY-n-On and CCOY-n-m and/or one or more compounds of formula IX, preferably selected from the group of formulae PYP-n-m, PYP-n-mVI and PYP-n-mVI, preferably selected from the group of formulae PYP-2-3, PYP-2-4, PYP-2-5, PYP-2-V and PYP-2-2V1, and/or one or more compounds selected from the group of formulae PGP-n-m, PGP-n-V, PGP-n-Vm, PGP-n-mV and PGP-n-mVI, preferably selected from the group of formulae PGP-2-3, PGP-2-4, PGP-2-5, PGP-1-V, PGP-2-V and PGP-2-2V1, and/or optionally, preferably obligatorily, one or more compounds of formula IV, preferably selected from the group of the compounds of the formulae CC-n-V, CC-n-Vm, CC-n-mVI and CC-nV-Vm, preferably CC-3-V, CC-3-V1, CC-4-V, CC-5-V, CC-3-2V1 and CC-V-V, particularly preferably selected from the group of the compounds CC-3-V, CC-3-V1, CC-4-V, CC-3-2V1 and CC-V-V, very particularly preferably the compound CC-3-V, and optionally additionally the compound(s) CC-4-V and/or CC-3-V1 and/or CC-3-2V1 and/or CC-V-V, and/or optionally, preferably obligatorily, one or more compounds of formula V, preferably selected from the group of formulae CCP-V-1 and/or CCP-V2-1.

In a specific preferred embodiment of the present invention, the media according to the invention comprise one or more compounds of formula IX, The compounds of formula IX, are also highly suitable as stabilisers in liquid-crystal mixtures, especially in case $p=q=1$ and ring $A^9=1,4$-phenylene. In particular, they stabilise the VHR of the mixtures against UV exposure.

In a preferred embodiment the media according to the invention comprise one or more compounds of formula IX selected from one or more formulae of the group of the compounds of the formulae IX-1 to IX-4, very particularly preferably of the formulae IX-1 to IX-3,

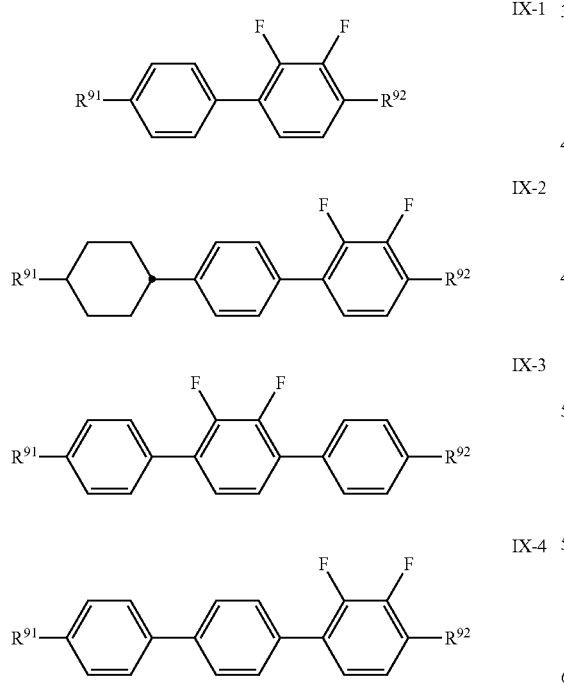

in which the parameters have the meanings given under formula IX.

In a further preferred embodiment, the medium comprises one or more compounds of formula IX-3, preferably of formula IX-3-a,

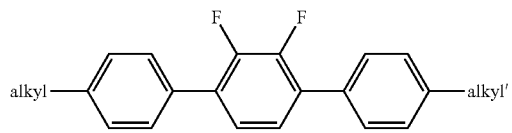

in which alkyl and alkyl', independently of one another, denote alkyl having 1 to 7 C atoms, preferably having 2 to 5 C atoms.

In case the compounds of formula IX are used in the liquid crystalline media according to the present application, they are preferably present in a concentration of 20% or less, more preferably of 10% or less and, most preferably, of 5% or less and for the individual i.e. (homologous) compounds preferably in a concentration of 10% or less and, more preferably, of 5% or less.

For the present invention, the following definitions apply in connection with the specification of the constituents of the compositions, unless indicated otherwise in individual cases:

"comprise": the concentration of the constituents in question in the composition is preferably 5% or more, particularly preferably 10% or more, very particularly preferably 20% or more, "predominantly consist of": the concentration of the constituents in question in the composition is preferably 50% or more, particularly preferably 55% or more and very particularly preferably 60% or more, "essentially consist of": the concentration of the constituents in question in the composition is preferably 80% or more, particularly preferably 90% or more and very particularly preferably 95% or more, and "virtually completely consist of": the concentration of the constituents in question in the composition is preferably 98% or more, particularly preferably 99% or more and very particularly preferably 100.0%.

This applies both to the media as compositions with their constituents, which can be components and compounds, and also to the components with their constituents, the compounds. Only in relation to the concentration of an individual compound relative to the medium as a whole does the term comprise mean: the concentration of the compound in question is preferably 1% or more, particularly preferably 2% or more, very particularly preferably 4% or more.

For the present invention, "≤" means less than or equal to, preferably less than, and "≥" means greater than or equal to, preferably greater than.

For the present invention

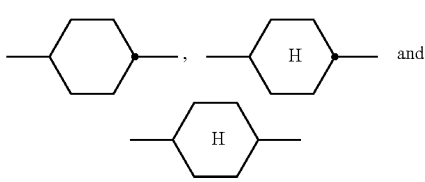

denote trans-1,4-cyclohexylene,

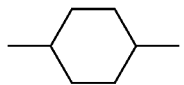

denotes a mixture of both cis- and trans-1,4-cyclohexylene,
and

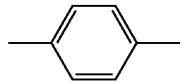 and 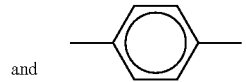

denote 1,4-phenylene.

For the present invention, the expression "dielectrically positive compounds" means compounds having a Δε of >1.5, the expression "dielectrically neutral compounds" means those where −1.5≤Δε≤1.5 and the expression "dielectrically negative compounds" means those where Δε<−1.5. The dielectric anisotropy of the compounds is determined here by dissolving 10% of the compounds in a liquid-crystalline host and determining the capacitance of the resultant mixture in each case in at least one test cell having a cell thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

The host mixture used for dielectrically positive and dielectrically neutral compounds is ZLI-4792 and that used for dielectrically negative compounds is ZLI-2857, both from Merck KGaA, Germany. The values for the respective compounds to be investigated are obtained from the change in the dielectric constant of the host mixture after addition of the compound to be investigated and extrapolation to 100% of the compound employed. The compound to be investigated is dissolved in the host mixture in an amount of 10%. If the solubility of the substance is too low for this purpose, the concentration is halved in steps until the investigation can be carried out at the desired temperature.

The liquid-crystal media according to the invention may, if necessary, also comprise further additives, such as, for example, stabilisers and/or pleochroitic, e.g. dichroitic, dyes and/or chiral dopants in the usual amounts.

The amount of these additives employed is preferably in total 0% or more to 10% or less, based on the amount of the entire mixture, particularly preferably 0.1% or more to 6% or less. The concentration of the individual compounds employed is preferably 0.1% or more to 3% or less. The concentration of these and similar additives is generally not taken into account when specifying the concentrations and concentration ranges of the liquid-crystal compounds in the liquid-crystal media.

In a preferred embodiment, the liquid-crystal media according to the invention comprise a polymer precursor which comprises one or more reactive compounds, preferably reactive mesogens, and, if necessary, also further additives, such as, for example, polymerisation initiators and/or polymerisation moderators in the usual amounts. The amount of these additives employed is in total 0% or more to 10% or less, based on the amount of the entire mixture, preferably 0.1% or more to 2% or less. The concentration of these and similar additives is not taken into account when specifying the concentrations and concentration ranges of the liquid-crystal compounds in the liquid-crystal media.

The compositions consist of a plurality of compounds, preferably 3 or more to 30 or fewer, particularly preferably 6 or more to 20 or fewer and very particularly preferably 10 or more to 16 or fewer compounds, which are mixed in a conventional manner. In general, the desired amount of the components used in lesser amount is dissolved in the components making up the principal constituent of the mixture. This is advantageously carried out at elevated temperature. If the selected temperature is above the clearing point of the principal constituent, completion of the dissolution operation is particularly easy to observe. However, it is also possible to prepare the liquid-crystal mixtures in other conventional ways, for example using pre-mixes or from a so-called "multi-bottle system".

The mixtures according to the invention exhibit very broad nematic phase ranges having clearing points of 65° C. or more, very favourable values for the capacitive threshold, relatively high values for the holding ratio and at the same time very good low-temperature stabilities at −30° C. and −40° C.

Furthermore, the mixtures according to the invention are distinguished by low rotational viscosities γ1.

It goes without saying to the person skilled in the art that the media according to the invention for use in VA, IPS, FFS or PALC displays may also comprise compounds in which, for example, H, N, O, Cl, F have been replaced by the corresponding isotopes.

The structure of the liquid-crystal displays according to the invention corresponds to the usual geometry, as described, for example, in EP-A 0 240 379.

The liquid-crystal phases according to the invention can be modified by means of suitable additives in such a way that they can be employed in any type of, for example, IPS and FFS LCD display that has been disclosed to date.

Table E below indicates possible dopants which can be added to the mixtures according to the invention. If the mixtures comprise one or more dopants, it is (they are) employed in amounts of 0.01% to 4%, preferably 0.1% to 1.0%.

Stabilisers which can be added, for example, to the mixtures according to the invention, preferably in amounts of 0.01% to 6%, in particular 0.1% to 3%, are shown below in Table F.

For the purposes of the present invention, all concentrations are, unless explicitly noted otherwise, indicated in percent by weight and relate to the corresponding mixture as a whole or mixture component, again a whole, unless explicitly indicated otherwise. In this context the term "the mixture" describes the liquid crystalline medium.

All temperature values indicated in the present application, such as, for example, the melting point T(C,N), the smectic (S) to nematic (N) phase transition T(S,N) and the clearing point T(N,I), are indicated in degrees Celsius (° C.) and all temperature differences are correspondingly indicated in differential degrees (° or degrees), unless explicitly indicated otherwise.

For the present invention, the term "threshold voltage" relates to the capacitive threshold ($V_0$), also known as the Freedericks threshold, unless explicitly indicated otherwise.

All physical properties are and have been determined in accordance with "Merck Liquid Crystals, Physical Properties of Liquid Crystals", status November 1997, Merck KGaA, Germany, and apply for a temperature of 20° C., and Δn is determined at 436 nm, 589 nm and at 633 nm, and Δε at 1 kHz, unless explicitly indicated otherwise in each case.

The electro-optical properties, for example the threshold voltage ($V_0$) (capacitive measurement), are, as is the switching behaviour, determined in test cells produced at Merck Japan. The measurement cells have soda-lime glass substrates and are constructed in an ECB or VA configuration with polyimide alignment layers (SE-1211 with diluent **26 (mixing ratio 1:1), both from Nissan Chemicals, Japan), which have been rubbed perpendicularly to one another and effect homeotropic alignment of the liquid crystals. The surface area of the transparent, virtually square ITO electrodes is 1 cm$^2$.

Unless indicated otherwise, a chiral dopant is not added to the liquid-crystal mixtures used, but the latter are also particularly suitable for applications in which doping of this type is necessary.

The rotational viscosity is determined using the rotating permanent magnet method and the flow viscosity in a modified Ubbelohde viscometer. For liquid-crystal mixtures ZLI-2293, ZLI-4792 and MLC-6608, all products from Merck KGaA, Darmstadt, Germany, the rotational viscosity values determined at 20° C. are 161 mPa·s, 133 mPa·s and 186 mPa·s respectively, and the flow viscosity values (v) are 21 mm$^2$·s$^{-1}$, 14 mm$^2$·s$^{-1}$ and 27 mm$^2$·s$^{-1}$, respectively.

The dispersion of the materials may for practical purposes be conveniently characterized in the following way, which is used throughout this application unless explicitly stated otherwise. The values of the birefringence are determined at a temperature of 20° C. at several fixed wavelengths using a modified Abbe refractometer with homeotropically aligning surfaces on the sides of the prisms in contact with the material. The birefringence values are determined at the specific wavelength values of 436 nm (respective selected spectral line of a low pressure mercury lamp), 589 nm (sodium "D" line) and 633 nm (wavelength of a HE-Ne laser (used in combination with an attenuator/diffusor in order to prevent damage to the eyes of the observers. In the following table Δn is given at 589 nm and Δ(Δn) is given as Δ(Δn) =Δn(436 nm)–Δn(633 nm)).

The following symbols are used, unless explicitly indicated otherwise:

$V_0$ threshold voltage, capacitive [V] at 20° C.,
$n_e$ extraordinary refractive index measured at 20° C. and 589 nm,
$n_o$ ordinary refractive index measured at 20° C. and 589 nm,
Δn optical anisotropy measured at 20° C. and 589 nm,
λ wavelength λ [nm],
Δn(λ) optical anisotropy measured at 20° C. and wavelength λ,
Δ(Δn) change in optical anisotropy defined as:
   Δn(20° C., 436 nm)–Δn(20° C., 633 nm),
Δ(Δn*) "relative change in optical anisotropy" defined as:
   Δ(Δn)/Δn(20° C., 589 nm),
$\varepsilon_\perp$ dielectric susceptibility perpendicular to the director at 20° C. and 1 kHz,
$\varepsilon_\parallel$ dielectric susceptibility parallel to the director at 20° C. and 1 kHz,
Δε dielectric anisotropy at 20° C. and 1 kHz,
T(N,I) or clp. clearing point [° C.],
ν flow viscosity measured at 20° C. [mm$^2$·s$^{-1}$],
$\gamma_1$ rotational viscosity measured at 20° C. [mPa·s],
$k_{11}$ elastic constant, "splay" deformation at 20° C. [pN],
$k_{22}$ elastic constant, "twist" deformation at 20° C. [pN],
$k_{33}$ elastic constant, "bend" deformation at 20° C. [pN],
LTS low-temperature stability of the phase, determined in test cells,
VHR voltage holding ratio,
ΔVHR decrease in the voltage holding ratio, and
$S_{rel}$ relative stability of the VHR, The following examples explain the present invention without limiting it. However, they show the person skilled in the art preferred mixture concepts with compounds preferably to be employed and the respective concentrations thereof and combinations thereof with one another. In addition, the examples illustrate the properties and property combinations that are accessible.

For the present invention and in the following examples, the structures of the liquid-crystal compounds are indicated by means of acronyms, with the transformation into chemical formulae taking place in accordance with Tables A to C below. All radicals $C_nH_{2n+1}$, $C_mH_{2m+1}$ and $C_lH_{2l+1}$ or $C_nH_{2n}$, $C_mH_{2m}$ and $C_lH_{2l}$ are straight-chain alkyl radicals or alkylene radicals, in each case having n, m and l C atoms respectively. Preferably n, m and l are independently of each other 1, 2, 3, 4, 5, 6, or 7. Table A shows the codes for the ring elements of the nuclei of the compound, Table B lists the bridging units, and Table C lists the meanings of the symbols for the left- and right-hand end groups of the molecules. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

Ring elements

C

D    D1

A    A1

TABLE A-continued

| Ring elements | | | |
|---|---|---|---|
| P | 1,4-phenylene | | |
| G | 2-fluoro-1,4-phenylene | Gl | 3-fluoro-1,4-phenylene |
| U | 2,6-difluoro-1,4-phenylene | Ul | 3,5-difluoro-1,4-phenylene |
| Y | 2,3-difluoro-1,4-phenylene | | |
| P(F, Cl)Y | 2-fluoro-3-chloro-1,4-phenylene | P(Cl, F)Y | 2-chloro-3-fluoro-1,4-phenylene |
| np | 2,6-naphthylene | | |
| n3f | trifluoronaphthylene | nN3fl | trifluoronaphthylene (isomer) |
| th | tetrahydronaphthylene | thl | tetrahydronaphthylene (isomer) |
| tH2f | difluorotetrahydronaphthylene | tH2fl | difluorotetrahydronaphthylene (isomer) |
| o2f | difluorochromanylene | o2fl | difluorochromanylene (isomer) |

TABLE A-continued

Ring elements dh 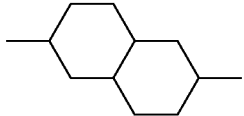

B 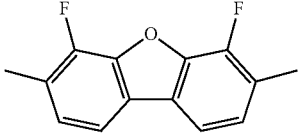  B(S) 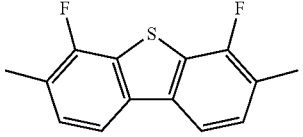

O 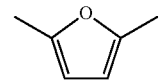  S 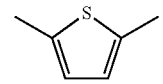

K 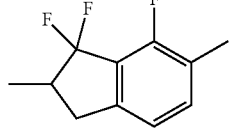  Kl 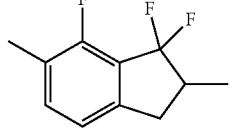

L   Ll 

F 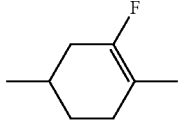  Fl 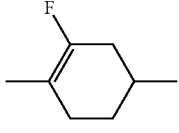

TABLE B

| | Bridging units |
|---|---|
| E | —CH$_2$—CH$_2$— |
| V | —CH=CH— |
| T | —C≡C— |
| W | —CF$_2$—CF$_2$— |
| B | —CF=CF— |

TABLE B-continued

| | Bridging units | | |
|---|---|---|---|
| Z | —CO—O— | ZI | —O—CO— |
| X | —CF=CH— | XI | —CH=CF— |
| O | —CH$_2$—O— | OI | —O—CH$_2$— |
| Q | —CF$_2$—O— | QI | —O—CF$_2$— |

TABLE C

End groups

| On the left individually or in combination | | On the right individually or in combination | |
|---|---|---|---|
| -n- | C$_n$H$_{2n+1}$— | -n | —C$_n$H$_{2n+1}$ |
| -nO- | C$_n$H$_{2n+1}$—O— | -On | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |

TABLE C-continued

| End groups | | | |
|---|---|---|---|
| On the left only in combination | | On the right only in combination | |
| -...n...- | —$C_nH_{2n}$— | -...n... | —$C_nH_{2n}$— |
| -...M...- | —CFH— | -...M... | —CFH— |
| -...D...- | —$CF_2$— | -...D... | —$CF_2$— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m are each integers, and the three dots "..." are placeholders for other abbreviations from this table.

Besides the compounds of formula B, the mixtures according to the invention preferably comprise one or more compounds of the compounds mentioned below.

The following abbreviations are used:

(n, m, k and l are, independently of one another, each an integer, preferably 1 to 9 preferably 1 to 7, k and l possibly may be also 0 and preferably are 0 to 4, more preferably 0 or 2 and most preferably 2, n preferably is 1, 2, 3, 4 or 5, in the combination "-nO-" it preferably is 1, 2, 3 or 4, preferably 2 or 4, m preferably is 1, 2, 3, 4 or 5, in the combination "-Om" it preferably is 1, 2, 3 or 4, more preferably 2 or 4. The combination "-IVm" preferably is "2V1".)

TABLE D

Exemplary, preferred compounds of formula X

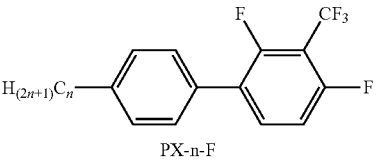

PX-n-F

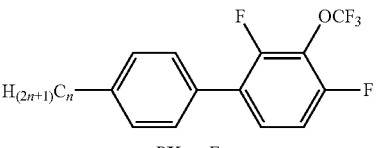

PX$_0$-n-F

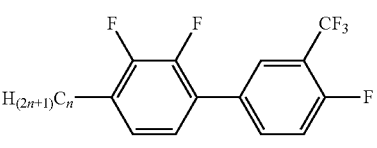

YX$^l$-n-F

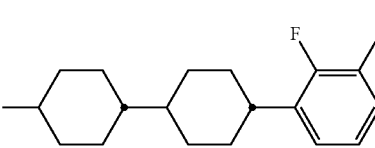

CCX-n-F

TABLE D-continued

Exemplary, preferred compounds of formula X

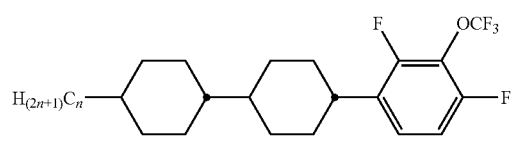

CCX$_0$-n-F

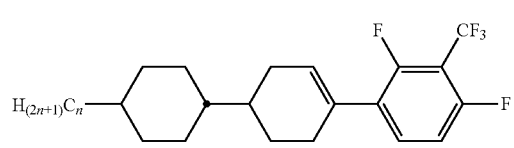

CLX-n-F

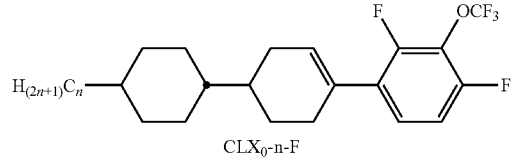

CLX$_0$-n-F

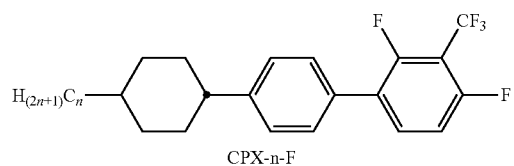

CPX-n-F

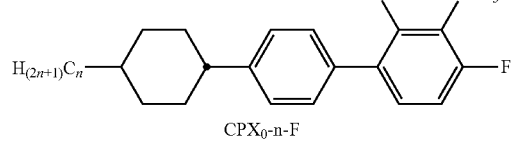

CPX$_0$-n-F

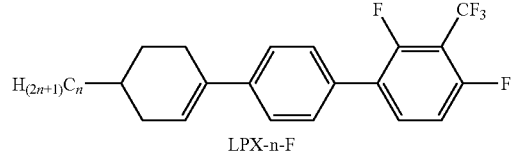

LPX-n-F

TABLE D-continued
Exemplary, preferred compounds of formula X
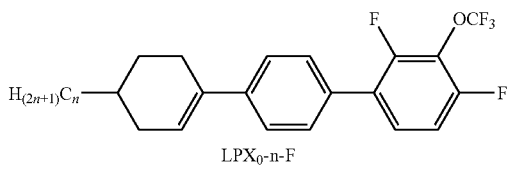
LPX₀-n-F
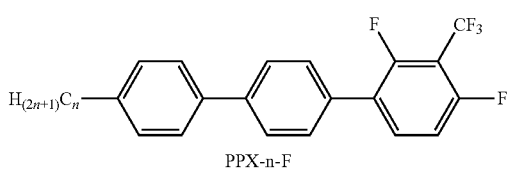
PPX-n-F
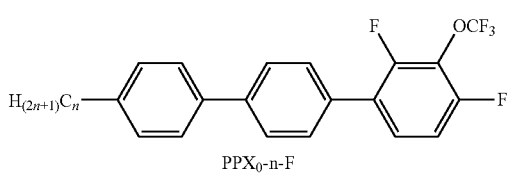
PPX₀-n-F
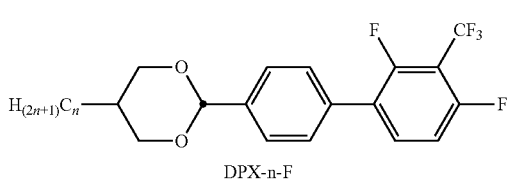
DPX-n-F
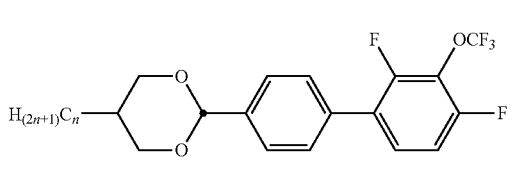
DPX₀-n-F
Exemplary, preferred compounds of formula B having a high $\varepsilon_\perp$:
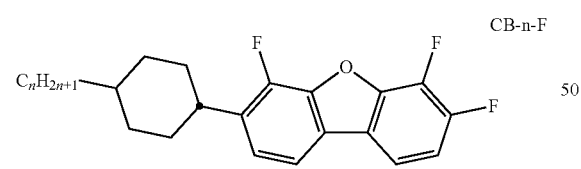
CB-n-F
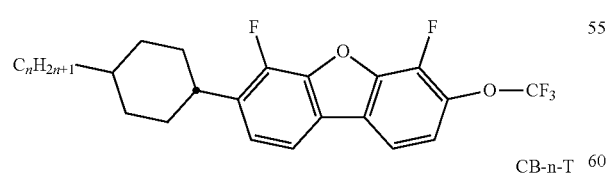
CB-n-OT
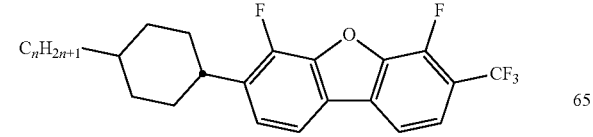
CB-n-T
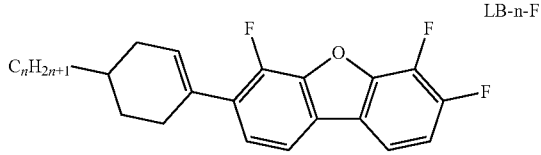
LB-n-F
LB-n-OT
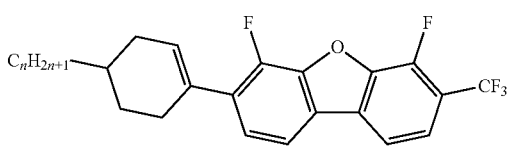
LB-n-T
Exemplary, preferred compounds of formula I having a high $\varepsilon_\perp$:
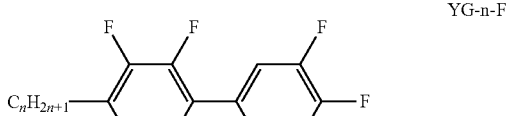
YG-n-F
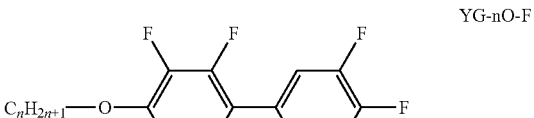
YG-nO-F
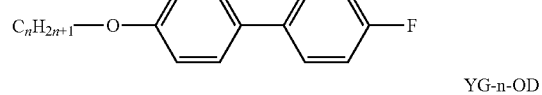
YG-n-OD
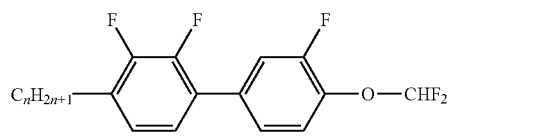
YG-nO-OD
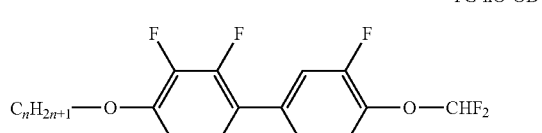
YG-n-T
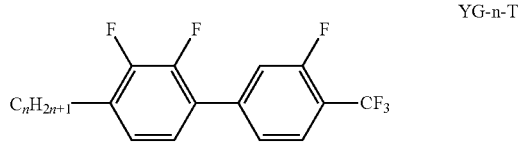
YG-nO-T
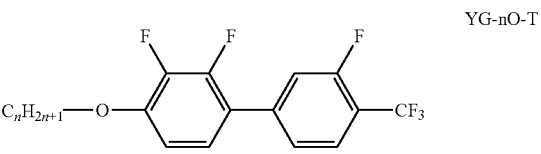

YG-n-OT
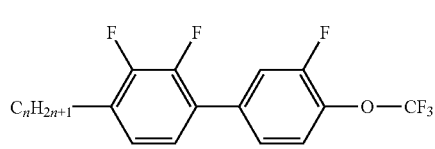
YG-nO-OT
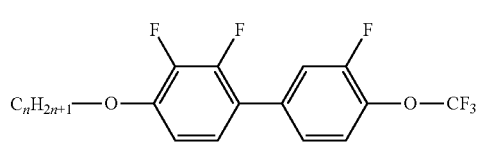
CK-n-F
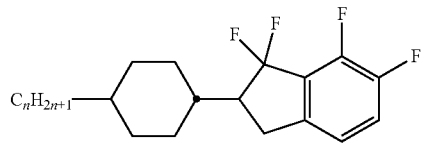
B-n-m
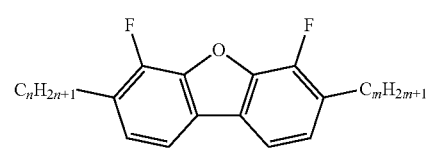
B-n-IV
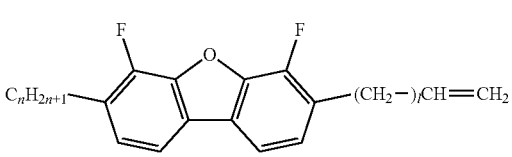
B-Vn-IV
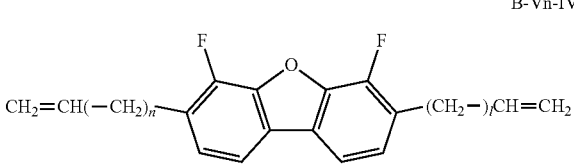
B-n-Om
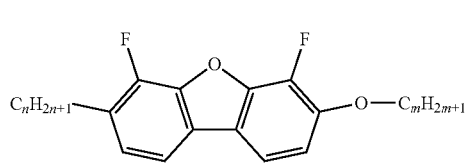
B-nO-Om
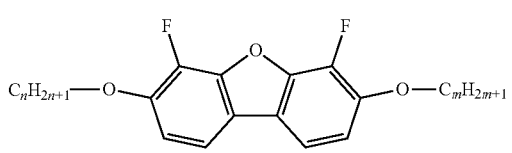
B-n-F
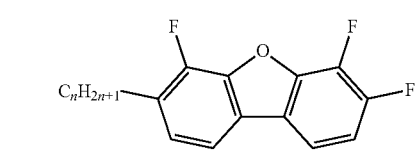
B-nO-F
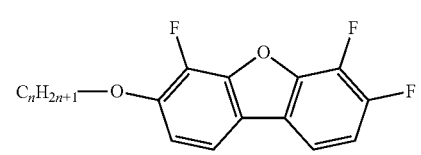
B-n-Cl
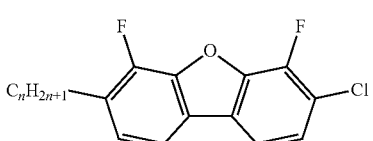
B-nO-Cl
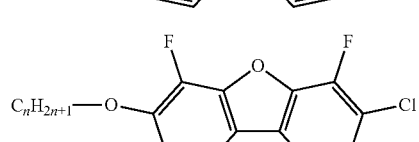
B-n-T
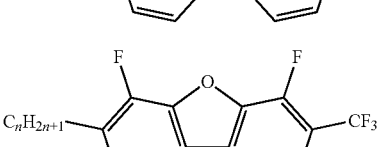
B-nO-T
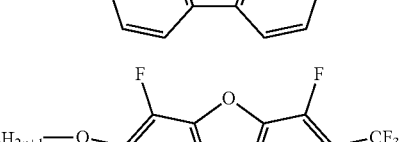
B-n-OT
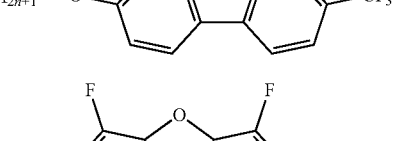
B-nO-OT
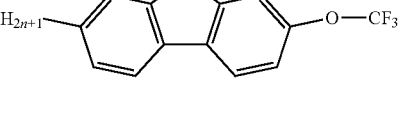
CB-n-Om
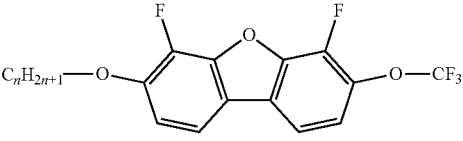
PB-n-Om
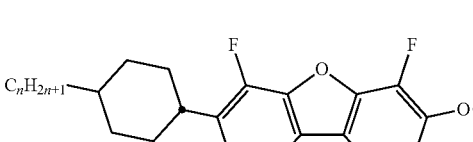
GB-n-Om
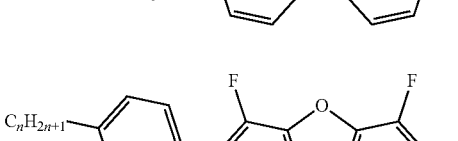
B(S)-nO-Om
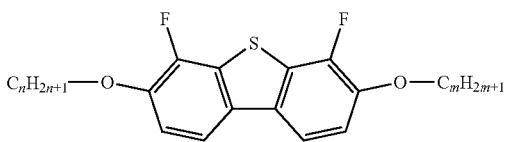

Exemplary, preferred dielectrically positive compounds
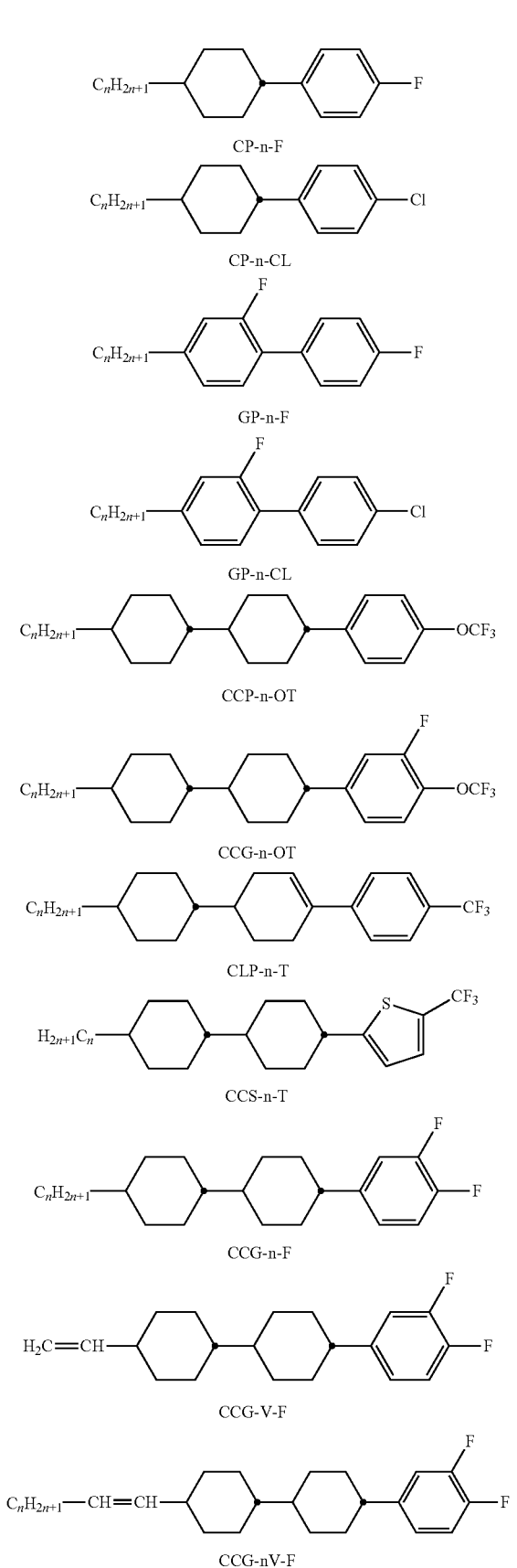
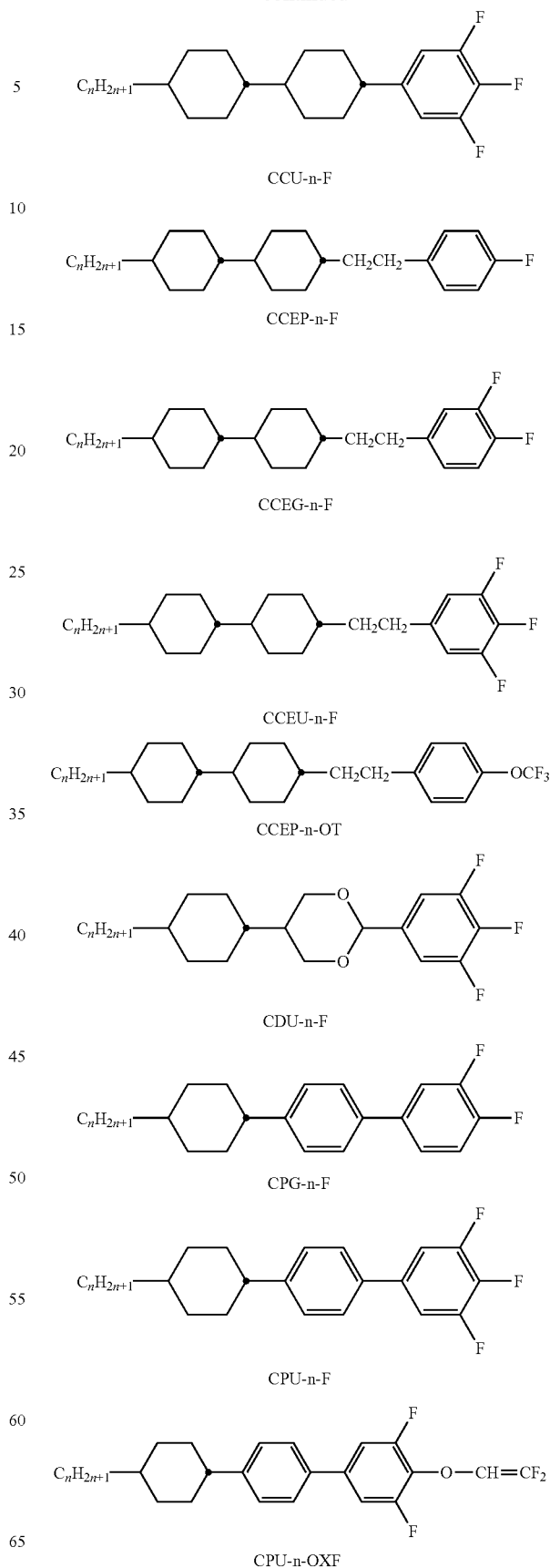

-continued
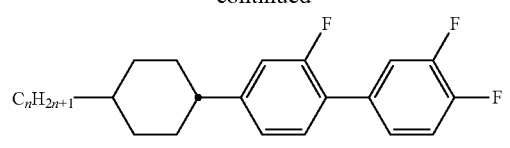
CGG-n-F
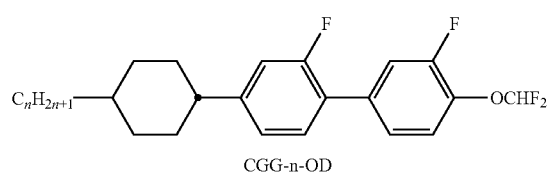
CGG-n-OD
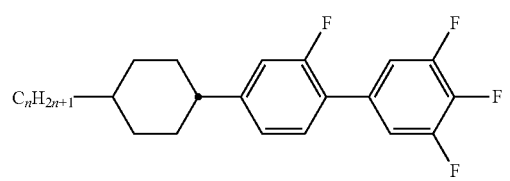
CGU-n-F
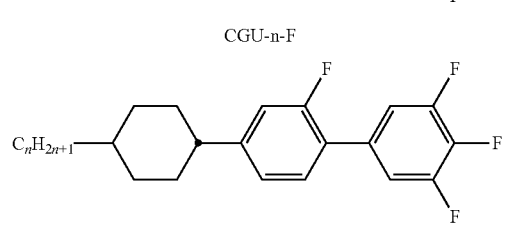
PGU-n-F
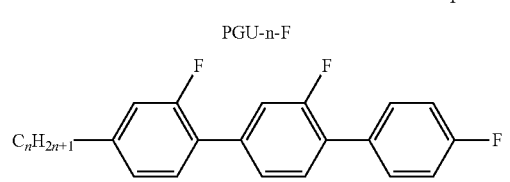
GGP-n-F
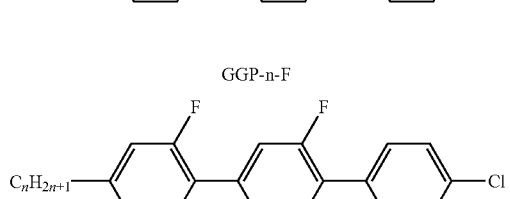
GGP-n-CL
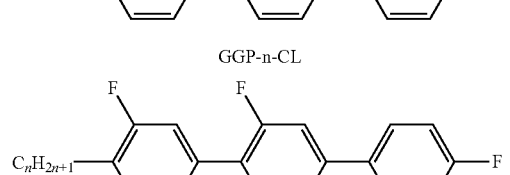
PGIGI-n-F
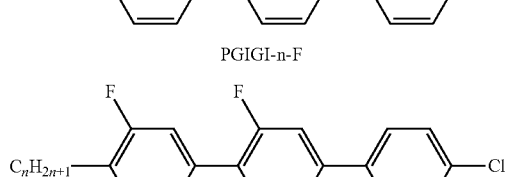
PGIGI-n-CL
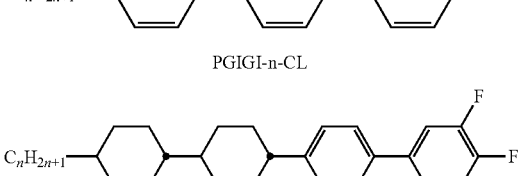
CCPU-n-F
-continued
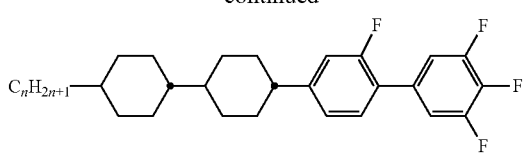
CCGU-n-F
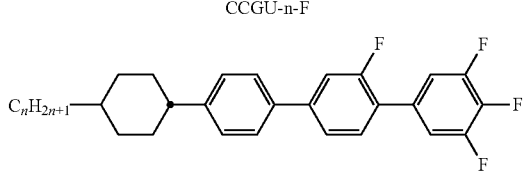
CPGU-n-F
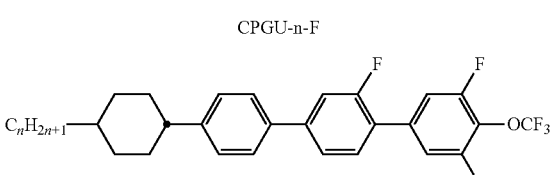
CPGU-n-OT
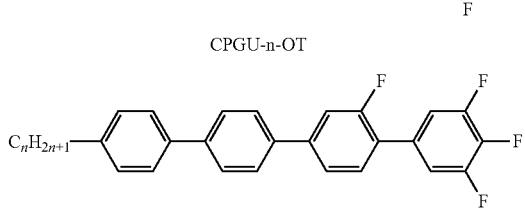
PPGU-n-F
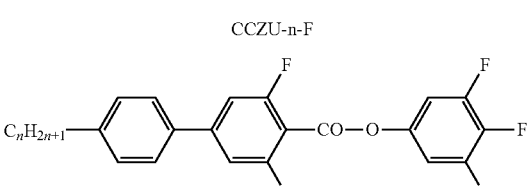
DPGU-n-F
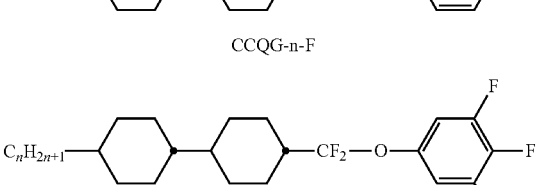
CCZU-n-F
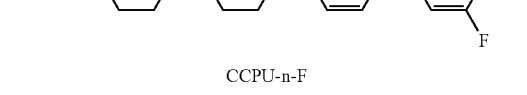
PUZU-n-F
CCQG-n-F
CCQU-n-F -continued
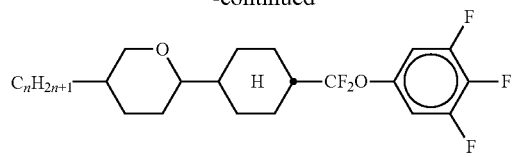
ACQU-n-F
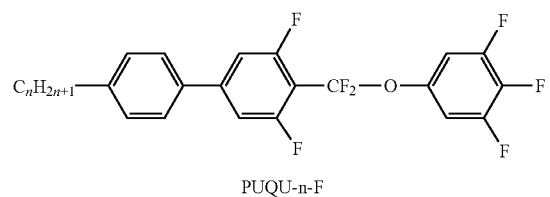
PUQU-n-F
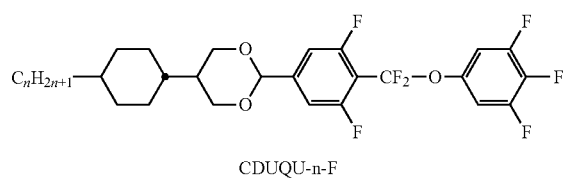
CDUQU-n-F
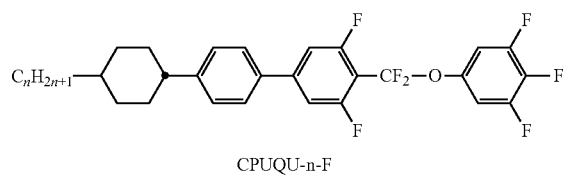
CPUQU-n-F
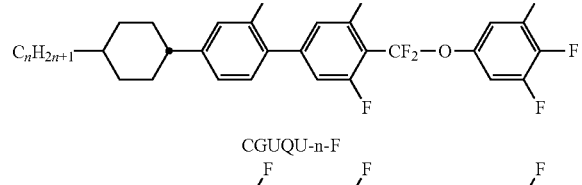
CGUQU-n-F
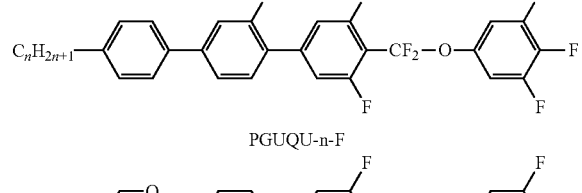
PGUQU-n-F
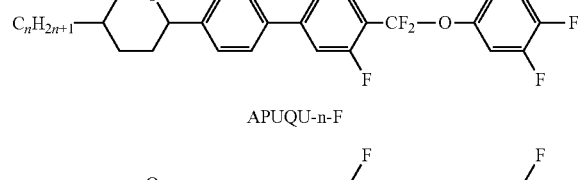
APUQU-n-F
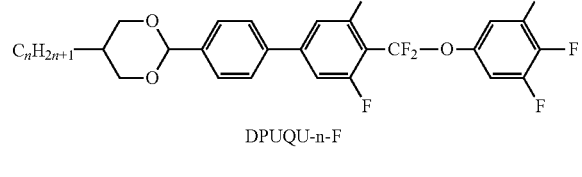
DPUQU-n-F
-continued
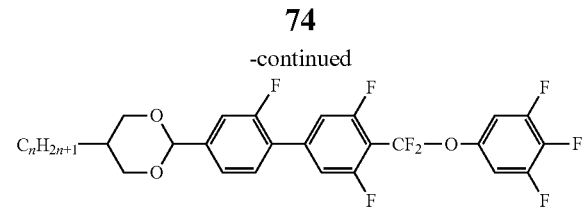
DGUQU-n-F
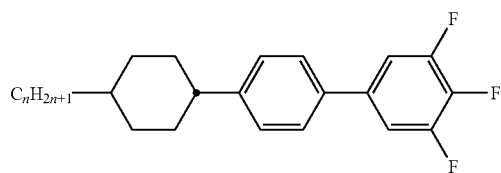
CPU-n-F
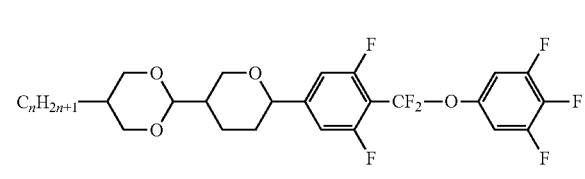
DAUQU-n-F
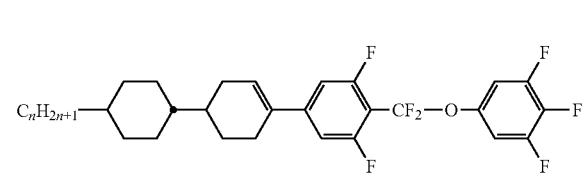
CLUQU-n-F
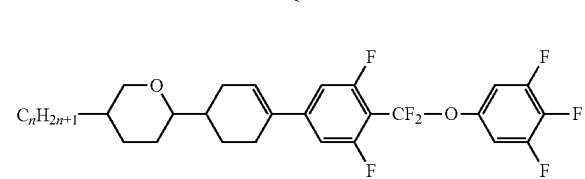
ALUQU-n-F
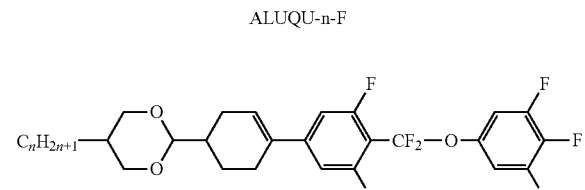
DLUQU-n-F
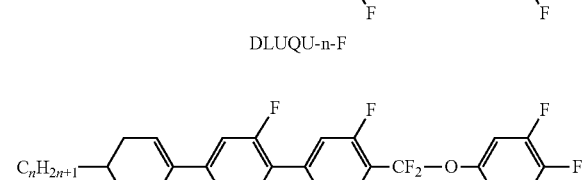
LGPQU-n-F
Exemplary, preferred dielectrically neutral compounds
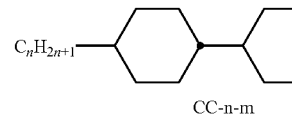
CC-n-m
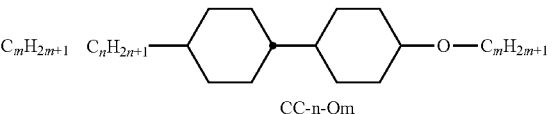
CC-n-Om

-continued
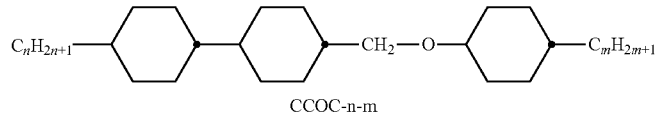
CCOC-n-m
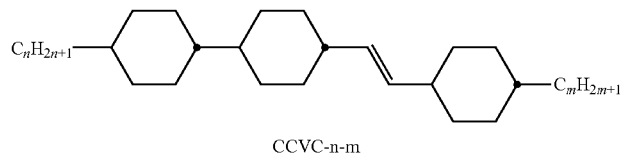
CCVC-n-m
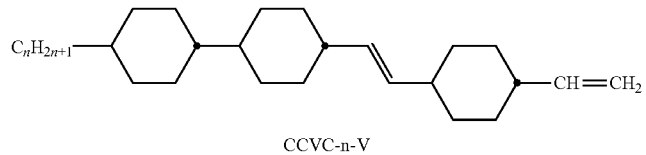
CCVC-n-V
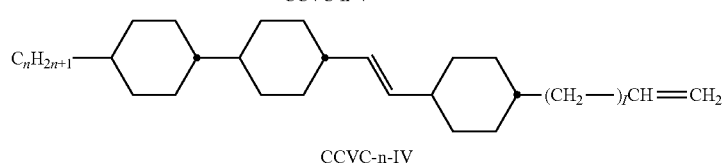
CCVC-n-IV
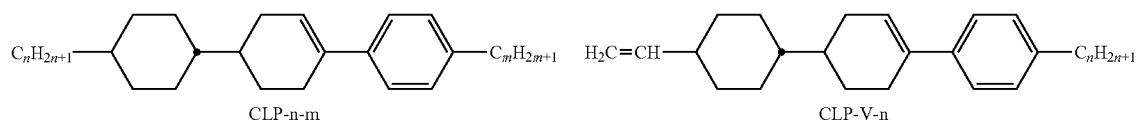
CLP-n-m     CLP-V-n
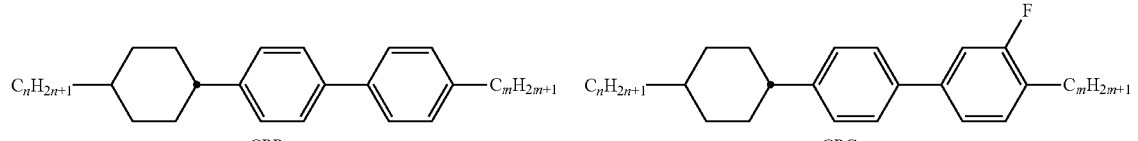
CPP-n-m     CPG-n-m
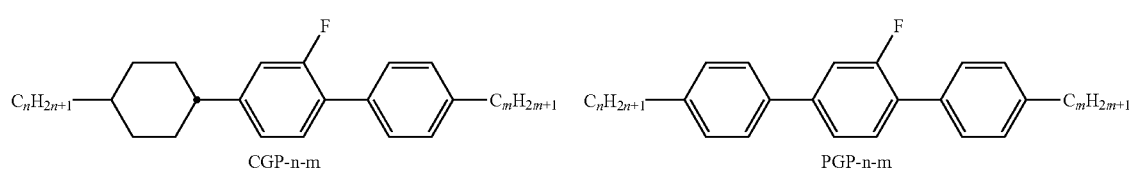
CGP-n-m     PGP-n-m
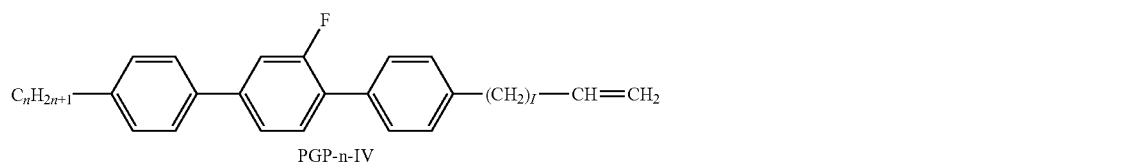
PGP-n-IV
PGP-n-IVm
CCZPC-n-m
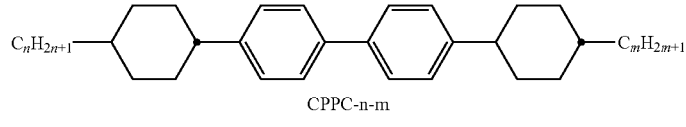
CPPC-n-m -continued
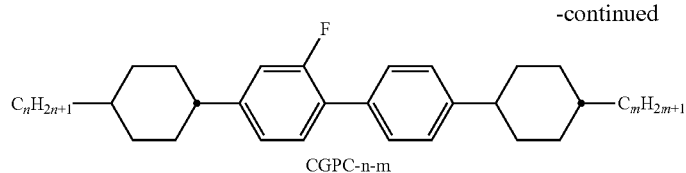
CGPC-n-m
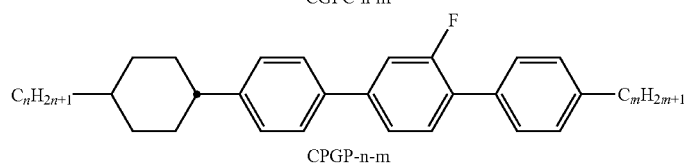
CPGP-n-m
Exemplary, preferred dielectrically negative compounds
CY-V-n
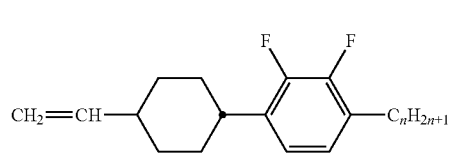
CY-V-On
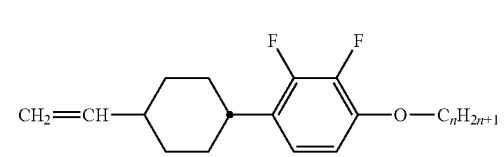
Cy-nV-m
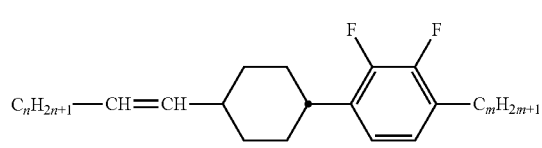
CY-nV-Om
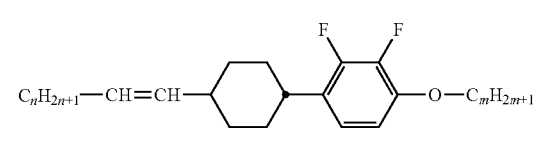
CY-VI-m
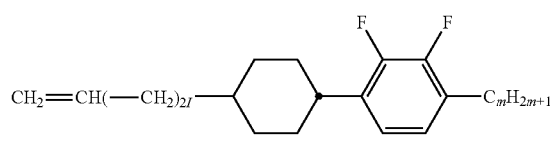
CY-VI-Om
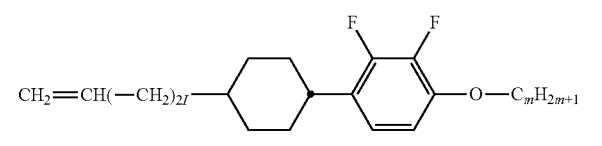
CY-nVI-m
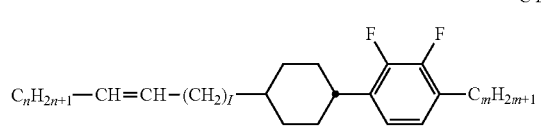
CY-nVI-Om
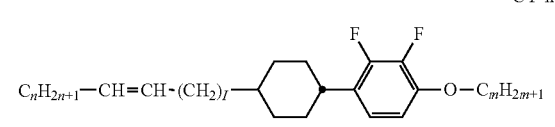
PY-V-n
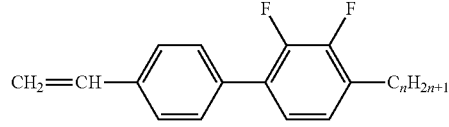
PY-V-On
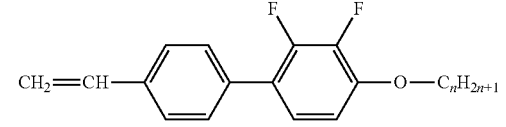
PY-nV-m
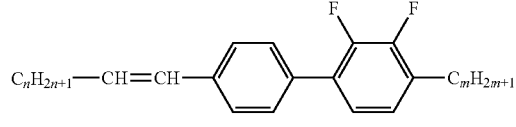
PY-nV-Om
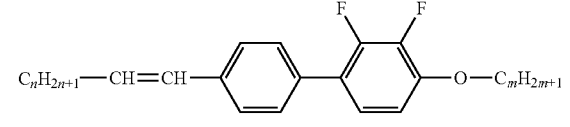
PY-VI-m
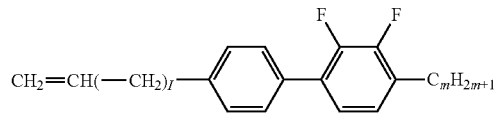
PY-VI-Om
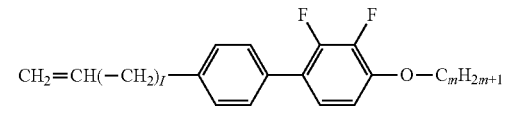
PY-nVI-m
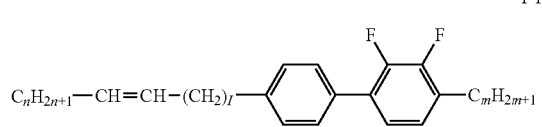
PY-nVI-Om
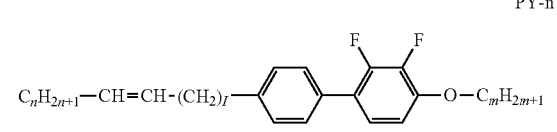

-continued
CCY-V-n 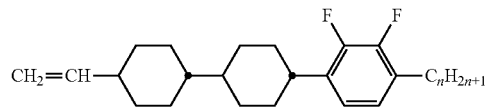 CCY-V-On 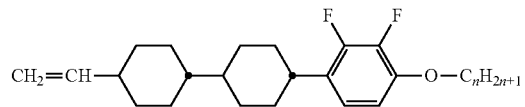
CCY-nV-m 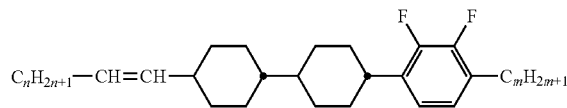 CCY-nV-Om 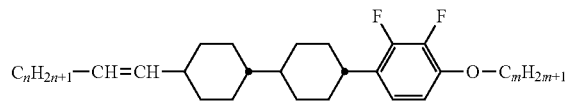
CCY-VI-m 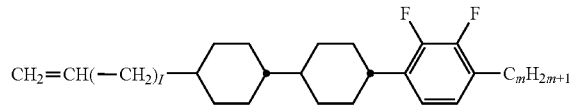 CCY-VI-Om 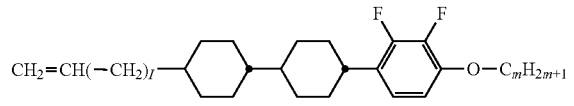
CCY-nVI-m 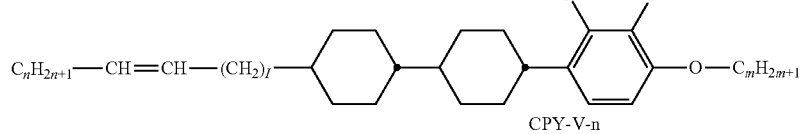
CCY-nVI-Om
CPY-V-n 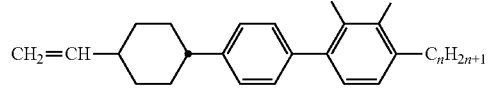 CPY-V-On 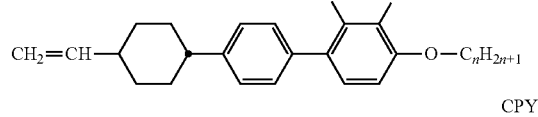
CPY-nV-m 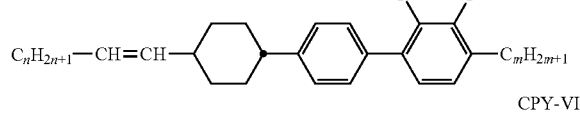 CPY-nV-Om 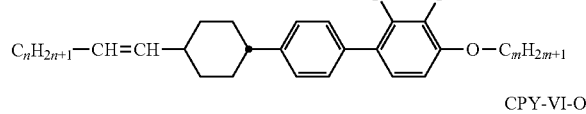
CPY-VI-m 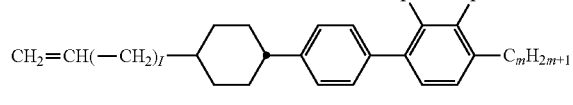 CPY-VI-Om 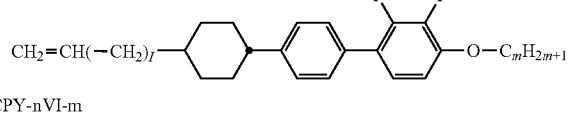
CPY-nVI-m 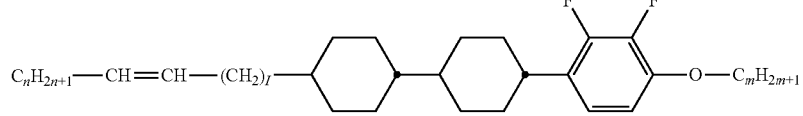
CPY-nVI-Om
CY-n-m 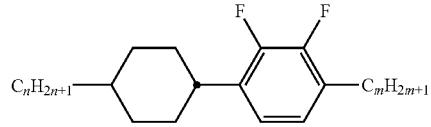 CY-n-Om 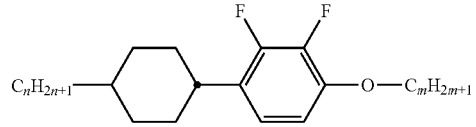
CVY-n-m 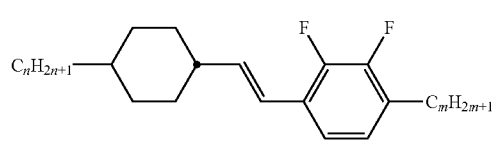 CVY-V-n 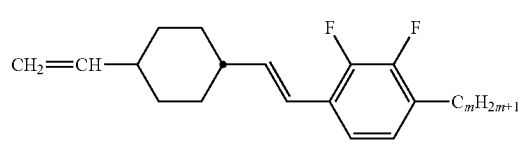

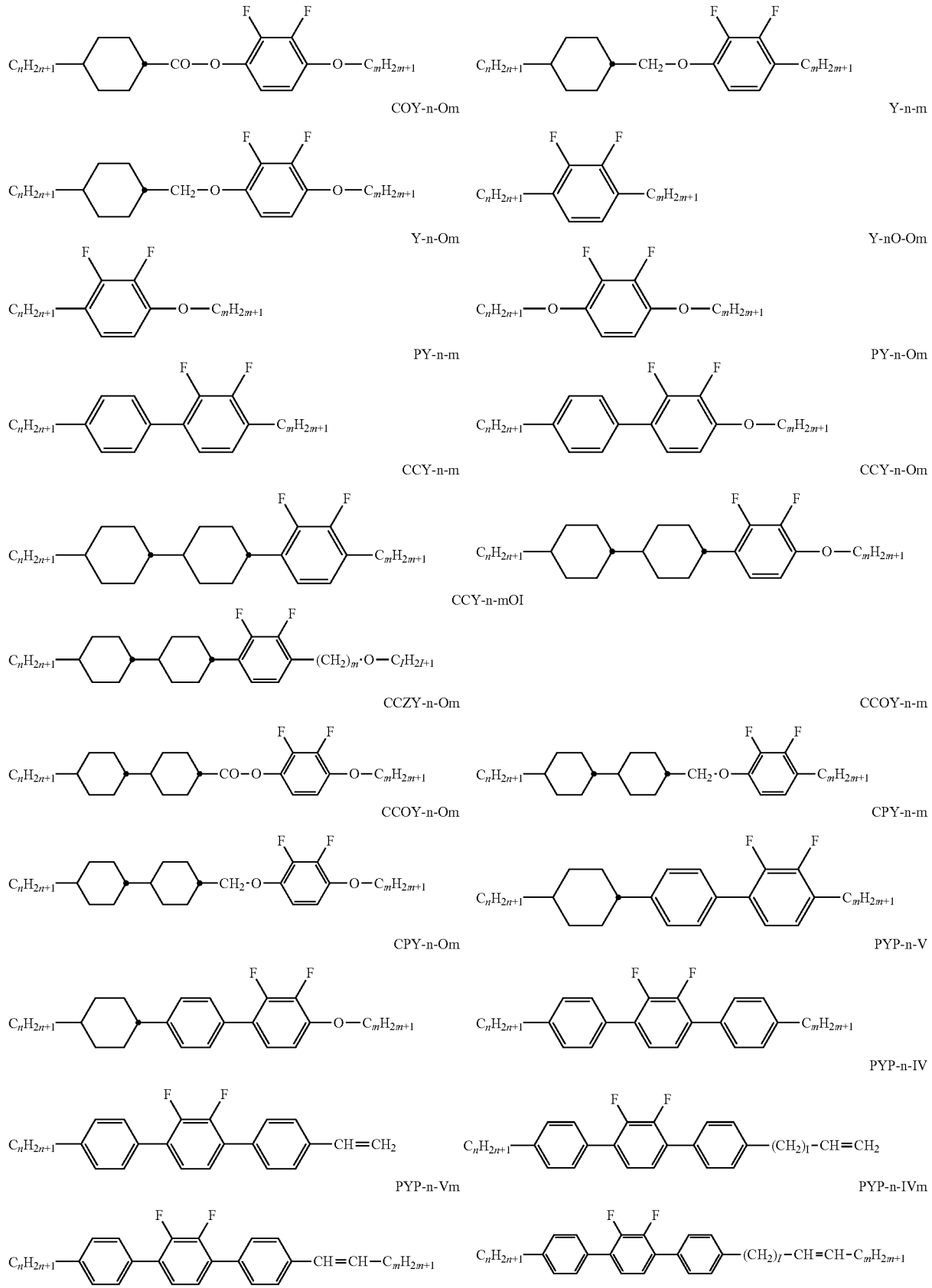

-continued
CP(F,Cl)-n-Om
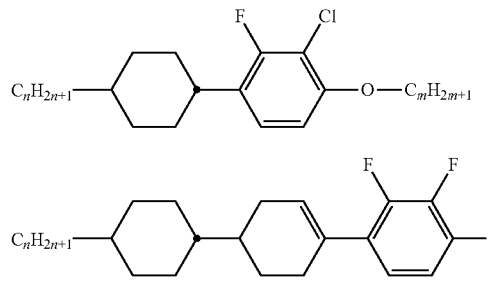
CLY-n-m
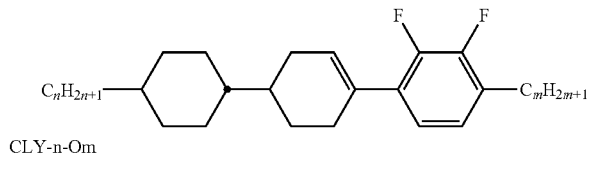
CLY-n-Om
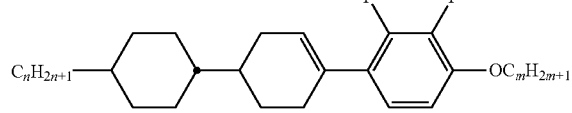
Table E shows chiral dopants which are preferably employed in the mixtures according to the invention.
TABLE E
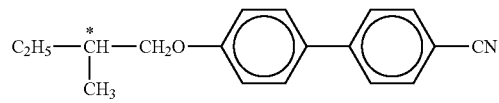
C 15
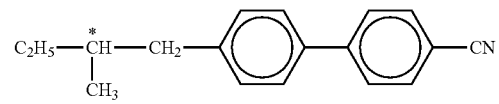
CB 15
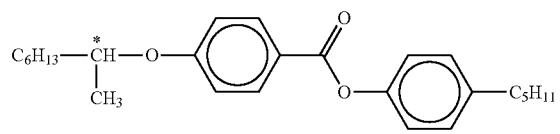
CM 21
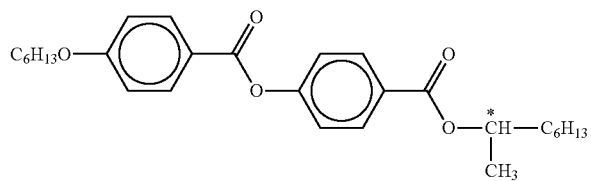
RS-811/S-811
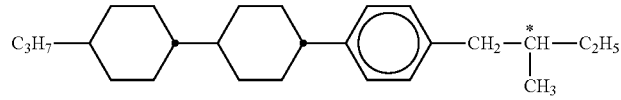
CM 44
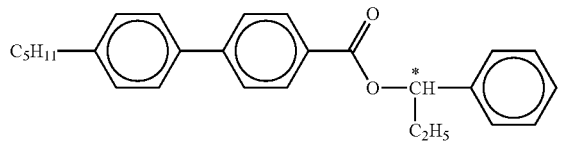
CM 45

TABLE E-continued
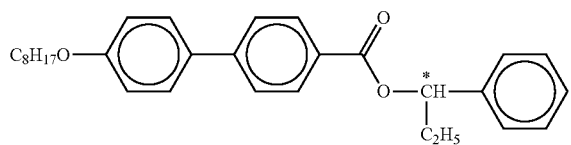
CM 47
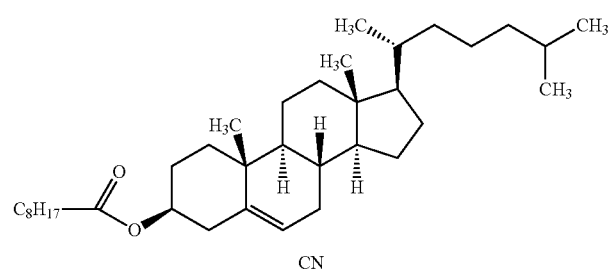
CN
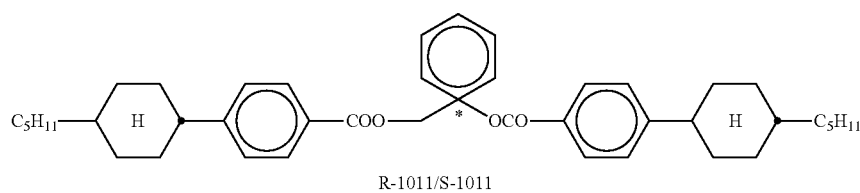
R-1011/S-1011
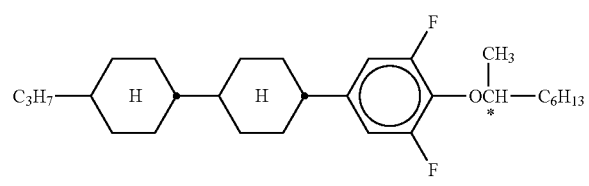
R-2011/S-2011
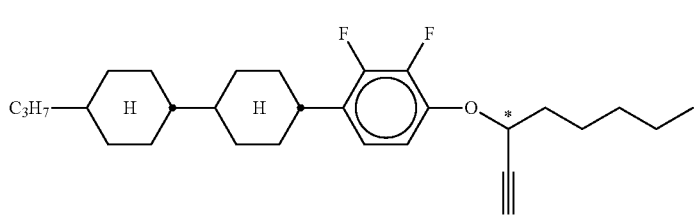
R-3011/S-3011
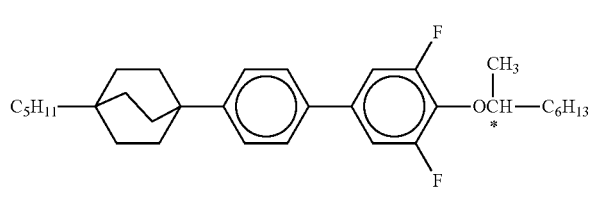
R-4011/S-4011
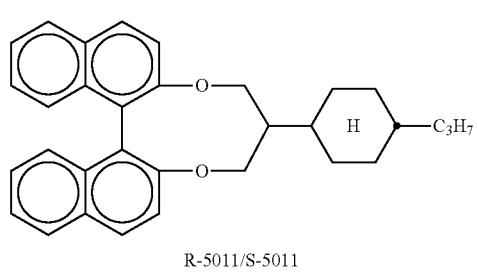
R-5011/S-5011

In a preferred embodiment of the present invention, the media according to the invention comprise one or more compounds selected from the group of the compounds from Table E.

Table F shows stabilisers which can preferably be employed in the mixtures according to the invention in addition to the compounds of formula B. The parameter n here denotes an integer in the range from 1 to 12. In particular, the phenol derivatives shown can be employed as additional stabilisers since they act as antioxidants.

TABLE F

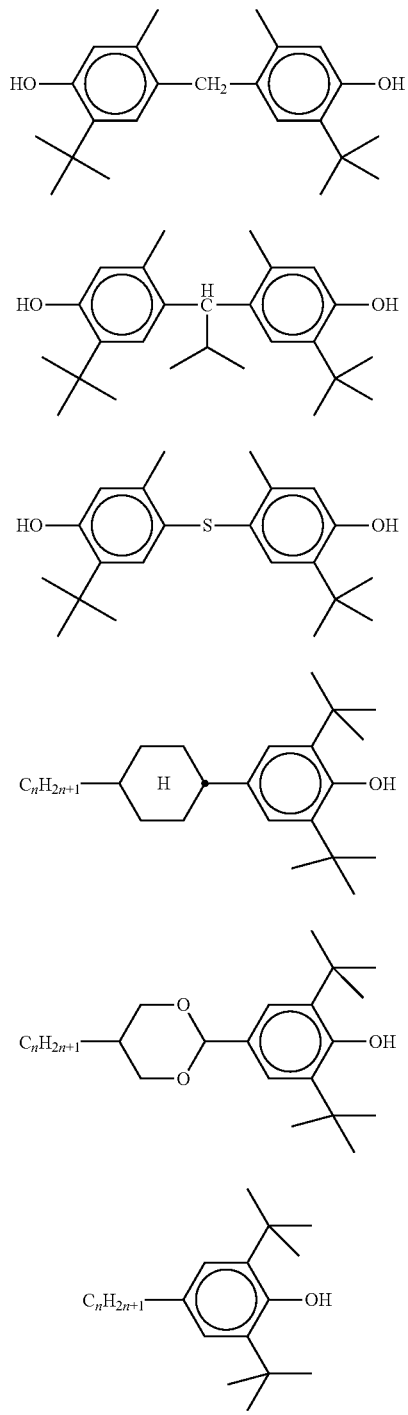

TABLE F-continued
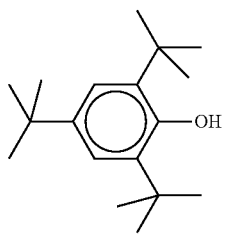
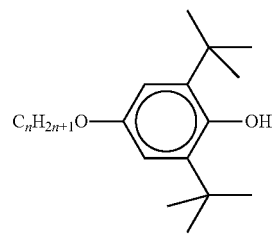
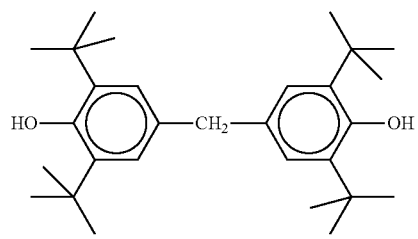
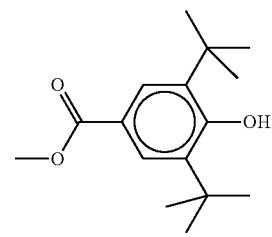
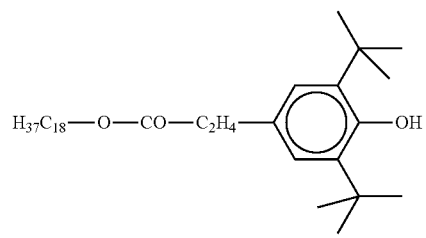
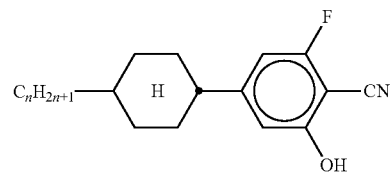
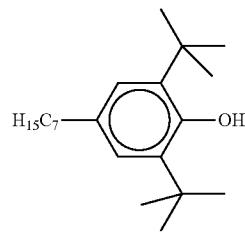

TABLE F-continued
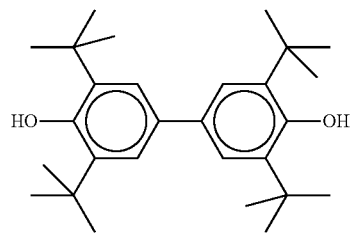
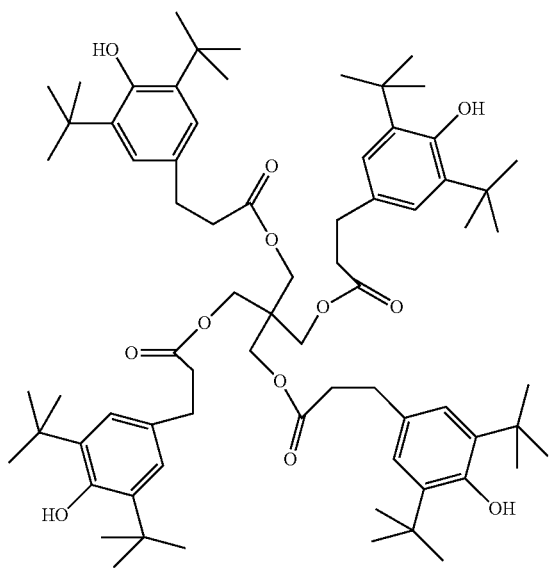 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
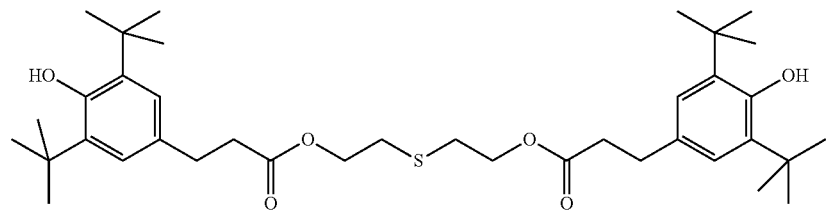 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
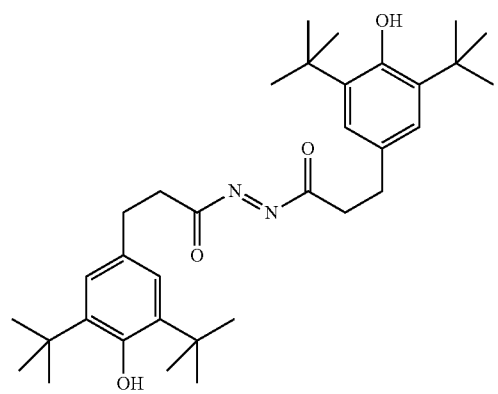 [SMILES: CC(C)(C)c1cc(CCC(=O)/N=N/C(=O)CCc2cc(C(C)(C)C)c(O)c(C(C)(C)C)c2)cc(C(C)(C)C)c1O]

TABLE F-continued
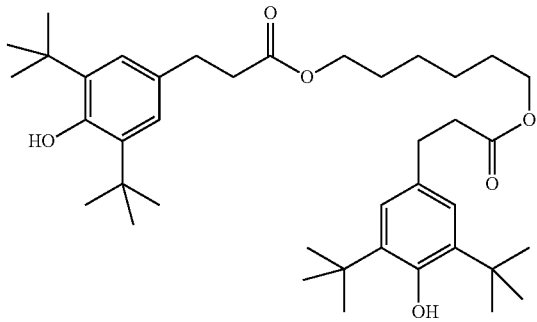 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
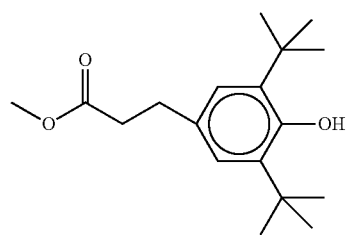
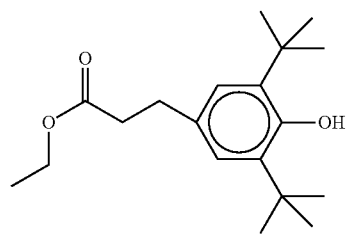
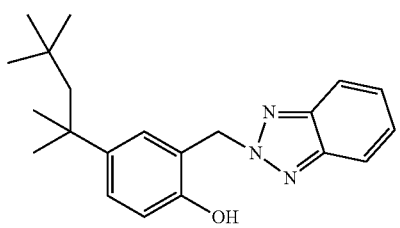 [SMILES: CC(C)(C)CC(C)(C)c1ccc(O)c(Cn2nc3ccccc3n2)c1]
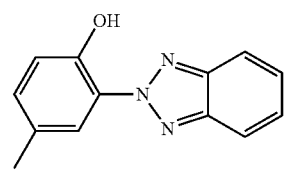 [SMILES: Cc1ccc(O)c(-n2nc3ccccc3n2)c1]
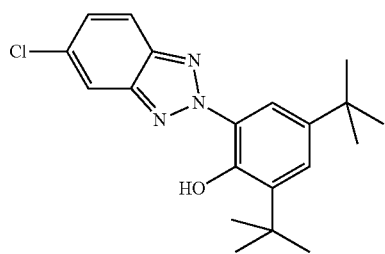 [SMILES: CC(C)(C)c1cc(-n2nc3ccc(Cl)cc3n2)c(O)c(C(C)(C)C)c1]

TABLE F-continued
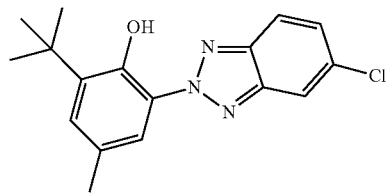 [SMILES: Cc1cc(-n2nc3ccc(Cl)cc3n2)c(O)c(C(C)(C)C)c1]
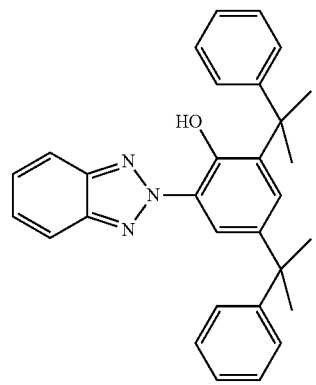 [SMILES: CC(C)(c1ccccc1)c1cc(-n2nc3ccccc3n2)c(O)c(C(C)(C)c2ccccc2)c1]
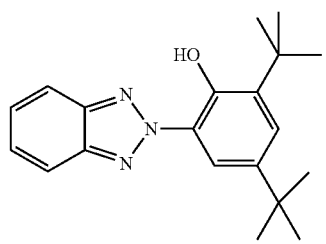 [SMILES: CC(C)(C)c1cc(-n2nc3ccccc3n2)c(O)c(C(C)(C)C)c1]
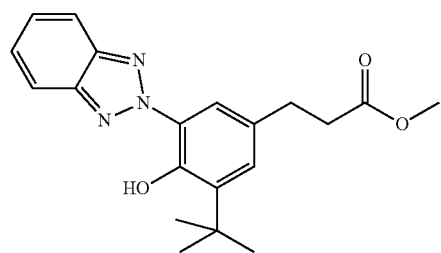 [SMILES: COC(=O)CCc1cc(-n2nc3ccccc3n2)c(O)c(C(C)(C)C)c1]
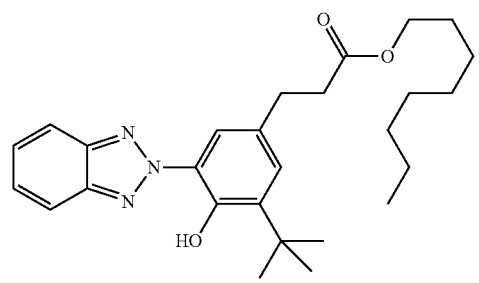 [SMILES: CCCCCCCCOC(=O)CCc1cc(-n2nc3ccccc3n2)c(O)c(C(C)(C)C)c1]

TABLE F-continued
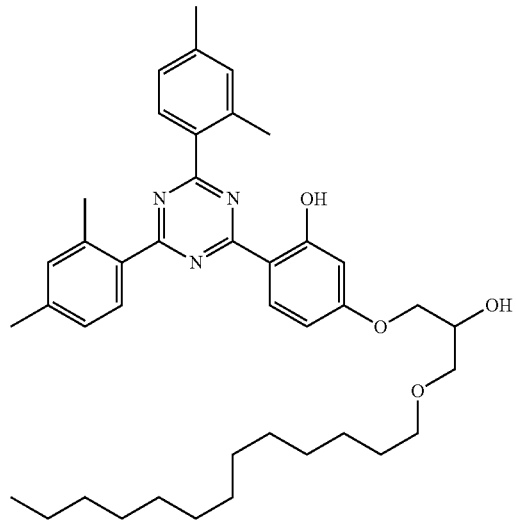 [SMILES: CCCCCCCCCCCCCOCC(O)COc1ccc(-c2nc(-c3ccc(C)cc3C)nc(-c3ccc(C)cc3C)n2)c(O)c1]
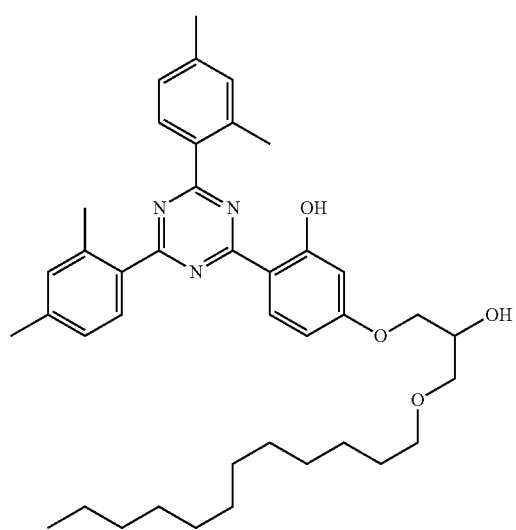 [SMILES: CCCCCCCCCCCCOCC(O)COc1ccc(-c2nc(-c3ccc(C)cc3C)nc(-c3ccc(C)cc3C)n2)c(O)c1]
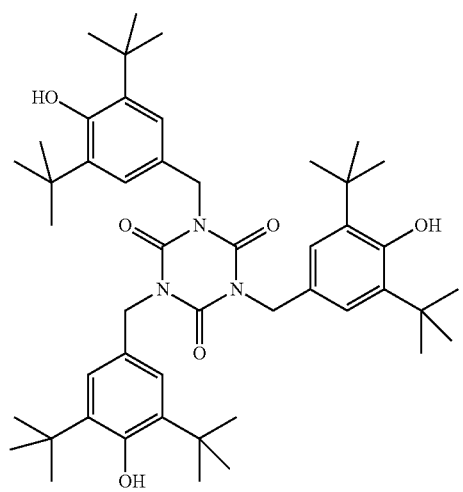 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE F-continued
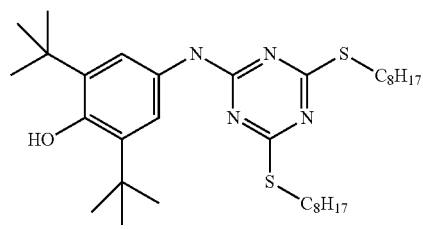
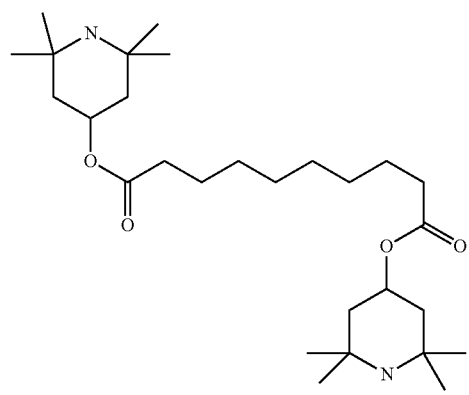
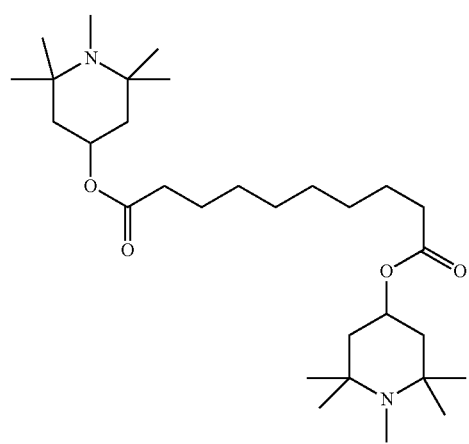
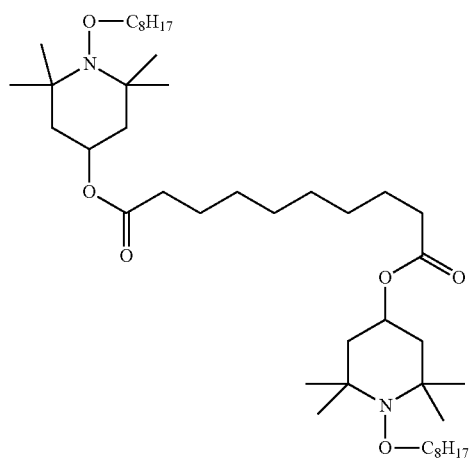

TABLE F-continued

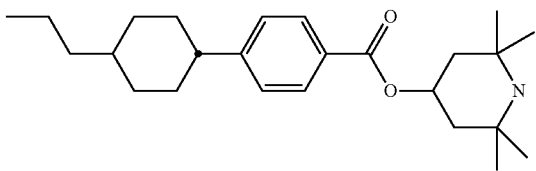

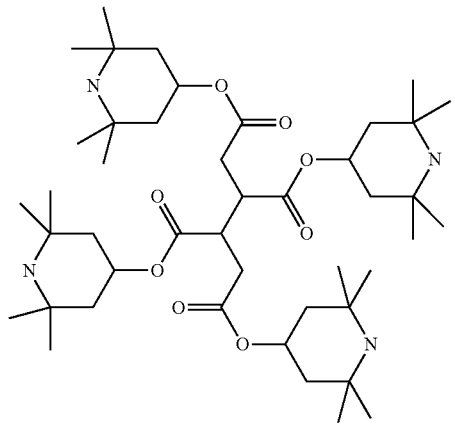

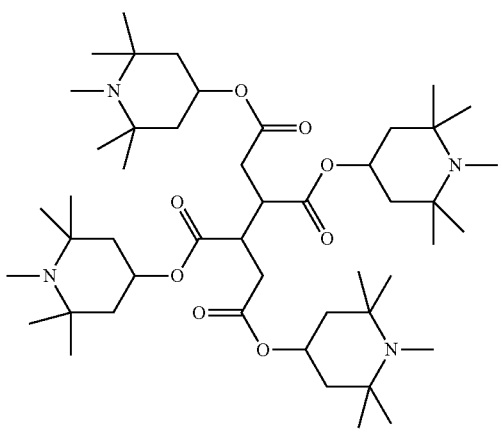

In a preferred embodiment of the present invention, the media according to the invention comprise one or more compounds selected from the group of the compounds from Table F, in particular one or more compounds selected from the group of the compounds of the following two formulae

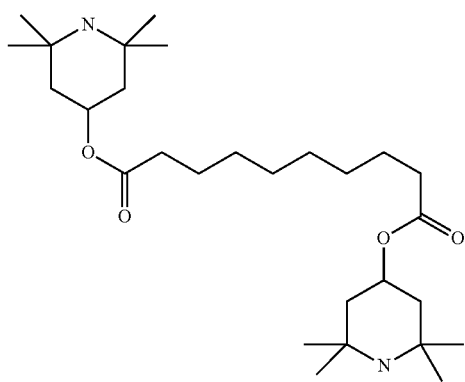

-continued

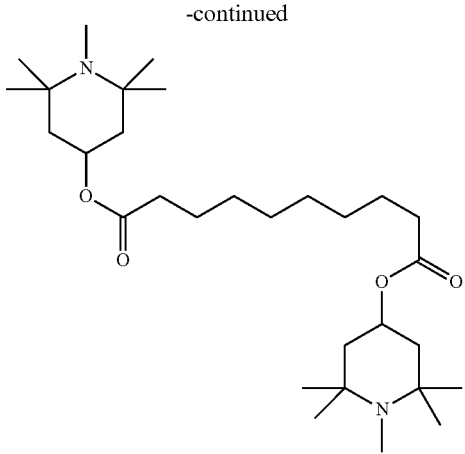

EXAMPLES

The following examples explain the present invention without restricting it in any way. However, the physical properties make it clear to the person skilled in the art what properties can be achieved and in what ranges they can be modified. In particular, the combination of the various properties which can preferably be achieved is thus well defined for the person skilled in the art.

SYNTHESIS EXAMPLES

The following abbreviations are used.
BuLi n-Butyllithium
conc. concentrated
dist. distilled
MTB ether tert-Butyl methyl ether
THF Tetrahydrofuran Synthesis Example 1

Synthesis of 1,3-difluoro-4-[4-(4-propylcyclohexyl) cyclohexen-1-yl]-2-(trifluoromethyl)benzene

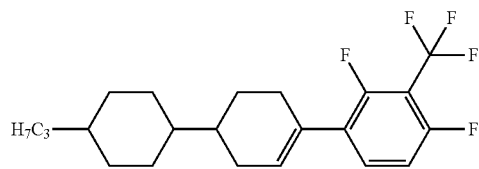

Step 1.1: 1-[2,4-Difluoro-3-(trifluoromethyl)phenyl]-4-(4-propylcyclohexyl)cyclohexanol

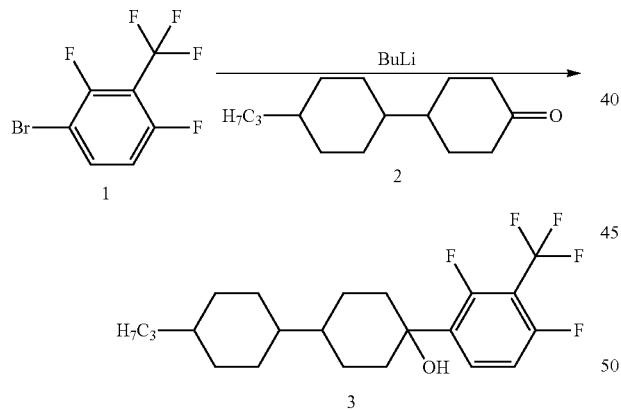

BuLi (8.5 mL, 15% in n-hexane, 13.5 mmol) is slowly added to a solution of 1-bromo-2,4-difluoro-3-(trifluoromethyl)benzene (1, CAS 1263377-74-7) (3.4 g, 13.0 mmol) in diethyl ether (50 mL) at −50° C. under nitrogen atmosphere. The mixture is stirred for 1 h, then a solution of 4-(4-propylcyclohexyl)cyclohexanone (2, CAS 82832-73-3) (3.0 g, 13.5 mmol) in 20 mL diethyl ether is slowly added. The reaction mixture is stirred for 1 h, then it is allowed to warm up to room temperature. Throughout this application, unless explicitly stated otherwise, room temperature and ambient temperature are used synonymously and signify a temperature of about 20° C., typically (20±1° C.). The reaction mixture is quenched with dist. water and hydrochloric acid (2 M). The aqueous phase is separated and extracted with MTB ether. The combined organic phases are washed with brine, dried (sodium sulphate) and concentrated in vacuo to give 1-[2,4-difluoro-3-(trifluoromethyl)phenyl]-4-(4-propylcyclohexyl)cyclohexanol (3) as a yellow oil.

Step 1.2: 1,3-Difluoro-4-[4-(4-propylcyclohexyl) cyclohexen-1-yl]-2-(trifluoromethyl)benzene

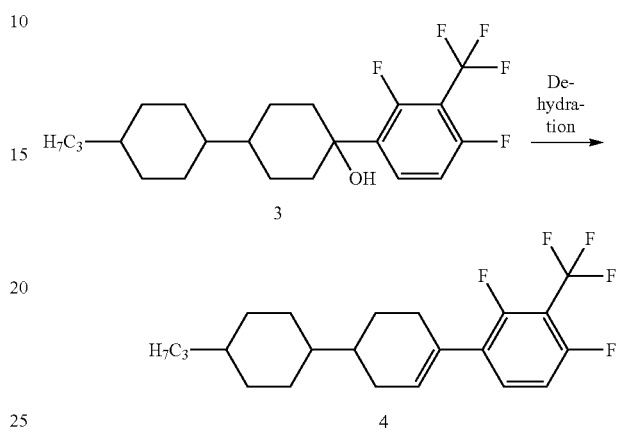

A mixture of 1-[2,4-difluoro-3-(trifluoromethyl)phenyl]-4-(4-propylcyclohexyl)cyclohexanol (3) (5.5 g, 11 mmol) and conc. sulfuric acid (0.1 g, 1.0 mmol) in xylene (mixture of isomers) (40 mL) is heated in a dean stark trap at reflux temperature for 1 h. Then it is cooled to room temperature and the mixture is concentrated in vacuo. The residue is purified by silica gel chromatography (solvent: n-heptane). Subsequent recrystallization of the crude product from ethanol results in colorless crystals of 1,3-difluoro-4-[4-(4-propylcyclohexyl)cyclohexen-1-yl]-2-(trifluoromethyl)benzene (4).

Compound (4) has the following phase characteristics: Tg −68° C. K 39° C. I.

Synthesis Example 2

Synthesis of 1,3-difluoro-4-[4-(4-propylcyclohexen-1-yl)phenyl]-2-(trifluoromethyl)benzene

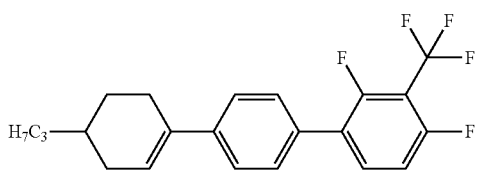

Step 2.1: 1-(4-Bromophenyl)-4-propyl-cyclohexanol

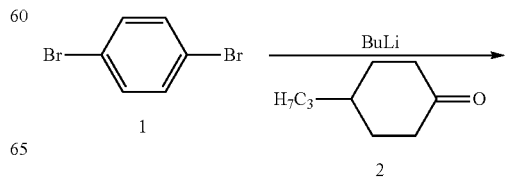

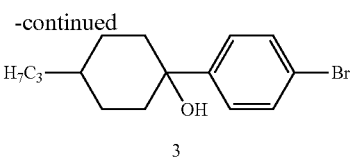

BuLi (100 mL, 15% in n-hexane, 159 mmol) is slowly added to a solution of 1,4-dibromobenzene (1, CAS 106-37-6) (35.0 g, 148 mmol) in diethyl ether (650 mL) at −50° C. under nitrogen atmosphere. The mixture is stirred for 1 h, then a solution of 4-propylcyclohexanone (2, CAS 40649-36-3) (21.0 g, 150 mmol) in 50 mL diethyl ether is slowly added. The reaction mixture is stirred for 1 h, then it is allowed to warm up to room temperature. The reaction mixture is quenched with dist. water and hydrochloric acid (2 M). The aqueous phase is separated and extracted with MTB ether. The combined organic phases are washed with brine, dried (sodium sulphate) and concentrated in vacuo to give 1-(4-bromophenyl)-4-propyl-cyclohexanol (3) as a yellow oil.

Step 2.2:
1-Bromo-4-(4-propylcyclohexen-1-yl)benzene

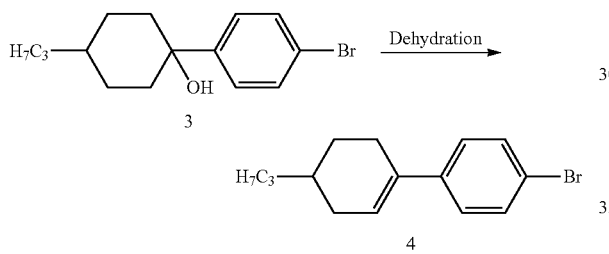

A mixture of 1-(4-bromophenyl)-4-propyl-cyclohexanol (3) (47.2 g, 259 mmol) and toluene-4-sulfonic acid monohydrate (1.5 g, 8.7 mmol) in toluene (500 mL) is heated in a dean stark trap at reflux temperature for 90 min. Then it is cooled to room temperature and concentrated in vacuo. The residue is purified by silica gel chromatography (solvent n-heptane/toluene) to give 1-bromo-4-(4-propylcyclohexen-1-yl)benzene (4) as a colorless solid.

Step 2.3: [4-(4-Propylcyclohexen-1-yl)phenyl]boronic acid

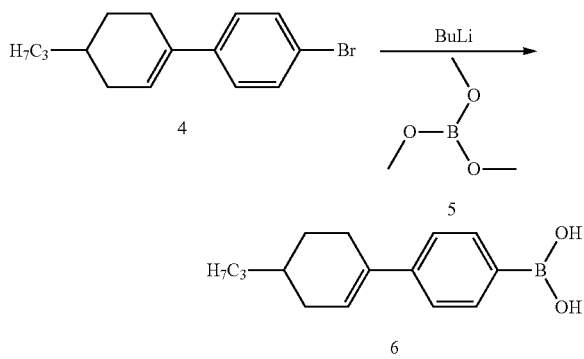

BuLi (74 mL, 15% in n-hexane, 118 mmol) is slowly added to a solution of 1-bromo-4-(4-propylcyclohexen-1-yl)benzene (4) (30.0 g, 107 mmol) in THF (470 mL) at −65° C. under nitrogen atmosphere. The mixture is stirred for 1 h, then a solution of trimethyl borate (5, CAS 121-43-7) (12.5 g, 120 mmol) in THF (30 mL) is slowly added. The reaction mixture is stirred for 1 h, then it is allowed to warm up to 5° C. The reaction mixture is quenched with dist. water and acidified with hydrochloric acid (2 M). The aqueous phase is separated and extracted with MTB ether. The combined organic phases are washed with brine, dried (sodium sulphate) and concentrated in vacuo. The residue is suspended in n-heptane, heated up to 50° C., cooled down to 5° C. and filtered in vacuo to give [4-(4-propylcyclohexen-1-yl)phenyl]boronic acid (6) as a colorless solid.

Step 2.4: 1,3-Difluoro-4-[4-(4-propylcyclohexen-1-yl)phenyl]-2-(trifluoromethyl)benzene

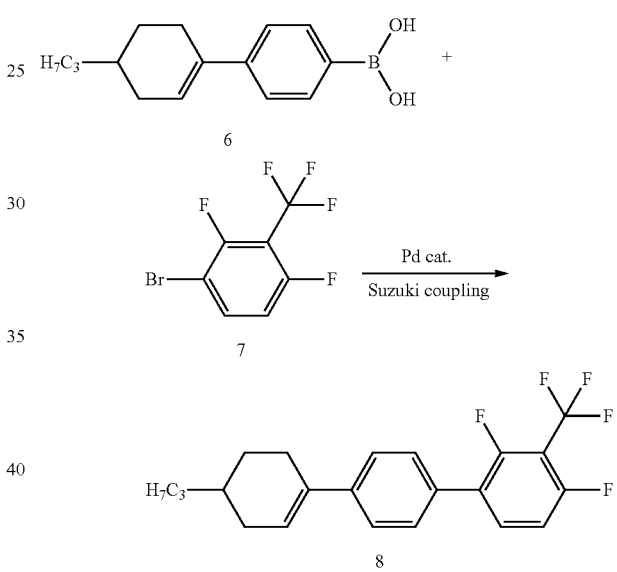

A mixture of [4-(4-propylcyclohexen-1-yl)phenyl]boronic acid (6) (6.4 g, 26 mmol), 1-bromo-2,4-difluoro-3-(trifluoromethyl)benzene (7) (CAS 1263377-74-17 (6.0 g, 23.0 mmol), bis(dibenzylideneacetone)-palladium(0) (15 mg, 26 μmop and tris-(o-tolyl)phosphine (40 mg, 131 μmop in acetone (100 mL) is heated to reflux under nitrogen atmosphere, followed by dropwise addition of a sodium hydroxide solution (2 N, 23 mL, 46 mmol). The reaction mixture is heated at reflux temperature for 3 h. Then it is cooled to room temperature and diluted with MTB ether and dist. water. The aqueous phase is separated and extracted with MTB ether. The combined organic phases are washed with dist. water and brine, dried (sodium sulphate) and concentrated in vacuo. The residue is purified by silica gel chromatography (solvent: heptane). Subsequent recrystallization of the crude product from ethanol and heptane results in colorless crystals of 1,3-difluoro-4-[4-(4-propylcyclohexen-1-yl)phenyl]-2-(trifluoromethyl)benzene.

Compound (8) has the following phase characteristics:
K 80° C. I.

Synthesis Example 3

Synthesis of 1,3-difluoro-4-[4-(4-propylcyclohexen-1-yl)phenyl]-2-(trifluoromethoxy)benzene

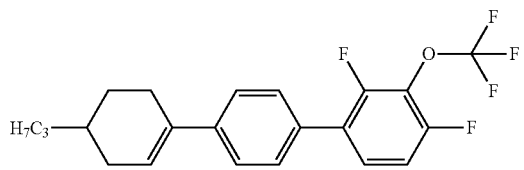

Step 3.1:
1,3-Difluoro-4-iodo-2-(trifluoromethoxy)benzene

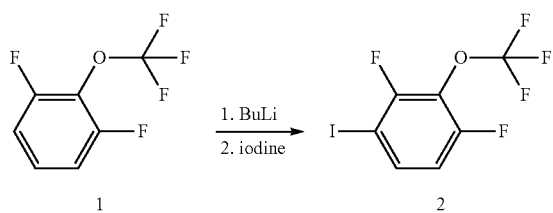 [SMILES: Fc1cccc(F)c1OC(F)(F)F ; Fc1ccc(I)c(F)c1OC(F)(F)F]

BuLi (49.0 mL, 1.6 M in n-hexane, 78 mmol) is slowly added to a solution of 1,3-difluoro-2-(trifluoromethoxy)benzene (1) (15.0 g, 76 mmol) in THF (120 mL) at −70° C. under nitrogen atmosphere. The reaction mixture is stirred at −70° C. for 1 h. Then a solution of iodine (CAS 7553-56-2) (19.5 g, 77 mmol) in THF (80 mL) is slowly added at −70° C. The reaction mixture is allowed to warm up to room temperature after 30 min. it is quenched with diluted aqueous sodium hydrogen sulfite solution. The aqueous phase is separated and extracted with MTB ether. The combined organic phases are washed with dist. water and brine, dried (sodium sulphate) and concentrated in vacuo. The residue is purified by silica gel chromatography (solvent pentane) and vacuum distillation to give 1,3-difluoro-2-(trifluoromethoxy)benzene (2) as a colorless oil.

Step 3.2: 1,3-Difluoro-4-[4-(4-propylcyclohexen-1-yl)phenyl]-2-(trifluoromethoxy)benzene

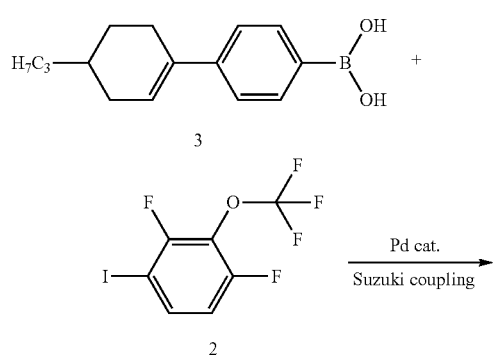

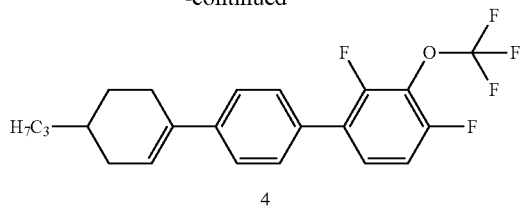

A mixture of [4-(4-propylcyclohexen-1-yl)phenyl]boronic acid (3) (5.9 g, 24 mmol), 1,3-difluoro-4-iodo-2-(trifluoromethoxy)benzene (2) (8.5 g, 23 mmol), bis(dibenzylideneacetone)-palladium(0) (15 mg, 26 μmop and tris-(o-tolyl)phosphine (40 mg, 131 μmop in acetone (100 mL) is heated to reflux under nitrogen atmosphere, followed by dropwise addition of a sodium hydroxide solution (2 N, 23 mL, 46 mmol). The reaction mixture is heated at reflux temperature for 3 h. Then it is cooled to room temperature and diluted with MTB ether and dist. water. The aqueous phase is separated and extracted with MTB ether. The combined organic phases are washed with dist. water and brine, dried (sodium sulphate) and concentrated in vacuo. The residue is purified by silica gel chromatography (solvent heptane). Subsequent recrystallization of the crude product from ethanol and heptane results in colorless crystals of 1,3-difluoro-4-[4-(4-propylcyclohexen-1-yl)phenyl]-2-(trifluoromethoxy)benzene.

Compound (4) has the following phase characteristics:
K 75° C. SmA 50° C. I.

COMPOUND EXAMPLES

Example 1: (1)

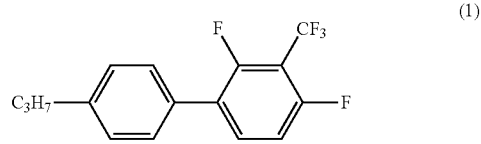

Phase Sequence: $T_g$ −76° C. K 4 I; $\Delta n$=0.0220; $\Delta\varepsilon$=3.3.

Compound Example 2: (2)

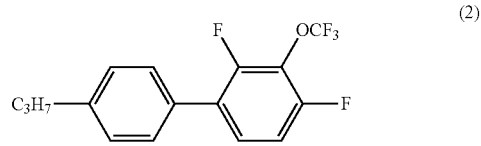

Phase sequence: $T_g$ 81° C. K 8° C. I.

Compound Example 3: (3)

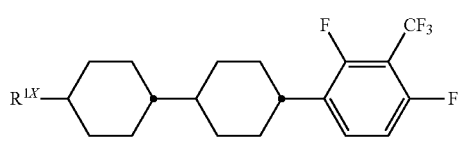
(3)

Compound Example 4: (4)

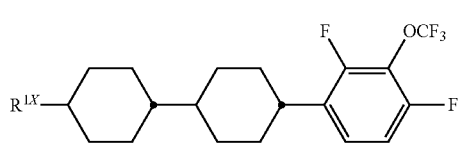
(4)

Compound Example 5: (5)

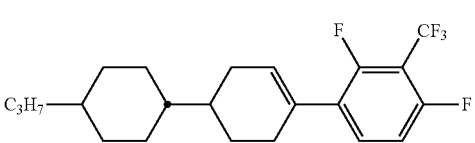
(5)

Phase sequence: $T_g$ −68 C K 39° C. I; Δn=0.0707; Δε=3.8; $\gamma_1$=217 mPa·s.

Compound Example 6: (6)

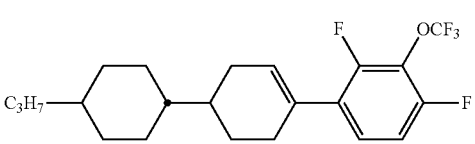
(6)

Phase sequence: K 38° C. N (−4° C.) I; Δn=0.0701; Δε=3.9; $\gamma_1$=251 mPa·s.

Compound Example 7: (7)

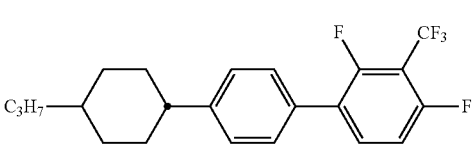
(7)

Phase sequence: K 59° C. I; Δn=0.0951; Δε=4.4; $\gamma_1$=215 mPa·s.

Compound Example 8: (8)

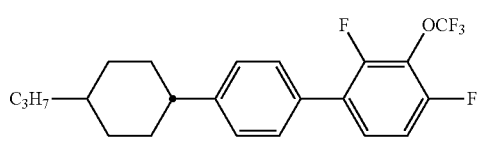
(8)

Phase sequence: K 92° C. I; Δn=0.0971; Δε=4.0; $\gamma_1$=210 mPa·s.

Compound Example 9: (9)

(9)

Phase sequence: K 80° C. I; Δn=0.1383; Δε=6.0; $\gamma_1$=275 mPa·s.

Compound Example 10: (10)

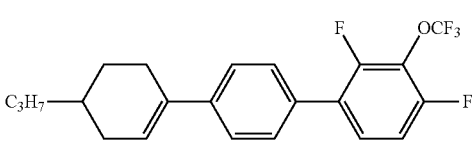
(10)

Phase sequence: K 75 C SA (50° C.) I; Δn=0.1363; Δε=5.9; $\gamma_1$=273 mPa·s.

Example 11: (11)

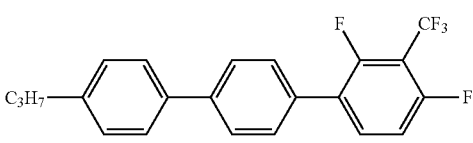
(11)

Phase sequence: K 103 C SA (83° C.) I; Δn=0.1830; Δε=6.9; $\gamma_1$=222 mPa·s.

Example 12: (12)

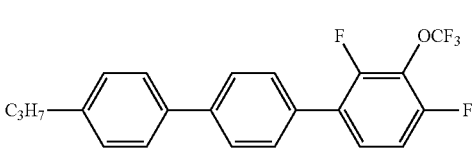
(12)

Phase sequence: K 96 C $S_A$ 101° C. I; Δn=0.1810; Δε=6.3; $\gamma_1$=209 mPa·s.

Example 13: (13)

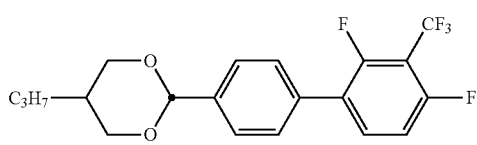

(13)

Phase sequence: K 155° C. I.

Example 14: (14)

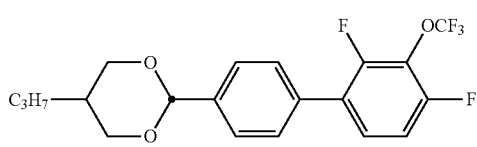

(14)

Phase sequence: K 123° C. I.

In analogy to the above described examples the following exemplary compounds of formula X and its respective sub-formulae are obtained:

In the following table the following abbreviations for the end groups are used

| | |
|---|---|
| c-C$_3$H$_7$ | △ |
| c-C$_3$H$_7$CH$_2$ | △—  |
| c-C$_4$H$_9$ | ▢— |
| c-C$_5$H$_9$ | ⬠ |
| c-C$_5$H$_{11}$ | ⬠— |

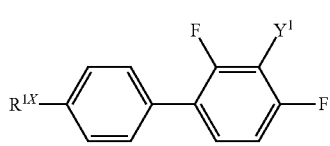

X-1-1

| No: 1- | R$^{1X}$ | Y$^1$ | Phase Range; properties |
|---|---|---|---|
| 1 | CH$_3$ | CL | |
| 2 | C$_2$H$_5$ | CL | |
| 3 | n-C$_3$H$_7$ | CL | |
| 4 | n-C$_4$H$_9$ | CL | |
| 5 | n-C$_5$H$_{11}$ | CL | |
| 6 | n-C$_6$H$_{13}$ | CL | |
| 7 | n-C$_7$H$_{15}$ | CL | |
| 8 | n-C$_8$H$_{17}$ | CL | |
| 9 | c-C$_3$H$_7$ | CL | |
| 10 | c-C$_3$H$_7$CH$_2$ | CL | |
| 11 | c-C$_4$H$_9$ | CL | |
| 12 | c-C$_5$H$_9$ | CL | |
| 13 | c-C$_5$H$_{11}$ | CL | |
| 14 | CH$_2$=CH | CL | |
| 15 | CH$_3$CH=CH | CL | |
| 16 | CH$_2$=CH(CH$_2$)$_2$ | CL | |
| 17 | CH$_3$O | CL | |
| 18 | C$_2$H$_5$O | CL | |
| 19 | n-C$_3$H$_7$O | CL | |
| 20 | n-C$_4$H$_9$O | CL | |
| 21 | n-C$_5$H$_{11}$O | CL | |
| 22 | CH$_3$ | CF$_3$ | |
| 23 | C$_2$H$_5$ | CF$_3$ | |
| 24 | n-C$_3$H$_7$ | CF$_3$ | T$_g$ −76° C. K 4 I; Δn = 0220, Δε = 3.3 |
| 25 | n-C$_4$H$_9$ | CF$_3$ | |
| 26 | n-C$_5$H$_{11}$ | CF$_3$ | |
| 27 | n-C$_6$H$_{13}$ | CF$_3$ | |
| 28 | n-C$_7$H$_{15}$ | CF$_3$ | |
| 29 | n-C$_8$H$_{17}$ | CF$_3$ | |
| 30 | c-C$_3$H$_7$ | CF$_3$ | |
| 31 | c-C$_3$H$_7$CH$_2$ | CF$_3$ | |
| 32 | c-C$_4$H$_9$ | CF$_3$ | |
| 33 | c-C$_5$H$_9$ | CF$_3$ | |
| 34 | c-C$_5$H$_{11}$ | CF$_3$ | |
| 35 | CH$_2$=CH | CF$_3$ | |
| 36 | CH$_3$CH=CH | CF$_3$ | |
| 37 | CH$_2$=CH(CH$_2$)$_2$ | CF$_3$ | |
| 38 | CH$_3$O | CF$_3$ | |
| 39 | C$_2$H$_5$O | CF$_3$ | |
| 40 | n-C$_3$H$_7$O | CF$_3$ | |
| 41 | n-C$_4$H$_9$O | CF$_3$ | |
| 42 | n-C$_5$H$_{11}$O | CF$_3$ | |
| 43 | CH$_3$ | OCF$_3$ | |
| 44 | C$_2$H$_5$ | OCF$_3$ | |
| 45 | n-C$_3$H$_7$ | OCF$_3$ | T$_g$ −81° C. K 8° C. I |
| 46 | n-C$_4$H$_9$ | OCF$_3$ | |
| 47 | n-C$_5$H$_{11}$ | OCF$_3$ | |
| 48 | n-C$_6$H$_{13}$ | OCF$_3$ | |
| 49 | n-C$_7$H$_{15}$ | OCF$_3$ | |
| 50 | n-C$_8$H$_{17}$ | OCF$_3$ | |
| 51 | c-C$_3$H$_7$ | OCF$_3$ | |
| 52 | c-C$_3$H$_7$CH$_2$ | OCF$_3$ | |
| 53 | c-C$_4$H$_9$ | OCF$_3$ | |
| 54 | c-C$_5$H$_9$ | OCF$_3$ | |
| 55 | c-C$_5$H$_{11}$ | OCF$_3$ | |
| 56 | CH$_2$=CH | OCF$_3$ | |
| 57 | CH$_3$CH=CH | OCF$_3$ | |
| 58 | CH$_2$=CH(CH$_2$)$_2$ | OCF$_3$ | |
| 59 | CH$_3$O | OCF$_3$ | |
| 60 | C$_2$H$_5$O | OCF$_3$ | |
| 61 | n-C$_3$H$_7$O | OCF$_3$ | |
| 62 | n-C$_4$H$_9$O | OCF$_3$ | |
| 63 | n-C$_5$H$_{11}$O | OCF$_3$ | |

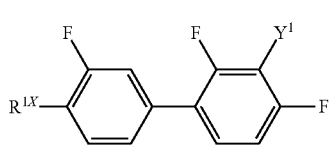

X-1-2

| No: 2- | R$^{1X}$ | Y$^1$ | Phase Range; properties |
|---|---|---|---|
| 1 | CH$_3$ | CL | |
| 2 | C$_2$H$_5$ | CL | |
| 3 | n-C$_3$H$_7$ | CL | |
| 4 | n-C$_4$H$_9$ | CL | |
| 5 | n-C$_5$H$_{11}$ | CL | |
| 6 | n-C$_6$H$_{13}$ | CL | |
| 7 | n-C$_7$H$_{15}$ | CL | |
| 8 | n-C$_8$H$_{17}$ | CL | |

-continued

| No: 2- | R$^{LX}$ | Y$^1$ | Phase Range; properties |
|---|---|---|---|
| 9 | c-C$_3$H$_7$ | CL | |
| 10 | c-C$_3$H$_7$CH$_2$ | CL | |
| 11 | c-C$_4$H$_9$ | CL | |
| 12 | c-C$_5$H$_9$ | CL | |
| 13 | c-C$_5$H$_{11}$ | CL | |
| 14 | CH$_2$=CH | CL | |
| 15 | CH$_3$CH=CH | CL | |
| 16 | CH$_2$=CH(CH$_2$)$_2$ | CL | |
| 17 | CH$_3$O | CL | |
| 18 | C$_2$H$_5$O | CL | |
| 19 | n-C$_3$H$_7$O | CL | |
| 20 | n-C$_4$H$_9$O | CL | |
| 21 | n-C$_5$H$_{11}$O | CL | |
| 22 | CH$_3$ | CF$_3$ | |
| 23 | C$_2$H$_5$ | CF$_3$ | |
| 24 | n-C$_3$H$_7$ | CF$_3$ | |
| 25 | n-C$_4$H$_9$ | CF$_3$ | |
| 26 | n-C$_5$H$_{11}$ | CF$_3$ | |
| 27 | n-C$_6$H$_{13}$ | CF$_3$ | |
| 28 | n-C$_7$H$_{15}$ | CF$_3$ | |
| 29 | n-C$_8$H$_{17}$ | CF$_3$ | |
| 30 | c-C$_3$H$_7$ | CF$_3$ | |
| 31 | c-C$_3$H$_7$CH$_2$ | CF$_3$ | |
| 32 | c-C$_4$H$_9$ | CF$_3$ | |
| 33 | c-C$_5$H$_9$ | CF$_3$ | |
| 34 | c-C$_5$H$_{11}$ | CF$_3$ | |
| 35 | CH$_2$=CH | CF$_3$ | |
| 36 | CH$_3$CH=CH | CF$_3$ | |
| 37 | CH$_2$=CH(CH$_2$)$_2$ | CF$_3$ | |
| 38 | CH$_3$O | CF$_3$ | |
| 39 | C$_2$H$_5$O | CF$_3$ | |
| 40 | n-C$_3$H$_7$O | CF$_3$ | |
| 41 | n-C$_4$H$_9$O | CF$_3$ | |
| 42 | n-C$_5$H$_{11}$O | CF$_3$ | |
| 43 | CH$_3$ | OCF$_3$ | |
| 44 | C$_2$H$_5$ | OCF$_3$ | |
| 45 | n-C$_3$H$_7$ | OCF$_3$ | |
| 46 | n-C$_4$H$_9$ | OCF$_3$ | |
| 47 | n-C$_5$H$_{11}$ | OCF$_3$ | |
| 48 | n-C$_6$H$_{13}$ | OCF$_3$ | |
| 49 | n-C$_7$H$_{15}$ | OCF$_3$ | |
| 50 | n-C$_8$H$_{17}$ | OCF$_3$ | |
| 51 | c-C$_3$H$_7$ | OCF$_3$ | |
| 52 | c-C$_3$H$_7$CH$_2$ | OCF$_3$ | |
| 53 | c-C$_4$H$_9$ | OCF$_3$ | |
| 54 | c-C$_5$H$_9$ | OCF$_3$ | |
| 55 | c-C$_5$H$_{11}$ | OCF$_3$ | |
| 56 | CH$_2$=CH | OCF$_3$ | |
| 57 | CH$_3$CH=CH | OCF$_3$ | |
| 58 | CH$_2$=CH(CH$_2$)$_2$ | OCF$_3$ | |
| 59 | CH$_3$O | OCF$_3$ | |
| 60 | C$_2$H$_5$O | OCF$_3$ | |
| 61 | n-C$_3$H$_7$O | OCF$_3$ | |
| 62 | n-C$_4$H$_9$O | OCF$_3$ | |
| 63 | n-C$_5$H$_{11}$O | OCF$_3$ | |

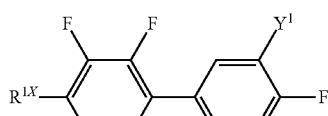

X-1-3

| No: 3- | R$^{LX}$ | Y$^1$ | Phase Range; properties |
|---|---|---|---|
| 1 | CH$_3$ | CL | |
| 2 | C$_2$H$_5$ | CL | |
| 3 | n-C$_3$H$_7$ | CL | |
| 4 | n-C$_4$H$_9$ | CL | |
| 5 | n-C$_5$H$_{11}$ | CL | |
| 6 | n-C$_6$H$_{13}$ | CL | |
| 7 | n-C$_7$H$_{15}$ | CL | |
| 8 | n-C$_8$H$_{17}$ | CL | |
| 9 | c-C$_3$H$_7$ | CL | |
| 10 | c-C$_3$H$_7$CH$_2$ | CL | |
| 11 | c-C$_4$H$_9$ | CL | |
| 12 | c-C$_5$H$_9$ | CL | |
| 13 | c-C$_5$H$_{11}$ | CL | |
| 14 | CH$_2$=CH | CL | |
| 15 | CH$_3$CH=CH | CL | |
| 16 | CH$_2$=CH(CH$_2$)$_2$ | CL | |
| 17 | CH$_3$O | CL | |
| 18 | C$_2$H$_5$O | CL | |
| 19 | n-C$_3$H$_7$O | CL | |
| 20 | n-C$_4$H$_9$O | CL | |
| 21 | n-C$_5$H$_{11}$O | CL | |
| 22 | CH$_3$ | CF$_3$ | |
| 23 | C$_2$H$_5$ | CF$_3$ | |
| 24 | n-C$_3$H$_7$ | CF$_3$ | K 119° C. I |
| 25 | n-C$_4$H$_9$ | CF$_3$ | |
| 26 | n-C$_5$H$_{11}$ | CF$_3$ | |
| 27 | n-C$_6$H$_{13}$ | CF$_3$ | |
| 28 | n-C$_7$H$_{15}$ | CF$_3$ | |
| 29 | n-C$_8$H$_{17}$ | CF$_3$ | |
| 30 | c-C$_3$H$_7$ | CF$_3$ | |
| 31 | c-C$_3$H$_7$CH$_2$ | CF$_3$ | |
| 32 | c-C$_4$H$_9$ | CF$_3$ | |
| 33 | c-C$_5$H$_9$ | CF$_3$ | |
| 34 | c-C$_5$H$_{11}$ | CF$_3$ | |
| 35 | CH$_2$=CH | CF$_3$ | |
| 36 | CH$_3$CH=CH | CF$_3$ | |
| 37 | CH$_2$=CH(CH$_2$)$_2$ | CF$_3$ | |
| 38 | CH$_3$O | CF$_3$ | |
| 39 | C$_2$H$_5$O | CF$_3$ | |
| 40 | n-C$_3$H$_7$O | CF$_3$ | |
| 41 | n-C$_4$H$_9$O | CF$_3$ | |
| 42 | n-C$_5$H$_{11}$O | CF$_3$ | |
| 43 | CH$_3$ | OCF$_3$ | |
| 44 | C$_2$H$_5$ | OCF$_3$ | |
| 45 | n-C$_3$H$_7$ | OCF$_3$ | |
| 46 | n-C$_4$H$_9$ | OCF$_3$ | |
| 47 | n-C$_5$H$_{11}$ | OCF$_3$ | |
| 48 | n-C$_6$H$_{13}$ | OCF$_3$ | |
| 49 | n-C$_7$H$_{15}$ | OCF$_3$ | |
| 50 | n-C$_8$H$_{17}$ | OCF$_3$ | |
| 51 | c-C$_3$H$_7$ | OCF$_3$ | |
| 52 | c-C$_3$H$_7$CH$_2$ | OCF$_3$ | |
| 53 | c-C$_4$H$_9$ | OCF$_3$ | |
| 54 | c-C$_5$H$_9$ | OCF$_3$ | |
| 55 | c-C$_5$H$_{11}$ | OCF$_3$ | |
| 56 | CH$_2$=CH | OCF$_3$ | |
| 57 | CH$_3$CH=CH | OCF$_3$ | |
| 58 | CH$_2$=CH(CH$_2$)$_2$ | OCF$_3$ | |
| 59 | CH$_3$O | OCF$_3$ | |
| 60 | C$_2$H$_5$O | OCF$_3$ | |
| 61 | n-C$_3$H$_7$O | OCF$_3$ | |
| 62 | n-C$_4$H$_9$O | OCF$_3$ | K 82° C. I |
| 63 | n-C$_5$H$_{11}$O | OCF$_3$ | |

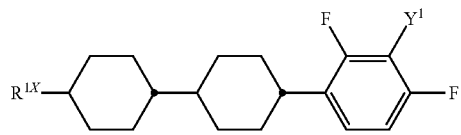

X-2-1

| No: 4- | R$^{LX}$ | Y$^1$ | Phase Range; properties |
|---|---|---|---|
| 1 | CH$_3$ | CL | |
| 2 | C$_2$H$_5$ | CL | |

-continued

| No: 4- | R^LX | Y^1 | Phase Range; properties |
|---|---|---|---|
| 3 | n-C_3H_7 | CL | |
| 4 | n-C_4H_9 | CL | |
| 5 | n-C_5H_11 | CL | |
| 6 | n-C_6H_13 | CL | |
| 7 | n-C_7H_15 | CL | |
| 8 | n-C_8H_17 | CL | |
| 9 | c-C_3H_7 | CL | |
| 10 | c-C_3H_7CH_2 | CL | |
| 11 | c-C_4H_9 | CL | |
| 12 | c-C_5H_9 | CL | |
| 13 | c-C_5H_11 | CL | |
| 14 | CH_2=CH | CL | |
| 15 | CH_3CH=CH | CL | |
| 16 | CH_2=CH(CH_2)_2 | CL | |
| 17 | CH_3O | CL | |
| 18 | C_2H_5O | CL | |
| 19 | n-C_3H_7O | CL | |
| 20 | n-C_4H_9O | CL | |
| 21 | n-C_5H_11O | CL | |
| 22 | CH_3 | CF_3 | |
| 23 | C_2H_5 | CF_3 | |
| 24 | n-C_3H_7 | CF_3 | |
| 25 | n-C_4H_9 | CF_3 | |
| 26 | n-C_5H_11 | CF_3 | |
| 27 | n-C_6H_13 | CF_3 | |
| 28 | n-C_7H_15 | CF_3 | |
| 29 | n-C_8H_17 | CF_3 | |
| 30 | c-C_3H_7 | CF_3 | |
| 31 | c-C_3H_7CH_2 | CF_3 | |
| 32 | c-C_4H_9 | CF_3 | |
| 33 | c-C_5H_9 | CF_3 | |
| 34 | c-C_5H_11 | CF_3 | |
| 35 | CH_2=CH | CF_3 | |
| 36 | CH_3CH=CH | CF_3 | |
| 37 | CH_2=CH(CH_2)_2 | CF_3 | |
| 38 | CH_3O | CF_3 | |
| 39 | C_2H_5O | CF_3 | |
| 40 | n-C_3H_7O | CF_3 | |
| 41 | n-C_4H_9O | CF_3 | |
| 42 | n-C_5H_11O | CF_3 | |
| 43 | CH_3 | OCF_3 | |
| 44 | C_2H_5 | OCF_3 | |
| 45 | n-C_3H_7 | OCF_3 | |
| 46 | n-C_4H_9 | OCF_3 | |
| 47 | n-C_5H_11 | OCF_3 | |
| 48 | n-C_6H_13 | OCF_3 | |
| 49 | n-C_7H_15 | OCF_3 | |
| 50 | n-C_8H_17 | OCF_3 | |
| 51 | c-C_3H_7 | OCF_3 | |
| 52 | c-C_3H_7CH_2 | OCF_3 | |
| 53 | c-C_4H_9 | OCF_3 | |
| 54 | c-C_5H_9 | OCF_3 | |
| 55 | c-C_5H_11 | OCF_3 | |
| 56 | CH_2=CH | OCF_3 | |
| 57 | CH_3CH=CH | OCF_3 | |
| 58 | CH_2=CH(CH_2)_2 | OCF_3 | |
| 59 | CH_3O | OCF_3 | |
| 60 | C_2H_5O | OCF_3 | |
| 61 | n-C_3H_7O | OCF_3 | |
| 62 | n-C_4H_9O | OCF_3 | |
| 63 | n-C_5H_11O | OCF_3 | |

X-2-2

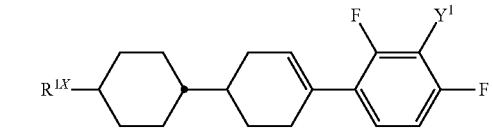

| No: 5- | R^LX | Y^1 | Phase Range; properties |
|---|---|---|---|
| 1 | CH_3 | CL | |
| 2 | C_2H_5 | CL | |
| 3 | n-C_3H_7 | CL | |
| 4 | n-C_4H_9 | CL | |
| 5 | n-C_5H_11 | CL | |
| 6 | n-C_6H_13 | CL | |
| 7 | n-C_7H_15 | CL | |
| 8 | n-C_8H_17 | CL | |
| 9 | c-C_3H_7 | CL | |
| 10 | c-C_3H_7CH_2 | CL | |
| 11 | c-C_4H_9 | CL | |
| 12 | c-C_5H_9 | CL | |
| 13 | c-C_5H_11 | CL | |
| 14 | CH_2=CH | CL | |
| 15 | CH_3CH=CH | CL | |
| 16 | CH_2=CH(CH_2)_2 | CL | |
| 17 | CH_3O | CL | |
| 18 | C_2H_5O | CL | |
| 19 | n-C_3H_7O | CL | |
| 20 | n-C_4H_9O | CL | |
| 21 | n-C_5H_11O | CL | |
| 22 | CH_3 | CF_3 | |
| 23 | C_2H_5 | CF_3 | |
| 24 | n-C_3H_7 | CF_3 | $T_g$ −68 C. K 39° C. I; Δn = 0.0707; Δε = 3.8; $γ_1$ = 217 mPa·s |
| 25 | n-C_4H_9 | CF_3 | |
| 26 | n-C_5H_11 | CF_3 | |
| 27 | n-C_6H_13 | CF_3 | |
| 28 | n-C_7H_15 | CF_3 | |
| 29 | n-C_8H_17 | CF_3 | |
| 30 | c-C_3H_7 | CF_3 | |
| 31 | c-C_3H_7CH_2 | CF_3 | |
| 32 | c-C_4H_9 | CF_3 | |
| 33 | c-C_5H_9 | CF_3 | |
| 34 | c-C_5H_11 | CF_3 | |
| 35 | CH_2=CH | CF_3 | |
| 36 | CH_3CH=CH | CF_3 | |
| 37 | CH_2=CH(CH_2)_2 | CF_3 | |
| 38 | CH_3O | CF_3 | |
| 39 | C_2H_5O | CF_3 | |
| 40 | n-C_3H_7O | CF_3 | |
| 41 | n-C_4H_9O | CF_3 | |
| 42 | n-C_5H_11O | CF_3 | |
| 43 | CH_3 | OCF_3 | |
| 44 | C_2H_5 | OCF_3 | |
| 45 | n-C_3H_7 | OCF_3 | K 38 C. N (−4 C.) I |
| 46 | n-C_4H_9 | OCF_3 | |
| 47 | n-C_5H_11 | OCF_3 | |
| 48 | n-C_6H_13 | OCF_3 | |
| 49 | n-C_7H_15 | OCF_3 | |
| 50 | n-C_8H_17 | OCF_3 | |
| 51 | c-C_3H_7 | OCF_3 | |
| 52 | c-C_3H_7CH_2 | OCF_3 | |
| 53 | c-C_4H_9 | OCF_3 | |
| 54 | c-C_5H_9 | OCF_3 | |
| 55 | c-C_5H_11 | OCF_3 | |
| 56 | CH_2=CH | OCF_3 | |
| 57 | CH_3CH=CH | OCF_3 | |
| 58 | CH_2=CH(CH_2)_2 | OCF_3 | |
| 59 | CH_3O | OCF_3 | |
| 60 | C_2H_5O | OCF_3 | |
| 61 | n-C_3H_7O | OCF_3 | |
| 62 | n-C_4H_9O | OCF_3 | K 63° C. I |
| 63 | n-C_5H_11O | OCF_3 | |

X-2-3

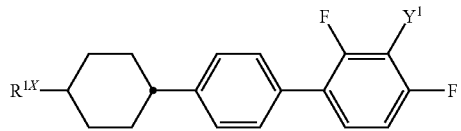

| No: 6- | $R^{LX}$ | $Y^1$ | Phase Range; properties |
|---|---|---|---|
| 1 | $CH_3$ | Cl | |
| 2 | $C_2H_5$ | Cl | |
| 3 | $n-C_3H_7$ | Cl | |
| 4 | $n-C_4H_9$ | Cl | |
| 5 | $n-C_5H_{11}$ | Cl | |
| 6 | $n-C_6H_{13}$ | Cl | |
| 7 | $n-C_7H_{15}$ | Cl | |
| 8 | $n-C_8H_{17}$ | Cl | |
| 9 | $c-C_3H_7$ | Cl | |
| 10 | $c-C_3H_7CH_2$ | Cl | |
| 11 | $c-C_4H_9$ | Cl | |
| 12 | $c-C_5H_9$ | Cl | |
| 13 | $c-C_5H_{11}$ | Cl | |
| 14 | $CH_2=CH$ | Cl | |
| 15 | $CH_3CH=CH$ | Cl | |
| 16 | $CH_2=CH(CH_2)_2$ | Cl | |
| 17 | $CH_3O$ | Cl | |
| 18 | $C_2H_5O$ | Cl | |
| 19 | $n-C_3H_7O$ | Cl | |
| 20 | $n-C_4H_9O$ | Cl | |
| 21 | $n-C_5H_{11}O$ | Cl | |
| 22 | $CH_3$ | $CF_3$ | |
| 23 | $C_2H_5$ | $CF_3$ | |
| 24 | $n-C_3H_7$ | $CF_3$ | K 59° C. I; $\Delta n = 0.0951$; $\Delta\varepsilon = 4.4$; $\gamma_1 = 215$ mPa·s |
| 25 | $n-C_4H_9$ | $CF_3$ | |
| 26 | $n-C_5H_{11}$ | $CF_3$ | |
| 27 | $n-C_6H_{13}$ | $CF_3$ | |
| 28 | $n-C_7H_{15}$ | $CF_3$ | |
| 29 | $n-C_8H_{17}$ | $CF_3$ | |
| 30 | $c-C_3H_7$ | $CF_3$ | |
| 31 | $c-C_3H_7CH_2$ | $CF_3$ | |
| 32 | $c-C_4H_9$ | $CF_3$ | |
| 33 | $c-C_5H_9$ | $CF_3$ | |
| 34 | $c-C_5H_{11}$ | $CF_3$ | |
| 35 | $CH_2=CH$ | $CF_3$ | |
| 36 | $CH_3CH=CH$ | $CF_3$ | |
| 37 | $CH_2=CH(CH_2)_2$ | $CF_3$ | |
| 38 | $CH_3O$ | $CF_3$ | |
| 39 | $C_2H_5O$ | $CF_3$ | |
| 40 | $n-C_3H_7O$ | $CF_3$ | |
| 41 | $n-C_4H_9O$ | $CF_3$ | |
| 42 | $n-C_5H_{11}O$ | $CF_3$ | |
| 43 | $CH_3$ | $OCF_3$ | |
| 44 | $C_2H_5$ | $OCF_3$ | |
| 45 | $n-C_3H_7$ | $OCF_3$ | K 92° C. I |
| 46 | $n-C_4H_9$ | $OCF_3$ | |
| 47 | $n-C_5H_{11}$ | $OCF_3$ | |
| 48 | $n-C_6H_{13}$ | $OCF_3$ | |
| 49 | $n-C_7H_{15}$ | $OCF_3$ | |
| 50 | $n-C_8H_{17}$ | $OCF_3$ | |
| 51 | $c-C_3H_7$ | $OCF_3$ | |
| 52 | $c-C_3H_7CH_2$ | $OCF_3$ | |
| 53 | $c-C_4H_9$ | $OCF_3$ | |
| 54 | $c-C_5H_9$ | $OCF_3$ | |
| 55 | $c-C_5H_{11}$ | $OCF_3$ | |
| 56 | $CH_2=CH$ | $OCF_3$ | |
| 57 | $CH_3CH=CH$ | $OCF_3$ | |
| 58 | $CH_2=CH(CH_2)_2$ | $OCF_3$ | |
| 59 | $CH_3O$ | $OCF_3$ | |
| 60 | $C_2H_5O$ | $OCF_3$ | |
| 61 | $n-C_3H_7O$ | $OCF_3$ | |
| 62 | $n-C_4H_9O$ | $OCF_3$ | |
| 63 | $n-C_5H_{11}O$ | $OCF_3$ | |

X-2-4

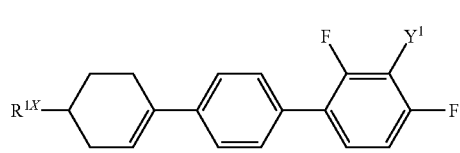

| No: 7- | $R^{LX}$ | $Y^1$ | Phase Range; properties |
|---|---|---|---|
| 1 | $CH_3$ | Cl | |
| 2 | $C_2H_5$ | Cl | |
| 3 | $n-C_3H_7$ | Cl | |
| 4 | $n-C_4H_9$ | Cl | |
| 5 | $n-C_5H_{11}$ | Cl | |
| 6 | $n-C_6H_{13}$ | Cl | |
| 7 | $n-C_7H_{15}$ | Cl | |
| 8 | $n-C_8H_{17}$ | Cl | |
| 9 | $c-C_3H_7$ | Cl | |
| 10 | $c-C_3H_7CH_2$ | Cl | |
| 11 | $c-C_4H_9$ | Cl | |
| 12 | $c-C_5H_9$ | Cl | |
| 13 | $c-C_5H_{11}$ | Cl | |
| 14 | $CH_2=CH$ | Cl | |
| 15 | $CH_3CH=CH$ | Cl | |
| 16 | $CH_2=CH(CH_2)_2$ | Cl | |
| 17 | $CH_3O$ | Cl | |
| 18 | $C_2H_5O$ | Cl | |
| 19 | $n-C_3H_7O$ | Cl | |
| 20 | $n-C_4H_9O$ | Cl | |
| 21 | $n-C_5H_{11}O$ | Cl | |
| 22 | $CH_3$ | $CF_3$ | |
| 23 | $C_2H_5$ | $CF_3$ | |
| 24 | $n-C_3H_7$ | $CF_3$ | K 80° C. I; $\Delta n = 0.1383$; $\Delta\varepsilon = 6.0$; $\gamma_1 = 275$ mPa·s |
| 25 | $n-C_4H_9$ | $CF_3$ | |
| 26 | $n-C_5H_{11}$ | $CF_3$ | |
| 27 | $n-C_6H_{13}$ | $CF_3$ | |
| 28 | $n-C_7H_{15}$ | $CF_3$ | |
| 29 | $n-C_8H_{17}$ | $CF_3$ | |
| 30 | $c-C_3H_7$ | $CF_3$ | |
| 31 | $c-C_3H_7CH_2$ | $CF_3$ | |
| 32 | $c-C_4H_9$ | $CF_3$ | |
| 33 | $c-C_5H_9$ | $CF_3$ | |
| 34 | $c-C_5H_{11}$ | $CF_3$ | |
| 35 | $CH_2=CH$ | $CF_3$ | |
| 36 | $CH_3CH=CH$ | $CF_3$ | |
| 37 | $CH_2=CH(CH_2)_2$ | $CF_3$ | |
| 38 | $CH_3O$ | $CF_3$ | |
| 39 | $C_2H_5O$ | $CF_3$ | |
| 40 | $n-C_3H_7O$ | $CF_3$ | |
| 41 | $n-C_4H_9O$ | $CF_3$ | |
| 42 | $n-C_5H_{11}O$ | $CF_3$ | |
| 43 | $CH_3$ | $OCF_3$ | |
| 44 | $C_2H_5$ | $OCF_3$ | |
| 45 | $n-C_3H_7$ | $OCF_3$ | K 75 C. $S_A$ (50° C.) I; $\Delta n = 0.1363$; $\Delta\varepsilon = 5.9$; $\gamma_1 = 273$ mPa·s |
| 46 | $n-C_4H_9$ | $OCF_3$ | |
| 47 | $n-C_5H_{11}$ | $OCF_3$ | |
| 48 | $n-C_6H_{13}$ | $OCF_3$ | |
| 49 | $n-C_7H_{15}$ | $OCF_3$ | |
| 50 | $n-C_8H_{17}$ | $OCF_3$ | |
| 51 | $c-C_3H_7$ | $OCF_3$ | |
| 52 | $c-C_3H_7CH_2$ | $OCF_3$ | |
| 53 | $c-C_4H_9$ | $OCF_3$ | |
| 54 | $c-C_5H_9$ | $OCF_3$ | |
| 55 | $c-C_5H_{11}$ | $OCF_3$ | |
| 56 | $CH_2=CH$ | $OCF_3$ | |
| 57 | $CH_3CH=CH$ | $OCF_3$ | |
| 58 | $CH_2=CH(CH_2)_2$ | $OCF_3$ | |
| 59 | $CH_3O$ | $OCF_3$ | |
| 60 | $C_2H_5O$ | $OCF_3$ | |
| 61 | $n-C_3H_7O$ | $OCF_3$ | |
| 62 | $n-C_4H_9O$ | $OCF_3$ | |
| 63 | $n-C_5H_{11}O$ | $OCF_3$ | |

X-2-5

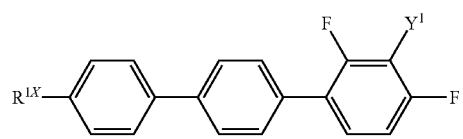

X-2-6

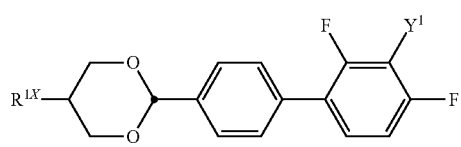

| No: 8- | $R^{1X}$ | $Y^1$ | Phase Range; properties |
|---|---|---|---|
| 1 | $CH_3$ | CL | |
| 2 | $C_2H_5$ | CL | |
| 3 | $n-C_3H_7$ | CL | |
| 4 | $n-C_4H_9$ | CL | |
| 5 | $n-C_5H_{11}$ | CL | |
| 6 | $n-C_6H_{13}$ | CL | |
| 7 | $n-C_7H_{15}$ | CL | |
| 8 | $n-C_8H_{17}$ | CL | |
| 9 | $c-C_3H_7$ | CL | |
| 10 | $c-C_3H_7CH_2$ | CL | |
| 11 | $c-C_4H_9$ | CL | |
| 12 | $c-C_5H_9$ | CL | |
| 13 | $c-C_5H_{11}$ | CL | |
| 14 | $CH_2=CH$ | CL | |
| 15 | $CH_3CH=CH$ | CL | |
| 16 | $CH_2=CH(CH_2)_2$ | CL | |
| 17 | $CH_3O$ | CL | |
| 18 | $C_2H_5O$ | CL | |
| 19 | $n-C_3H_7O$ | CL | |
| 20 | $n-C_4H_9O$ | CL | |
| 21 | $n-C_5H_{11}O$ | CL | |
| 22 | $CH_3$ | $CF_3$ | |
| 23 | $C_2H_5$ | $CF_3$ | |
| 24 | $n-C_3H_7$ | $CF_3$ | K 103 C. $S_A$ (83° C.) I; $\Delta n$ = 0.1830; $\Delta\varepsilon$ = 6.9; $\gamma_1$ = 222 mPa · s |
| 25 | $n-C_4H_9$ | $CF_3$ | |
| 26 | $n-C_5H_{11}$ | $CF_3$ | |
| 27 | $n-C_6H_{13}$ | $CF_3$ | |
| 28 | $n-C_7H_{15}$ | $CF_3$ | |
| 29 | $n-C_8H_{17}$ | $CF_3$ | |
| 30 | $c-C_3H_7$ | $CF_3$ | |
| 31 | $c-C_3H_7CH_2$ | $CF_3$ | |
| 32 | $c-C_4H_9$ | $CF_3$ | |
| 33 | $c-C_5H_9$ | $CF_3$ | |
| 34 | $c-C_5H_{11}$ | $CF_3$ | |
| 35 | $CH_2=CH$ | $CF_3$ | |
| 36 | $CH_3CH=CH$ | $CF_3$ | |
| 37 | $CH_2=CH(CH_2)_2$ | $CF_3$ | |
| 38 | $CH_3O$ | $CF_3$ | |
| 39 | $C_2H_5O$ | $CF_3$ | |
| 40 | $n-C_3H_7O$ | $CF_3$ | |
| 41 | $n-C_4H_9O$ | $CF_3$ | |
| 42 | $n-C_5H_{11}O$ | $CF_3$ | |
| 43 | $CH_3$ | $OCF_3$ | |
| 44 | $C_2H_5$ | $OCF_3$ | |
| 45 | $n-C_3H_7$ | $OCF_3$ | K 96 C. $S_A$ 101° C. I |
| 46 | $n-C_4H_9$ | $OCF_3$ | |
| 47 | $n-C_5H_{11}$ | $OCF_3$ | |
| 48 | $n-C_6H_{13}$ | $OCF_3$ | |
| 49 | $n-C_7H_{15}$ | $OCF_3$ | |
| 50 | $n-C_8H_{17}$ | $OCF_3$ | |
| 51 | $c-C_3H_7$ | $OCF_3$ | |
| 52 | $c-C_3H_7CH_2$ | $OCF_3$ | |
| 53 | $c-C_4H_9$ | $OCF_3$ | |
| 54 | $c-C_5H_9$ | $OCF_3$ | |
| 55 | $c-C_5H_{11}$ | $OCF_3$ | |
| 56 | $CH_2=CH$ | $OCF_3$ | |
| 57 | $CH_3CH=CH$ | $OCF_3$ | |
| 58 | $CH_2=CH(CH_2)_2$ | $OCF_3$ | |
| 59 | $CH_3O$ | $OCF_3$ | |
| 60 | $C_2H_5O$ | $OCF_3$ | |
| 61 | $n-C_3H_7O$ | $OCF_3$ | |
| 62 | $n-C_4H_9O$ | $OCF_3$ | K 63° C. I |
| 63 | $n-C_5H_{11}O$ | $OCF_3$ | |

| No: 9- | $R^{1X}$ | $Y^1$ | Phase Range; properties |
|---|---|---|---|
| 1 | $CH_3$ | CL | |
| 2 | $C_2H_5$ | CL | |
| 3 | $n-C_3H_7$ | CL | |
| 4 | $n-C_4H_9$ | CL | |
| 5 | $n-C_5H_{11}$ | CL | |
| 6 | $n-C_6H_{13}$ | CL | |
| 7 | $n-C_7H_{15}$ | CL | |
| 8 | $n-C_8H_{17}$ | CL | |
| 9 | $c-C_3H_7$ | CL | |
| 10 | $c-C_3H_7CH_2$ | CL | |
| 11 | $c-C_4H_9$ | CL | |
| 12 | $c-C_5H_9$ | CL | |
| 13 | $c-C_5H_{11}$ | CL | |
| 14 | $CH_2=CH$ | CL | |
| 15 | $CH_3CH=CH$ | CL | |
| 16 | $CH_2=CH(CH_2)_2$ | CL | |
| 17 | $CH_3O$ | CL | |
| 18 | $C_2H_5O$ | CL | |
| 19 | $n-C_3H_7O$ | CL | |
| 20 | $n-C_4H_9O$ | CL | |
| 21 | $n-C_5H_{11}O$ | CL | |
| 22 | $CH_3$ | $CF_3$ | |
| 23 | $C_2H_5$ | $CF_3$ | |
| 24 | $n-C_3H_7$ | $CF_3$ | K 123° C. I |
| 25 | $n-C_4H_9$ | $CF_3$ | |
| 26 | $n-C_5H_{11}$ | $CF_3$ | |
| 27 | $n-C_6H_{13}$ | $CF_3$ | |
| 28 | $n-C_7H_{15}$ | $CF_3$ | |
| 29 | $n-C_8H_{17}$ | $CF_3$ | |
| 30 | $c-C_3H_7$ | $CF_3$ | |
| 31 | $c-C_3H_7CH_2$ | $CF_3$ | |
| 32 | $c-C_4H_9$ | $CF_3$ | |
| 33 | $c-C_5H_9$ | $CF_3$ | |
| 34 | $c-C_5H_{11}$ | $CF_3$ | |
| 35 | $CH_2=CH$ | $CF_3$ | |
| 36 | $CH_3CH=CH$ | $CF_3$ | |
| 37 | $CH_2=CH(CH_2)_2$ | $CF_3$ | |
| 38 | $CH_3O$ | $CF_3$ | |
| 39 | $C_2H_5O$ | $CF_3$ | |
| 40 | $n-C_3H_7O$ | $CF_3$ | |
| 41 | $n-C_4H_9O$ | $CF_3$ | |
| 42 | $n-C_5H_{11}O$ | $CF_3$ | |
| 43 | $CH_3$ | $OCF_3$ | |
| 44 | $C_2H_5$ | $OCF_3$ | |
| 45 | $n-C_3H_7$ | $OCF_3$ | K 123° C. I |
| 46 | $n-C_4H_9$ | $OCF_3$ | |
| 47 | $n-C_5H_{11}$ | $OCF_3$ | |
| 48 | $n-C_6H_{13}$ | $OCF_3$ | |
| 49 | $n-C_7H_{15}$ | $OCF_3$ | |
| 50 | $n-C_8H_{17}$ | $OCF_3$ | |
| 51 | $c-C_3H_7$ | $OCF_3$ | |
| 52 | $c-C_3H_7CH_2$ | $OCF_3$ | |
| 53 | $c-C_4H_9$ | $OCF_3$ | |
| 54 | $c-C_5H_9$ | $OCF_3$ | |
| 55 | $c-C_5H_{11}$ | $OCF_3$ | |
| 56 | $CH_2=CH$ | $OCF_3$ | |
| 57 | $CH_3CH=CH$ | $OCF_3$ | |
| 58 | $CH_2=CH(CH_2)_2$ | $OCF_3$ | |
| 59 | $CH_3O$ | $OCF_3$ | |
| 60 | $C_2H_5O$ | $OCF_3$ | |
| 61 | $n-C_3H_7O$ | $OCF_3$ | |
| 62 | $n-C_4H_9O$ | $OCF_3$ | |
| 63 | $n-C_5H_{11}O$ | $OCF_3$ | |

| No: 10- | $R^{1X}$ | $Y^1$ | Phase Range; properties |
|---|---|---|---|
| 1 | $CH_3$ | CL | |
| 2 | $C_2H_5$ | CL | |
| 3 | $n\text{-}C_3H_7$ | CL | |
| 4 | $n\text{-}C_4H_9$ | CL | |
| 5 | $n\text{-}C_5H_{11}$ | CL | |
| 6 | $n\text{-}C_6H_{13}$ | CL | |
| 7 | $n\text{-}C_7H_{15}$ | CL | |
| 8 | $n\text{-}C_8H_{17}$ | CL | |
| 9 | $c\text{-}C_3H_7$ | CL | |
| 10 | $c\text{-}C_3H_7CH_2$ | CL | |
| 11 | $c\text{-}C_4H_9$ | CL | |
| 12 | $c\text{-}C_5H_9$ | CL | |
| 13 | $c\text{-}C_5H_{11}$ | CL | |
| 14 | $CH_2=CH$ | CL | |
| 15 | $CH_3CH=CH$ | CL | |
| 16 | $CH_2=CH(CH_2)_2$ | CL | |
| 17 | $CH_3O$ | CL | |
| 18 | $C_2H_5O$ | CL | |
| 19 | $n\text{-}C_3H_7O$ | CL | |
| 20 | $n\text{-}C_4H_9O$ | CL | |
| 21 | $n\text{-}C_5H_{11}O$ | CL | |
| 22 | $CH_3$ | $CF_3$ | |
| 23 | $C_2H_5$ | $CF_3$ | |
| 24 | $n\text{-}C_3H_7$ | $CF_3$ | K 155° C. I |
| 25 | $n\text{-}C_4H_9$ | $CF_3$ | |
| 26 | $n\text{-}C_5H_{11}$ | $CF_3$ | |
| 27 | $n\text{-}C_6H_{13}$ | $CF_3$ | |
| 28 | $n\text{-}C_7H_{15}$ | $CF_3$ | |
| 29 | $n\text{-}C_8H_{17}$ | $CF_3$ | |
| 30 | $c\text{-}C_3H_7$ | $CF_3$ | |
| 31 | $c\text{-}C_3H_7CH_2$ | $CF_3$ | |
| 32 | $c\text{-}C_4H_9$ | $CF_3$ | |
| 33 | $c\text{-}C_5H_9$ | $CF_3$ | |
| 34 | $c\text{-}C_5H_{11}$ | $CF_3$ | |
| 35 | $CH_2=CH$ | $CF_3$ | |
| 36 | $CH_3CH=CH$ | $CF_3$ | |
| 37 | $CH_2=CH(CH_2)_2$ | $CF_3$ | |
| 38 | $CH_3O$ | $CF_3$ | |
| 39 | $C_2H_5O$ | $CF_3$ | |
| 40 | $n\text{-}C_3H_7O$ | $CF_3$ | |
| 41 | $n\text{-}C_4H_9O$ | $CF_3$ | |
| 42 | $n\text{-}C_5H_{11}O$ | $CF_3$ | |
| 43 | $CH_3$ | $OCF_3$ | |
| 44 | $C_2H_5$ | $OCF_3$ | |
| 45 | $n\text{-}C_3H_7$ | $OCF_3$ | |
| 46 | $n\text{-}C_4H_9$ | $OCF_3$ | |
| 47 | $n\text{-}C_5H_{11}$ | $OCF_3$ | |
| 48 | $n\text{-}C_6H_{13}$ | $OCF_3$ | |
| 49 | $n\text{-}C_7H_{15}$ | $OCF_3$ | |
| 50 | $n\text{-}C_8H_{17}$ | $OCF_3$ | |
| 51 | $c\text{-}C_3H_7$ | $OCF_3$ | |
| 52 | $c\text{-}C_3H_7CH_2$ | $OCF_3$ | |
| 53 | $c\text{-}C_4H_9$ | $OCF_3$ | |
| 54 | $c\text{-}C_5H_9$ | $OCF_3$ | |
| 55 | $c\text{-}C_5H_{11}$ | $OCF_3$ | |
| 56 | $CH_2=CH$ | $OCF_3$ | |
| 57 | $CH_3CH=CH$ | $OCF_3$ | |
| 58 | $CH_2=CH(CH_2)_2$ | $OCF_3$ | |
| 59 | $CH_3O$ | $OCF_3$ | |
| 60 | $C_2H_5O$ | $OCF_3$ | |
| 61 | $n\text{-}C_3H_7O$ | $OCF_3$ | |
| 62 | $n\text{-}C_4H_9O$ | $OCF_3$ | |
| 63 | $n\text{-}C_5H_{11}O$ | $OCF_3$ | |

MIXTURE EXAMPLES

In the following exemplary mixtures are disclosed.

Comparative Example A

The following mixture (CE-A) is prepared and investigated.

Mixture CE-A

| Composition | | | |
|---|---|---|---|
| No. | Compound Abbreviation | Concentration /% by weight | Physical properties |
| 1 | CC-3-V | 31.5 | T(N, I) = 78.5° C. |
| 2 | CC-3-V1 | 6.5 | $n_e$(20° C., 589 nm) = 1.5876 |
| 3 | CCP-3-3 | 6.0 | $\Delta n$(20° C., 589 nm) = 0.1001 |
| 4 | CCP-V-1 | 12.0 | $\varepsilon_\perp$(20° C., 1 kHz) = 3.0 |
| 5 | CCP-V2-1 | 12.0 | $\Delta\varepsilon$(20° C., 1 kHz) = 6.0 |
| 6 | PP-1-2V1 | 5.0 | $\varepsilon_{av.}$(20° C., 1 kHz) = 5.0 |
| 7 | CPGP-5-2 | 2.0 | $\gamma_1$(20° C.) = 64 mPa·s |
| 8 | PUQU-3-F | 20.0 | $k_{11}$(20° C.) = 13.3 pN |
| 9 | APUQU-2-F | 5.0 | $k_{22}$(20° C.) = t.b.d. pN |
| Σ | | 100.0 | $k_{33}$(20° C.) = 15.5 pN |
| | | | $V_0$(20° C.) = 1.58 V |
| | | | $V_{10}$(20° C.) = 2.13 V |

Remark:
t.b.d.: to be determined

TABLE 1

| Example | CE-A | A-1 | A-2 | A-3 |
|---|---|---|---|---|
| Composition | | | | |
| Cpd. | None | PX-3-F | $PX_0$-3-F | CLX-3-F |
| Cpd. Ex. | None | (1) | (2) | (5) |
| c(Cpd.)/% | 0 | 10.0 | 10.0 | 10.0 |
| c(Host A)/% | 100 | 90.0 | 90.0 | 90.0 |
| Properties | | | | |
| T(N, I)/° C. | 78.5 | 52.6 | 54.5 | 73.5 |
| $n_e$(589 nm) | 1.5876 | 1.5794 | 1.5794 | 1.5837 |
| $\Delta n$(589 nm) | 0.1001 | 0.0908 | 0.0914 | 0.04976 |
| $\varepsilon_\perp$(1 kHz) | 3.0 | 3.8 | 3.5 | 3.4 |
| $\Delta\varepsilon$(1 kHz) | 6.0 | 5.4 | 5.3 | 5.7 |
| $\varepsilon_{av.}$(1 kHz) | 5.0 | 5.6 | 5.3 | 5.3 |
| $\varepsilon_\perp/\Delta\varepsilon$(1 kHz) | 0.50 | 0.70 | 0.66 | 0.60 |
| $\gamma_1$/mPa·s | 64 | 51 | 52 | 72 |
| $k_{11}$/pN | 13.3 | 9.3 | 9.3 | 12.8 |
| $k_{33}$/pN | 15.5 | 10.3 | 10.3 | 14.1 |
| $\gamma_1/k_{11}$ * | 4.81 | 5.48 | 5.59 | 5.63 |
| $V_0$/V | 1.58 | t.b.d. | t.b.d. | 1.58 |

Remarks:
all extrapolated values at 20° C.,
* [mPa·s/pN] and
t.b.d.: to be determined

| Example | CE-A | A-4 | A-5 | A-6 |
|---|---|---|---|---|
| Composition | | | | |
| Cpd. | None | $CLX_0$-3-F | CPX-3-F | $CPX_0$-3-F |
| Cpd. Ex. | None | (6) | (7) | (8) |
| c(Cpd.)/% | 0 | 10.0 | 10.0 | 10.0 |
| c(Host A)/% | 100 | 90.0 | 90.0 | 90.0 |
| Properties | | | | |
| T(N, I)/° C. | 78.5 | 73.5 | 71.5 | 71.0 |
| $n_e$(589 nm) | 1.5876 | 1.5873 | 1.5873 | 1.5860 |
| $\Delta n$(589 nm) | 0.1001 | 0.0975 | 0.1002 | 0.0995 |
| $\varepsilon_\perp$(1 kHz) | 3.0 | 3.3 | 3.5 | 3.4 |

TABLE 1-continued

| | | | | |
|---|---|---|---|---|
| $\Delta\varepsilon$(1 kHz) | 6.0 | 5.7 | 5.7 | 5.6 |
| $\varepsilon_{av.}$(1 kHz) | 5.0 | 5.2 | 5.4 | 5.2 |
| $\varepsilon_\perp/\Delta\varepsilon$(1 kHz) | 0.50 | 0.58 | 0.61 | 0.61 |
| $\gamma_1$/mPa·s | 64 | 70 | 72 | 66 |
| $k_{11}$/pN | 13.3 | 12.9 | 12.1 | 12.3 |
| $k_{33}$/pN | 15.5 | 13.9 | 13.6 | 13.2 |
| $\gamma_1/k_{11}$ * | 4.81 | 5.43 | 5.95 | 4.96 |
| $V_0$/V | 1.58 | 1.59 | 1.54 | 1.55 |

Remarks:
all extrapolated values at 20° C. and
* [mPa·s/pN].

| Example | CE-A | A-7 | A-8 | A-9 |
|---|---|---|---|---|
| | Composition | | | |
| Cpd. | None | LPX-3-F | LPX$_0$-3-F | PPX-3-F |
| Synth. Ex. | None | (9) | (10) | (11) |
| c(Cpd.)/% | 0 | 10.0 | 10.0 | 10.0 |
| c(Host A)/% | 100 | 90.0 | 90.0 | 90.0 |
| | Properties | | | |
| T(N, I)/° C. | 78.5 | 72.0 | 73.0 | 74.0 |
| $n_e$(589 nm) | 1.5876 | 1.5928 | 1.5918 | t.b.d. |
| $\Delta n$(589 nm) | 0.1001 | 0.1046 | 0.1041 | t.b.d. |
| $\varepsilon_\perp$(1 kHz) | 3.0 | 3.5 | 3.3 | t.b.d. |
| $\Delta\varepsilon$(1 kHz) | 6.0 | 5.9 | 5.9 | t.b.d. |
| $\varepsilon_{av.}$(1 kHz) | 5.0 | 5.5 | 5.3 | t.b.d. |
| $\varepsilon_\perp/\Delta\varepsilon$(1 kHz) | 0.50 | 0.59 | 0.56 | t.b.d. |
| $\gamma_1$/mPa·s | 64 | 72 | 73 | t.b.d. |
| $k_{11}$/pN | 13.3 | 13.1 | 13.3 | t.b.d. |
| $k_{33}$/pN | 15.5 | 13.8 | 13.7 | t.b.d. |
| $\gamma_1/k_{11}$ * | 4.81 | 5.50 | 5.49 | t.b.d. |
| $V_0$/V | 1.58 | 1.57 | 1.59 | t.b.d. |

Remarks:
all extrapolated values at 20° C.,
* [mPa·s/pN] and
t.b.d.: to be determined.

| Example | CE-A | A-10 | A-11 | A-12 |
|---|---|---|---|---|
| | Composition | | | |
| Cpd. | None | PPX$_0$-3-F | DPX-3-F | DPX$_0$-3-F |
| Synth. Ex. | None | (12) | (13) | (14) |
| c(Cpd.)/% | 0 | 10.0 | 5.0 | 5.0 |
| c(Host A)/% | 100 | 90.0 | 95.0 | 95.0 |
| | Properties | | | |
| T(N, I)/° C. | 78.5 | 73.0 | t.b.d. | t.b.d. |
| $n_e$(589 nm) | 1.5876 | 1.5970 | t.b.d. | t.b.d. |
| $\Delta n$(589 nm) | 0.1001 | 0.1086 | t.b.d. | t.b.d. |
| $\varepsilon_\perp$(1 kHz) | 3.0 | 3.3 | t.b.d. | t.b.d. |
| $\Delta\varepsilon$(1 kHz) | 6.0 | 6.0 | t.b.d. | t.b.d. |
| $\varepsilon_{av.}$(1 kHz) | 5.0 | 5.3 | t.b.d. | t.b.d. |
| $\varepsilon_\perp/\Delta\varepsilon$(1 kHz) | 0.50 | 0.55 | t.b.d. | t.b.d. |
| $\gamma_1$/mPa·s | 64 | 71 | t.b.d. | t.b.d. |
| $k_{11}$/pN | 13.3 | 13.7 | t.b.d. | t.b.d. |
| $k_{33}$/pN | 15.5 | 16.4 | t.b.d. | t.b.d. |
| $\gamma_1/k_{11}$ * | 4.81 | 5.18 | t.b.d. | t.b.d. |
| $V_0$/V | 1.58 | 1.59 | t.b.d. | t.b.d. |

Remarks:
all extrapolated values at 20° C.,
* [mPa·s/pN] and
t.b.d.: to be determined.

These mixtures, mixtures A-1 to A-12, have good dielectric ratios ($\varepsilon_\perp/\Delta\varepsilon$), good ratios of ($\gamma_1/k_{11}$) and are characterized by very good transmissions in an FFS display and show very short response time. Moreover, they show excellent deep temperature stability at least up to a temperature of −20° C.

Example 1

The following mixture (M-1) is prepared and investigated.

Mixture M-1

| Composition | | | |
|---|---|---|---|
| Compound | | Concentration | |
| No. | Abbreviation | /% by weight | Physical properties |
| 1 | CLX-3-F | 10.0 | T(N, I) = 81.0° C. |
| 2 | CC-3-V | 41.0 | $n_e$(20° C., 589 nm) = 1.5822 |
| 3 | CC-3-V1 | 7.0 | $\Delta n$(20° C., 589 nm) = 0.0967 |
| 4 | CCP-V-1 | 3.0 | $\varepsilon_\perp$(20° C., 1 kHz) = 3.4 |
| 5 | CLP-V-1 | 7.0 | $\Delta\varepsilon$(20° C., 1 kHz) = 4.7 |
| 6 | CCVC-3-V | 3.0 | $\varepsilon_{av.}$(20° C., 1 kHz) = 5.0 |
| 7 | PGP-2-2V | 10.5 | $\gamma_1$(20° C.) = 65 mPa·s |
| 8 | CDU-2-F | 6.0 | $k_{11}$(20° C.) = 13.8 pN |
| 9 | PPGU-3-F | 0.5 | $k_{33}$(20° C.) = 14.2 pN |
| 10 | APUQU-2-F | 2.0 | $V_0$(20° C.) = 1.81 V |
| 11 | APUQU-3-F | 3.0 | |
| 12 | PGUQU-3-F | 3.0 | |
| 13 | PGUQU-4-F | 4.0 | |
| Σ | | 100.0 | |

This mixture, mixture M-1, has a dielectric ratio ($\varepsilon_\perp/\Delta\varepsilon$) of 0.72, a ratio of ($\gamma_1/k_{11}$) of 4.71 mPa·s/pN, is characterized by a very good transmission in an FFS display and a good response time and has a very good low temperature stability.

Example 2

The following mixture (M-2) is prepared and investigated.

Mixture M-2

| Composition | | | |
|---|---|---|---|
| Compound | | Concentration | |
| No. | Abbreviation | /% by weight | Physical properties |
| 1 | CLX-3-F | 10.0 | T(N, I) = 82.0° C. |
| 2 | CC-3-V | 41.0 | $n_e$(20° C., 589 nm) = 1.5834 |
| 3 | CC-3-V1 | 7.0 | $\Delta n$(20° C., 589 nm) = 0.0986 |
| 4 | CCP-V-1 | 6.5 | $\varepsilon_\perp$(20° C., 1 kHz) = 3.4 |
| 5 | CLP-V-1 | 7.0 | $\Delta\varepsilon$(20° C., 1 kHz) = 4.7 |
| 6 | CCVC-3-V | 3.0 | $\varepsilon_{av.}$(20° C., 1 kHz) = 6.0 |
| 7 | PGP-2-2V | 7.5 | $\gamma_1$(20° C.) = 64 mPa·s |
| 8 | CDU-2-F | 6.0 | $k_{11}$(20° C.) = 13.8 pN |
| 9 | PPGU-3-F | 0.5 | $k_{33}$(20° C.) = 15.4 pN |
| 10 | APUQU-3-F | 4.5 | $V_0$(20° C.) = 1.82 V |
| 11 | PGUQU-3-F | 3.0 | |
| 12 | PGUQU-4-F | 4.0 | |
| Σ | | 100.0 | |

This mixture, mixture M-2, has a dielectric ratio ($\varepsilon_\perp/\Delta\varepsilon$) of 0.72 a ratio of ($\gamma_1/k_{11}$) of 4.64 mPa·s/pN, is characterized by a very good transmission in an FFS display and has a very good low temperature stability.

Example 3

The following mixture (M-3) is prepared and investigated.

Mixture M-3

| Composition | | | |
|---|---|---|---|
| Compound | | Concentration | |
| No. | Abbreviation | /% by weight | Physical properties |
| 1 | LPX-3-F | 10.0 | T(N, I) = 82.0° C. |
| 2 | CC-3-V | 41.0 | $n_e$(20° C., 589 nm) = 1.5877 |
| 3 | CC-3-V1 | 7.0 | $\Delta n$(20° C., 589 nm) = 0.1016 |
| 4 | CCP-V-1 | 9.5 | $\varepsilon_\perp$(20° C., 1 kHz) = 3.3 |
| 5 | CLP-V-1 | 7.0 | $\Delta\varepsilon$(20° C., 1 kHz) = 4.6 |
| 6 | CCVC-3-V | 3.0 | $\varepsilon_{av.}$(20° C., 1 kHz) = 4.8 |
| 7 | PGP-2-2V | 5.0 | $\gamma_1$(20° C.) = 66 mPa·s |
| 8 | CDU-2-F | 6.0 | $k_{11}$(20° C.) = 14.1 pN |
| 9 | PPGU-3-F | 0.5 | $k_{33}$(20° C.) = 14.7 pN |
| 10 | APUQU-3-F | 4.0 | $V_0$(20° C.) = 1.85 V |
| 11 | PGUQU-3-F | 3.0 | |
| 12 | PGUQU-4-F | 4.0 | |
| Σ | | 100.0 | |

This mixture, mixture M-3, has a dielectric ratio ($\varepsilon_\perp/\Delta\varepsilon$) of 0.72, a ratio of ($\gamma_1/k_{11}$) of 4.68 mPa·s/pN, is characterized by a very good transmission in an FFS display and a good response time and has a very good low temperature stability.

Example 4

The following mixture (M-4) is prepared and investigated.

Mixture M-4

| Composition | | | |
|---|---|---|---|
| Compound | | Concentration | |
| No. | Abbreviation | /% by weight | Physical properties |
| 1 | LPX-3-F | 12.0 | T(N, I) = 80.0° C. |
| 2 | CC-3-V | 38.5 | $n_e$(20° C., 589 nm) = 1.5920 |
| 3 | CC-3-V1 | 7.0 | $\Delta n$(20° C., 589 nm) = 0.1042 |
| 4 | CCP-V-1 | 10.0 | $\varepsilon_\perp$(20° C., 1 kHz) = 3.4 |
| 5 | CLP-V-1 | 7.0 | $\Delta\varepsilon$(20° C., 1 kHz) = 4.5 |
| 6 | CCVC-3-V | 3.0 | $\varepsilon_{av.}$(20° C., 1 kHz) = 4.9 |
| 7 | PGP-2-2V | 4.5 | $\gamma_1$(20° C.) = t.b.d. mPa·s |
| 8 | CDU-2-F | 6.0 | $k_{11}$(20° C.) = 14.2 pN |
| 9 | PGU-3-F | 4.5 | $k_{33}$(20° C.) = 13.9 pN |
| 10 | PPGU-3-F | 0.5 | $V_0$(20° C.) = 1.87 V |
| 11 | APUQU-3-F | 3.0 | |
| 12 | PGUQU-3-F | 2.0 | |
| 13 | PGUQU-4-F | 2.0 | |
| Σ | | 100.0 | |

Remark:
t.b.d.: to be determined

This mixture, mixture M-4, has a dielectric ratio ($\varepsilon_\perp/\Delta\varepsilon$) of 0.76, is characterized by a very good transmission in an FFS display and has a a very good low temperature stability.

Example 5

The following mixture (M-5) is prepared and investigated.

Mixture M-5

| Composition | | | |
|---|---|---|---|
| Compound | | Concentration | |
| No. | Abbreviation | /% by weight | Physical properties |
| 1 | LPX$_0$-3-F | 10.0 | T(N, I) = 82.0° C. |
| 2 | CC-3-V | 41.0 | $n_e$(20° C., 589 nm) = 1.5872 |
| 3 | CC-3-V1 | 7.0 | $\Delta n$(20° C., 589 nm) = 0.1014 |
| 4 | CCP-V-1 | 9.5 | $\varepsilon_\perp$(20° C., 1 kHz) = 3.2 |
| 5 | CLP-V-1 | 7.0 | $\Delta\varepsilon$(20° C., 1 kHz) = 4.5 |
| 6 | CCVC-3-V | 3.0 | $\varepsilon_{av.}$(20° C., 1 kHz) = 4.7 |
| 7 | PGP-2-2V | 5.0 | $\gamma_1$(20° C.) = 65 mPa·s |
| 8 | CDU-2-F | 6.0 | $k_{11}$(20° C.) = 14.4 pN |
| 9 | PPGU-3-F | 0.5 | $k_{33}$(20° C.) = 14.3 pN |
| 10 | APUQU-3-F | 4.0 | $V_0$(20° C.) = 1.88 V |
| 11 | PGUQU-3-F | 3.0 | |
| 12 | PGUQU-4-F | 4.0 | |
| Σ | | 100.0 | |

This mixture, mixture M-5, has a dielectric ratio ($\varepsilon_\perp/\Delta\varepsilon$) of 0.71, a ratio of ($\gamma_1/k_{11}$) of 4.51 mPa·s/pN, is characterized by a very good transmission in an FFS display and has a very good low temperature stability.

Example 6

The following mixture (M-6) is prepared and investigated.

Mixture M-6

| Composition | | | |
|---|---|---|---|
| Compound | | Concentration | |
| No. | Abbreviation | /% by weight | Physical properties |
| 1 | LPX$_0$-3-F | 12.0 | T(N, I) = 80.5° C. |
| 2 | CC-3-V | 39.0 | $n_e$(20° C., 589 nm) = 1.5920 |
| 3 | CC-3-V1 | 7.0 | $\Delta n$(20° C., 589 nm) = 0.1052 |
| 4 | CCP-V-1 | 8.0 | $\varepsilon_\perp$(20° C., 1 kHz) = 3.3 |
| 5 | CLP-V-1 | 8.0 | $\Delta\varepsilon$(20° C., 1 kHz) = 4.5 |
| 6 | CCVC-3-V | 3.0 | $\varepsilon_{av.}$(20° C., 1 kHz) = 4.8 |
| 7 | PGP-2-2V | 5.5 | $\gamma_1$(20° C.) = t.b.d. mPa·s |
| 8 | CDU-2-F | 6.0 | $k_{11}$(20° C.) = 14.9 pN |
| 9 | PGU-3-F | 3.0 | $k_{33}$(20° C.) = 13.9 pN |
| 10 | PPGU-3-F | 0.5 | $V_0$(20° C.) = 1.92 V |
| 11 | APUQU-3-F | 3.0 | |
| 12 | PGUQU-3-F | 2.0 | |
| 13 | PGUQU-4-F | 3.0 | |
| Σ | | 100.0 | |

Remark:
t.b.d.: to be determined

This mixture, mixture M-6, has a dielectric ratio ($\varepsilon_\perp/\Delta\varepsilon$) of 0.73, is characterized by a very good transmission in an FFS display and has a very good low temperature stability.

Example 7

The following mixture (M-7) is prepared and investigated.

| Mixture M-7 | | |
|---|---|---|
| Composition | | |
| Compound | Concentration | |
| No. Abbreviation | /% by weight | Physical properties |
| 1  PX-3-F | 4.0 | T(N, I) = 80.0° C. |
| 2  CC-3-V | 32.5 | $n_e$(20° C., 589 nm) = 1.5902 |
| 3  CC-3-V1 | 9.0 | $\Delta n$(20° C., 589 nm) = 0.1054 |
| 4  CC-3-2V1 | 7.0 | $\varepsilon_\perp$(20° C., 1 kHz) = 3.8 |
| 5  CCP-V-1 | 5.0 | $\Delta\varepsilon$(20° C., 1 kHz) = 4.6 |
| 6  CLP-V-1 | 8.5 | $\varepsilon_{av.}$(20° C., 1 kHz) = 5.3 |
| 7  CCVC-3-V | 3.0 | $\gamma_1$(20° C.) = 67 mPa · s |
| 8  PGP-2-2V | 7.0 | $k_{11}$(20° C.) = 15.2 pN |
| 9  B-5O-OT | 3.0 | $k_{33}$(20° C.) = 14.7 pN |
| 10  B-5O-T | 3.0 | $V_0$(20° C.) = 1.92 V |
| 11  CLP-3-T | 3.5 | |
| 12  APUQU-2-F | 4.0 | |
| 13  APUQU-3-F | 4.5 | |
| 14  PGUQU-3-F | 2.5 | |
| 15  PGUQU-4-F | 3.5 | |
| Σ | 100.0 | |

This mixture, mixture M-7, has a dielectric ratio ($\varepsilon_\perp/\Delta\varepsilon$) of 0.83, a ratio of ($\gamma_1/k_{11}$) of 4.40 mPa·s/pN, is characterized by a very good transmission in good low temperature stability.

Example 8

The following mixture (M-8) is prepared and investigated.

| Mixture M-8 | | |
|---|---|---|
| Composition | | |
| Compound | Concentration | |
| No. Abbreviation | /% by weight | Physical properties |
| 1  PX-3-F | 7.0 | T(N, I) = 77.5° C. |
| 2  CC-3-V | 33.5 | $n_e$(20° C., 589 nm) = 1.5967 |
| 3  CC-3-V1 | 6.0 | $\Delta n$(20° C., 589 nm) = 0.1067 |
| 4  CCP-V-1 | 3.0 | $\varepsilon_\perp$(20° C., 1 kHz) = 3.6 |
| 5  CLP-V-1 | 8.0 | $\Delta\varepsilon$(20° C., 1 kHz) = 4.6 |
| 6  CCVC-3-V | 3.5 | $\varepsilon_{av.}$(20° C., 1 kHz) = 5.1 |
| 7  PGP-1-2V | 5.0 | $\gamma_1$(20° C.) = 63 mPa · s |
| 8  PGP-2-2V | 9.0 | $k_{11}$(20° C.) = 12.1 pN |
| 9  CCG-V-F | 8.0 | $k_{33}$(20° C.) = 13.4 pN |
| 10  CDU-2-F | 8.0 | $V_0$(20° C.) = 1.92 V |
| 11  PPGU-3-F | 0.5 | |
| 12  APUQU-2-F | 3.0 | |
| 13  APUQU-3-F | 3.5 | |
| 14  PGUQU-3-F | 2.0 | |
| Σ | 100.0 | |

This mixture, mixture M-8, has a dielectric ratio ($\varepsilon_\perp/\Delta\varepsilon$) of 0.78, a ratio of ($\gamma_1/k_{11}$) of 5.21 mPa·s/pN, is characterized by a very good transmission in an FFS display and has a very good low temperature stability.

Example 9

The following mixture (M-9) is prepared and investigated.

| Mixture M-9 | | |
|---|---|---|
| Composition | | |
| Compound | Concentration | |
| No. Abbreviation | /% by weight | Physical properties |
| 1  PX-3-F | 10.0 | T(N, I) = 79.0° C. |
| 2  CC-3-V | 28.0 | $n_e$(20° C., 589 nm) = 1.5956 |
| 3  CC-3-V1 | 7.0 | $\Delta n$(20° C., 589 nm) = 0.1051 |
| 4  CCP-V-1 | 14.0 | $\varepsilon_\perp$(20° C., 1 kHz) = 3.6 |
| 5  CLP-V-1 | 8.0 | $\Delta\varepsilon$(20° C., 1 kHz) = 4.5 |
| 6  CCVC-3-V | 4.0 | $\varepsilon_{av.}$(20° C., 1 kHz) = 5.1 |
| 7  PGP-1-2V | 4.5 | $\gamma_1$(20° C.) = 67 mPa · s |
| 8  PGP-2-2V | 7.0 | $k_{11}$(20° C.) = 12.4 pN |
| 9  CDU-2-F | 8.5 | $k_{33}$(20° C.) = 13.2 pN |
| 10  PPGU-3-F | 0.5 | $V_0$(20° C.) = 1.75 V |
| 11  APUQU-2-F | 4.0 | |
| 12  APUQU-3-F | 4.5 | |
| Σ | 100.0 | |

This mixture, mixture M-9, has a dielectric ratio ($\varepsilon_\perp/\Delta\varepsilon$) of 0.80, a ratio of ($\gamma_1/k_{11}$) of 5.40 mPa·s/pN, is characterized by a very good transmission in an FFS display and has a very good low temperature stability.

Example 10

The following mixture (M-10) is prepared and investigated.

| Mixture M-10 | | |
|---|---|---|
| Composition | | |
| Compound | Concentration | |
| No. Abbreviation | /% by weight | Physical properties |
| 1  PX$_O$-3-F | 4.5 | T(N, I) = 78.0° C. |
| 2  CC-3-V | 31.5 | $n_e$(20° C., 589 nm) = 1.5875 |
| 3  CC-3-V1 | 9.0 | $\Delta n$(20° C., 589 nm) = 0.1033 |
| 4  CC-3-2V1 | 7.0 | $\varepsilon_\perp$(20° C., 1 kHz) = 3.7 |
| 5  CCP-V-1 | 4.0 | $\Delta\varepsilon$(20° C., 1 kHz) = 4.7 |
| 6  CLP-V-1 | 8.5 | $\varepsilon_{av.}$(20° C., 1 kHz) = 5.3 |
| 7  CCVC-3-V | 3.0 | $\gamma_1$(20° C.) = 68 mPa · s |
| 8  PP-1-2V1 | 2.5 | $k_{11}$(20° C.) = 15.3 pN |
| 9  PGP-2-2V | 6.0 | $k_{33}$(20° C.) = 15.1 pN |
| 10  B-5O-OT | 2.5 | $V_0$(20° C.) = 1.91 V |
| 11  B-5O-T | 3.0 | |
| 12  CLP-3-T | 3.5 | |
| 13  CDUQU-3-F | 3.0 | |
| 14  APUQU-2-F | 4.0 | |
| 15  APUQU-3-F | 5.0 | |
| 16  PGUQU-4-F | 3.0 | |
| Σ | 100.0 | |

This mixture, mixture M-10, has a dielectric ratio ($\varepsilon_\perp/\Delta\varepsilon$) of 0.79, a ratio of ($\gamma_1/k_{11}$) of 4.44 mPa·s/pN, is characterized by a very good transmission in an FFS display and has a very good low temperature stability.

Example 11

The following mixture (M-11) is prepared and investigated.

| Mixture M-11 | | | |
|---|---|---|---|
| Composition | | | |
| Compound | | Concentration | |
| No. | Abbreviation | /% by weight | Physical properties |
| 1 | PX$_0$-3-F | 2.0 | T(N, I) = 77.5° C. |
| 2 | CC-3-V | 31.5 | n$_e$(20° C., 589 nm) = 1.6118 |
| 3 | CCP-V-1 | 8.0 | Δn(20° C., 589 nm) = 0.1237 |
| 4 | CLP-V-1 | 3.0 | ε$_\perp$(20° C., 1 kHz) = 4.8 |
| 5 | CCVC-3-V | 2.5 | Δε(20° C., 1 kHz) = 11.5 |
| 6 | PGP-2-2V | 9.5 | ε$_{av.}$(20° C., 1 kHz) = 8.3 |
| 7 | YG-4O-F | 4.0 | ε$_\perp$/Δε = 0.42 |
| 8 | B-5O-OT | 2.0 | γ$_1$(20° C.) = 87 mPa · s |
| 9 | B-5O-T | 2.0 | k$_{11}$(20° C.) = 12.8 pN |
| 10 | CLP-3-T | 2.0 | k$_{33}$(20° C.) = 12.6 pN |
| 11 | DPGU-4-F | 3.0 | V$_0$(20° C.) = 1.11 V |
| 12 | PUQU-3-F | 6.5 | γ$_1$/k$_{11}$ = 6.8 mPa · s pN |
| 13 | CDUQU-3-F | 3.5 | |
| 14 | APUQU-2-F | 4.5 | |
| 15 | APUQU-3-F | 5.0 | |
| 16 | DGUQU-4-F | 4.0 | |
| 17 | PGUQU-3-F | 3.0 | |
| 18 | PGUQU-4-F | 4.0 | |
| Σ | | 100.0 | |

This mixture, mixture M-11, is characterized by a very good transmission in an FFS display and has a very good low temperature stability.

Example 12

The following mixture (M-12) is prepared and investigated.

| Mixture M-12 | | | |
|---|---|---|---|
| Composition | | | |
| Compound | | Concentration | |
| No. | Abbreviation | /% by weight | Physical properties |
| 1 | PX$_0$-3-F | 3.0 | T(N, I) = 73.5° C. |
| 2 | CC-3-V | 29.0 | n$_e$(20° C., 589 nm) = 1.6092 |
| 3 | CC-3-V1 | 3.0 | Δn(20° C., 589 nm) = 0.1219 |
| 4 | CCP-V-1 | 6.5 | ε$_\perp$(20° C., 1 kHz) = 4.7 |
| 5 | CCP-3-OT | 3.0 | Δε(20° C., 1 kHz) = 11.4 |
| 6 | CCVC-3-V | 2.5 | ε$_{av.}$(20° C., 1 kHz) = 8.5 |
| 7 | PGP-1-2V | 3.0 | ε$_\perp$/Δε = 0.41 |
| 8 | PGP-2-2V | 8.0 | γ$_1$(20° C.) = 82 mPa · s |
| 9 | B-5O-T | 3.0 | k$_{11}$(20° C.) = 12.1 pN |
| 10 | YG-4O-F | 3.5 | k$_{33}$(20° C.) = 12.5 pN |
| 11 | CLP-3-T | 2.0 | V$_0$(20° C.) = 1.08 V |
| 12 | DPGU-4-F | 2.5 | γ1/k11 = 6.78 mPa · s pN |
| 13 | PUQU-3-F | 9.0 | |
| 14 | CDUQU-3-F | 3.0 | |
| 15 | APUQU-2-F | 5.0 | |
| 16 | APUQU-3-F | 4.5 | |
| 17 | DGUQU-4-F | 3.5 | |
| 18 | PGUQU-3-F | 3.0 | |
| 19 | PGUQU-4-F | 3.0 | |
| Σ | | 100.0 | |

This mixture, mixture M-12, is characterized by a very good transmission in an FFS display and has a very good low temperature stability.

Example 13

The following mixture (M-13) is prepared and investigated.

| Mixture M-13 | | | |
|---|---|---|---|
| Composition | | | |
| Compound | | Concentration | |
| No. | Abbreviation | /% by weight | Physical properties |
| 1 | PX$_0$-3-F | 2.5 | T(N, I) = 80.0° C. |
| 2 | CC-3-V | 30.5 | n$_e$(20° C., 589 nm) = 1.6087 |
| 3 | CC-3-V1 | 3.5 | Δn(20° C., 589 nm) = 0.1233 |
| 4 | CCP-V-1 | 5.5 | ε$_\perp$(20° C., 1 kHz) = 4.4 |
| 5 | CCP-3-OT | 3.0 | Δε(20° C., 1 kHz) = 11.6 |
| 6 | CCVC-3-V | 2.5 | ε$_{av.}$(20° C., 1 kHz) = 8.3 |
| 7 | PGP-1-2V | 3.0 | ε$_\perp$/Δε = 0.38 |
| 8 | PGP-2-2V | 7.5 | γ$_1$(20° C.) = 85 mPa · s |
| 9 | B-5O-T | 3.0 | k$_{11}$(20° C.) = 13.8 pN |
| 10 | YG-4O-F | 2.0 | k$_{33}$(20° C.) = 13.2 pN |
| 11 | CLP-3-T | 4.0 | V$_0$(20° C.) = 1.14 V |
| 12 | DPGU-4-F | 3.0 | γ$_1$/k$_{11}$ = 6.16 mPa · s pN |
| 13 | PUQU-3-F | 6.0 | |
| 14 | CDUQU-3-F | 3.0 | |
| 15 | APUQU-2-F | 5.0 | |
| 16 | APUQU-3-F | 5.0 | |
| 17 | DGUQU-4-F | 4.0 | |
| 18 | PGUQU-3-F | 3.0 | |
| 19 | PGUQU-4-F | 4.0 | |
| Σ | | 100.0 | |

This mixture, mixture M-13, is characterized by a very good transmission in an FFS display and has a very good low temperature stability.

Example 14

The following mixture (M-14) is prepared and investigated.

| Mixture M-14 | | | |
|---|---|---|---|
| Composition | | | |
| Compound | | Concentration | |
| No. | Abbreviation | /% by weight | Physical properties |
| 1 | PX$_0$-3-F | 2.0 | T(N, I) = 81.5° C. |
| 2 | CC-3-V | 30.0 | n$_e$(20° C., 589 nm) = 1.6094 |
| 3 | CC-3-V1 | 5.0 | Δn(20° C., 589 nm) = 0.1225 |
| 4 | CCP-V-1 | 8.5 | ε$_\perp$(20° C., 1 kHz) = 4.2 |
| 5 | CLP-V-1 | 6.0 | Δε(20° C., 1 kHz) = 11.7 |
| 6 | PGP-1-2V | 2.5 | ε$_{av.}$(20° C., 1 kHz) = 8.1 |
| 7 | PGP-2-2V | 5.0 | ε$_\perp$/Δε = 0.36 |
| 8 | B-5O-OT | 2.0 | γ$_1$(20° C.) = 85 mPa · s |
| 9 | B-5O-T | 2.0 | k$_{11}$(20° C.) = 14.2 pN |
| 10 | CLP-3-T | 3.0 | k$_{33}$(20° C.) = 14.1 pN |
| 11 | DPGU-4-F | 2.5 | V$_0$(20° C.) = 1.16 V |
| 12 | PUQU-3-F | 8.0 | γ$_1$/k$_{11}$ = 5.99 mPa · s pN |
| 13 | CDUQU-3-F | 2.5 | pN |
| 14 | APUQU-2-F | 4.5 | |
| 15 | APUQU-3-F | 5.0 | |
| 16 | DGUQU-4-F | 4.0 | |
| 17 | PGUQU-3-F | 3.5 | |
| 18 | PGUQU-4-F | 4.0 | |
| Σ | | 100.0 | |

This mixture, mixture M-14, is characterized by a very good transmission in an FFS display and has a very good low temperature stability.

Example 15

The following mixture (M-15) is prepared and investigated.

| Mixture M-15 | | | |
|---|---|---|---|
| Composition | | | |
| Compound | | Concentration | |
| No. | Abbreviation | /% by weight | Physical properties |
| 1 | $PX_0$-3-F | 2.5 | T(N, I) = 80.5° C. |
| 2 | CC-3-V | 32.0 | $n_e$(20° C., 589 nm) = 1.6064 |
| 3 | CC-3-V1 | 3.0 | $\Delta n$(20° C., 589 nm) = 0.1219 |
| 4 | CCP-V-1 | 5.5 | $\varepsilon_\perp$(20° C., 1 kHz) = 4.3 |
| 5 | CCVC-3-V | 3.0 | $\Delta\varepsilon$(20° C., 1 kHz) = 11.5 |
| 6 | PGP-1-2V | 3.0 | $\varepsilon_{av.}$(20° C., 1 kHz) = 8.1 |
| 7 | PGP-2-2V | 7.0 | $\varepsilon_\perp/\Delta\varepsilon$ = 0.37 |
| 8 | B-5O-OT | 2.0 | $\gamma_1$(20° C.) = 83 mPa · s |
| 9 | B-5O-T | 2.0 | $k_{11}$(20° C.) = 13.8 pN |
| 10 | CCP-3-OT | 3.0 | $k_{33}$(20° C.) = 14.2 pN |
| 11 | CLP-3-T | 4.0 | $V_0$(20° C.) = 1.15 V |
| 12 | DPGU-4-F | 2.5 | $\gamma_1/k_{11}$ = 6.01 mPa · s pN |
| 13 | PUQU-3-F | 7.0 | |
| 14 | CDUQU-3-F | 2.5 | |
| 15 | APUQU-2-F | 4.5 | |
| 16 | APUQU-3-F | 5.0 | |
| 17 | DGUQU-4-F | 4.0 | |
| 18 | PGUQU-3-F | 3.5 | |
| 19 | PGUQU-4-F | 4.0 | |
| Σ | | 100.0 | |

This mixture, mixture M-15, is characterized by a very good transmission in an FFS display and has a very good low temperature stability.

Example 16

The following mixture (M-16) is prepared and investigated.

| Mixture M-16 | | | |
|---|---|---|---|
| Composition | | | |
| Compound | | Concentration | |
| No. | Abbreviation | /% by weight | Physical properties |
| 1 | $PX_0$-3-F | 1.0 | T(N, I) = 80.5° C. |
| 2 | CC-3-V | 31.0 | $n_e$(20° C., 589 nm) = 1.6085 |
| 3 | CC-3-V1 | 3.5 | $\Delta n$(20° C., 589 nm) = 0.1215 |
| 4 | CCP-V-1 | 9.5 | $\varepsilon_\perp$(20° C., 1 kHz) = 4.3 |
| 5 | CCVC-3-V | 3.0 | $\Delta\varepsilon$(20° C., 1 kHz) = 11.5 |
| 6 | PGP-2-2V | 9.5 | $\varepsilon_{av.}$(20° C., 1 kHz) = 8.1 |
| 7 | B-5O-OT | 1.5 | $\varepsilon_\perp/\Delta\varepsilon$ = 0.37 |
| 8 | B-5O-T | 2.0 | $\gamma_1$(20° C.) = 85 mPa · s |
| 9 | YG-4O-F | 3.0 | $k_{11}$(20° C.) = 13.1 pN |
| 10 | CLP-3-T | 2.0 | $k_{33}$(20° C.) = 13.2 pN |
| 11 | DPGU-4-F | 3.0 | $V_0$(20° C.) = 1.12 V |
| 12 | PUQU-3-F | 7.5 | $\gamma_1/k_{11}$ = 6.49 mPa · s pN |
| 13 | CDUQU-3-F | 3.5 | |
| 14 | APUQU-2-F | 4.5 | |
| 15 | APUQU-3-F | 4.5 | |
| 16 | DGUQU-4-F | 4.0 | |
| 17 | PGUQU-3-F | 3.0 | |
| 18 | PGUQU-4-F | 4.0 | |
| Σ | | 100.0 | |

This mixture, mixture M-16, is characterized by a very good transmission in an FFS display and has a very good low temperature stability.

Example 17

The following mixture (M-17) is prepared and investigated.

| Mixture M-17 | | | |
|---|---|---|---|
| Composition | | | |
| Compound | | Concentration | |
| No. | Abbreviation | /% by weight | Physical properties |
| 1 | $PX_0$-3-F | 1.0 | T(N, I) = 80.0° C. |
| 2 | CC-3-V | 29.0 | $n_e$(20° C., 589 nm) = 1.6084 |
| 3 | CC-3-V1 | 4.5 | $\Delta n$(20° C., 589 nm) = 0.1218 |
| 4 | CCP-V-1 | 8.0 | $\varepsilon_\perp$(20° C., 1 kHz) = 4.5 |
| 5 | CCVC-3-V | 2.5 | $\Delta\varepsilon$(20° C., 1 kHz) = 11.4 |
| 6 | PGP-1-2V | 2.0 | $\varepsilon_{av.}$(20° C., 1 kHz) = 8.3 |
| 7 | PGP-2-2V | 8.0 | $\varepsilon_\perp/\Delta\varepsilon$ = 0.39 |
| 8 | B-5O-T | 3.0 | $\gamma_1$(20° C.) = 85 mPa · s |
| 9 | YG-4O-F | 3.5 | $k_{11}$(20° C.) = 13.3 pN |
| 10 | CCP-3-OT | 3.0 | $k_{33}$(20° C.) = 13.2 pN |
| 11 | CLP-3-T | 2.5 | $V_0$(20° C.) = 1.13 V |
| 12 | DPGU-4-F | 2.0 | $\gamma_1/k_{11}$ = 6.39 mPa · s pN |
| 13 | PUQU-3-F | 8.0 | |
| 14 | CDUQU-3-F | 3.0 | |
| 15 | APUQU-2-F | 5.0 | |
| 16 | APUQU-3-F | 5.0 | |
| 17 | DGUQU-4-F | 3.5 | |
| 18 | PGUQU-3-F | 3.0 | |
| 19 | PGUQU-4-F | 3.5 | |
| Σ | | 100.0 | |

This mixture, mixture M-17, is characterized by a very good transmission in an FFS display and has a very good low temperature stability.

Example 18

The following mixture (M-18) is prepared and investigated.

| Mixture M-18 | | | |
|---|---|---|---|
| Composition | | | |
| Compound | | Concentration | |
| No. | Abbreviation | /% by weight | Physical properties |
| 1 | $PX_0$-3-F | 1.5 | T(N, I) = 80.0° C. |
| 2 | CC-3-V | 32.0 | $n_e$(20° C., 589 nm) = 1.6080 |
| 3 | CC-3-V1 | 5.5 | $\Delta n$(20° C., 589 nm) = 0.1213 |
| 4 | CCP-V-1 | 7.5 | $\varepsilon_\perp$(20° C., 1 kHz) = 4.3 |
| 5 | CCVC-3-V | 2.5 | $\Delta\varepsilon$(20° C., 1 kHz) = 11.5 |
| 6 | PGP-1-2V | 2.0 | $\varepsilon_{av.}$(20° C., 1 kHz) = 8.1 |
| 7 | PGP-2-2V | 8.0 | $\varepsilon_\perp/\Delta\varepsilon$ = 0.37 |
| 8 | B-5O-T | 3.0 | $\gamma_1$(20° C.) = 83 mPa · s |
| 9 | YG-4O-F | 3.5 | $k_{11}$(20° C.) = 13.2 pN |
| 10 | CLP-3-T | 2.0 | $k_{33}$(20° C.) = 13.0 pN |
| 11 | DPGU-4-F | 2.5 | $V_0$(20° C.) = 1.13 V |
| 12 | PUQU-3-F | 6.0 | $\gamma_1/k_{11}$ = 6.29 mPa · s pN |
| 13 | CDUQU-3-F | 3.0 | |
| 14 | APUQU-2-F | 5.0 | |
| 15 | APUQU-3-F | 5.0 | |
| 16 | DGUQU-4-F | 4.0 | |
| 17 | PGUQU-3-F | 4.0 | |
| 18 | PGUQU-4-F | 4.5 | |
| Σ | | 100.0 | |

This mixture, mixture M-18, is characterized by a very good transmission in an FFS display and has a very good low temperature stability.

Example 19

The following mixture (M-19) is prepared and investigated.

| Mixture M-19 | | |
|---|---|---|
| Composition | | |
| Compound | Concentration | |
| No. Abbreviation | /% by weight | Physical properties |
| 1 PX$_0$-3-F | 4.0 | T(N, I) = 79.5° C. |
| 2 CC-3-V | 33.5 | n$_e$(20° C., 589 nm) = 1.5877 |
| 3 CC-3-V1 | 9.0 | Δn(20° C., 589 nm) = 0.1040 |
| 4 CC-3-2V1 | 7.0 | ε$_\perp$(20° C., 1 kHz) = 3.7 |
| 5 CCP-V-1 | 4.0 | Δε(20° C., 1 kHz) = 4.7 |
| 6 CLP-V-1 | 8.5 | ε$_{av.}$(20° C., 1 kHz) = 5.3 |
| 7 CCVC-3-V | 3.0 | ε$_\perp$/Δε = 0.79 |
| 8 PGP-2-2V | 6.5 | γ$_1$(20° C.) = 67 mPa · s |
| 9 B-5O-OT | 3.0 | k$_{11}$(20° C.) = 15.1 pN |
| 10 B-5O-T | 3.0 | k$_{33}$(20° C.) = 14.5 pN |
| 11 CLP-3-T | 3.5 | V$_0$(20° C.) = 1.90 V |
| 12 APUQU-2-F | 4.0 | γ$_1$/k$_{11}$ = 4.44 mPa · s pN |
| 13 APUQU-3-F | 5.0 | |
| 14 PGUQU-3-F | 2.5 | |
| 15 PGUQU-4-F | 3.5 | |
| Σ | 100.0 | |

This mixture, mixture M-19, is characterized by a very good transmission in an FFS display and has a very good low temperature stability.

Example 20

The following mixture (M-201 is prepared and investigated.

| Mixture M-20 | | |
|---|---|---|
| Composition | | |
| Compound | Concentration | |
| No. Abbreviation | /% by weight | Physical properties |
| 1 LPX-3-F | 5.0 | T(N, I) = 76.5° C. |
| 2 CC-3-V | 24.0 | |
| 3 CCP-V-1 | 7.5 | |
| 4 CLP-V-1 | 8.5 | |
| 5 CCVC-3-V | 9.5 | |
| 6 B(S)-2O-O4 | 5.0 | |
| 7 B(S)-2O-O5 | 1.5 | |
| 8 B(S)-2O-O6 | 4.0 | |
| 9 Y-4O-O4 | 11.5 | |
| 10 DPGU-4-F | 5.0 | |
| 11 APUQU-2-F | 6.0 | |
| 12 APUQU-3-F | 5.5 | |
| 13 CDUQU-3-F | 4.0 | |
| 14 PGUQU-4-F | 3.0 | |
| Σ | 100.0 | |

This mixture, mixture M-20, is characterized by good properties.

Example 21

The following mixture (M-21) is prepared and investigated.

| Mixture M-21 | | |
|---|---|---|
| Composition | | |
| Compound | Concentration | |
| No. Abbreviation | /% by weight | Physical properties |
| 1 LPX-3-F | 5.0 | T(N, I) = 76.0° C. |
| 2 CC-3-V | 24.0 | |
| 3 CCP-V-1 | 11.0 | |
| 4 CLP-V-1 | 5.0 | |
| 5 CCVC-3-V | 9.5 | |
| 6 B(S)-2O-O4 | 4.0 | |
| 7 B(S)-2O-O5 | 2.0 | |
| 8 B(S)-2O-O6 | 4.0 | |
| 9 Y-4O-O4 | 12.0 | |
| 10 DPGU-4-F | 5.0 | |
| 11 APUQU-2-F | 6.0 | |
| 12 APUQU-3-F | 6.0 | |
| 13 CDUQU-3-F | 1.5 | |
| 14 PGUQU-4-F | 5.0 | |
| Σ | 100.0 | |

This mixture, mixture M-21, is characterized by good properties.

Example 22

The following mixture (M-22) is prepared and investigated.

| Mixture M-22 | | |
|---|---|---|
| Composition | | |
| Compound | Concentration | |
| No. Abbreviation | /% by weight | Physical properties |
| 1 LPX-3-F | 5.0 | |
| 2 CC-3-V | 23.5 | |
| 3 CCP-V-1 | 13.0 | |
| 4 CCVC-3-V | 10.0 | |
| 5 B(S)-2O-O4 | 4.0 | |
| 6 B(S)-2O-O5 | 3.0 | |
| 7 B(S)-2O-O6 | 4.0 | |
| 8 Y-4O-O4 | 11.5 | |
| 9 PGP-2-2V | 2.5 | |
| 10 DPGU-4-F | 5.0 | |
| 11 APUQU-2-F | 6.0 | |
| 12 APUQU-3-F | 6.0 | |
| 13 CDUQU-3-F | 5.0 | |
| 14 PGUQU-4-F | 1.5 | |
| Σ | 100.0 | |

This mixture, mixture M-22, is characterized by good properties.

Example 23

The following mixture (M-23) is prepared and investigated.

Mixture M-23

Composition

| No. | Compound Abbreviation | Concentration /% by weight | Physical properties |
|---|---|---|---|
| 1 | CLX$_0$-3-F | 5.0 | T(N, I) = 77.0° C. |
| 2 | CC-3-V | 24.0 | |
| 3 | CCP-V-1 | 7.5 | |
| 4 | CLP-V-1 | 8.5 | |
| 5 | CCVC-3-V | 9.5 | |
| 6 | B(S)-2O-O4 | 5.0 | |
| 7 | B(S)-2O-O5 | 1.5 | |
| 8 | B(S)-2O-O6 | 4.0 | |
| 9 | Y-4O-O4 | 11.5 | |
| 10 | DPGU-4-F | 5.0 | |
| 11 | APUQU-2-F | 6.0 | |
| 12 | APUQU-3-F | 5.5 | |
| 13 | CDUQU-3-F | 4.0 | |
| 14 | PGUQU-4-F | 3.0 | |
| Σ | | 100.0 | |

This mixture, mixture M-23, is characterized by good properties.

Example 24

The following mixture (M-24) is prepared and investigated.

Mixture M-24

Composition

| No. | Compound Abbreviation | Concentration /% by weight | Physical properties |
|---|---|---|---|
| 1 | CLX$_0$-3-F | 15.0 | T(N, I) = 62.0° C. |
| 2 | CC-3-V1 | 8.0 | |
| 3 | B(S)-5-OT | 8.0 | |
| 4 | CB-3-OT | 17.0 | |
| 5 | GP-5-OT | 10.0 | |
| 6 | CCP-3-OT | 10.0 | |
| 7 | CCQU-3-F | 20.0 | |
| 8 | CCQU-5-F | 12.0 | |
| Σ | | 100.0 | |

This mixture, mixture M-24, is characterized by good properties.

The invention claimed is:

1. A liquid crystalline medium having a nematic phase and a dielectric anisotropy (Δε) of 0.5 or more, comprising:
   one or more compounds selected from formulae X-2-2 and X-2-4

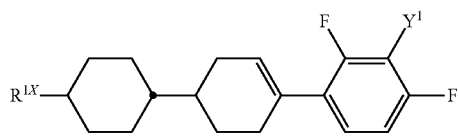

X-2-2

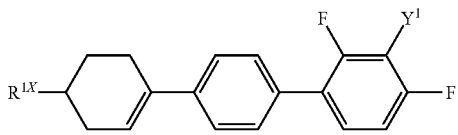

X-2-4 in which
$R^{LX}$ denotes H, an alkyl radical having 1 to 15 C atoms, wherein one or more CH$_2$ groups in these radicals may each be replaced, independently of one another, by —C≡C—, —CF$_2$O—, —OCF$_2$—, —CH=CH—,

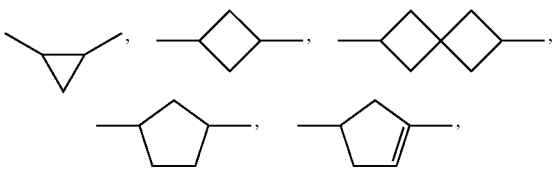

—O—, —CO—O— or —O—CO— in such a way that O atoms are not linked directly to one another, and in which one or more H atoms may each be replaced by halogen, $Y^1$ denotes Cl, CF$_3$, CHF$_2$, OCF$_3$, CN or NCS, and one or more additional compounds.

2. The medium according to claim 1, further comprising one or more compounds of formula B and/or formula S,

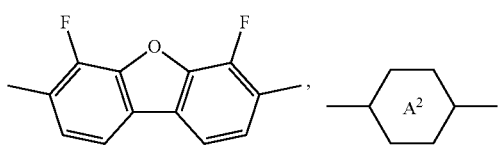

B in which

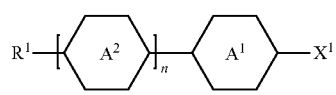

denotes

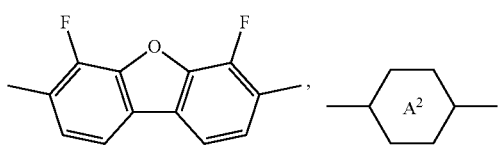

denotes

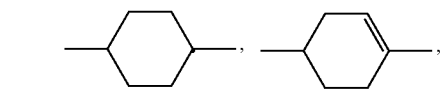

-continued

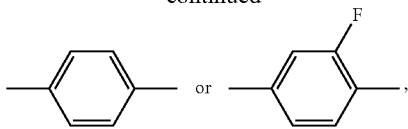

n denotes 1 or 2,
denotes alkyl, alkoxy, fluorinated alkyl, fluorinated alkoxy, alkenyl, alkenyloxy, alkoxyalkyl, or fluorinated alkenyl and $X^1$ denotes F, Cl, fluorinated alkyl, fluorinated alkenyl, fluorinated alkoxy, or fluorinated alkenlyoxy,

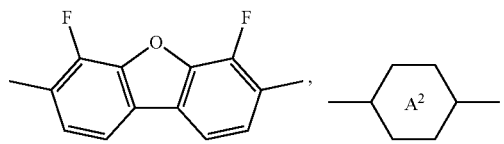

in which

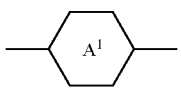

denotes

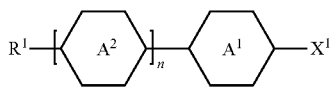

denotes

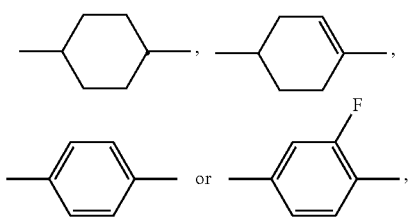

n denotes 1 or 2,
$R^1$ denotes alkyl, alkoxy, fluorinated alkyl, fluorinated alkoxy, alkenyl, alkenyloxy, alkoxyalkyl, or fluorinated alkenyl, and
$X^1$ denotes F, Cl, fluorinated alkyl, fluorinated alkenyl, fluorinated alkoxy, or fluorinated alkenlyoxy.

3. The medium according to claim 1, further comprising one or more compounds of formula I:

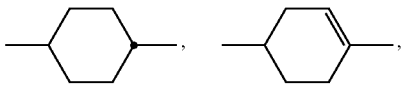

in which

denotes

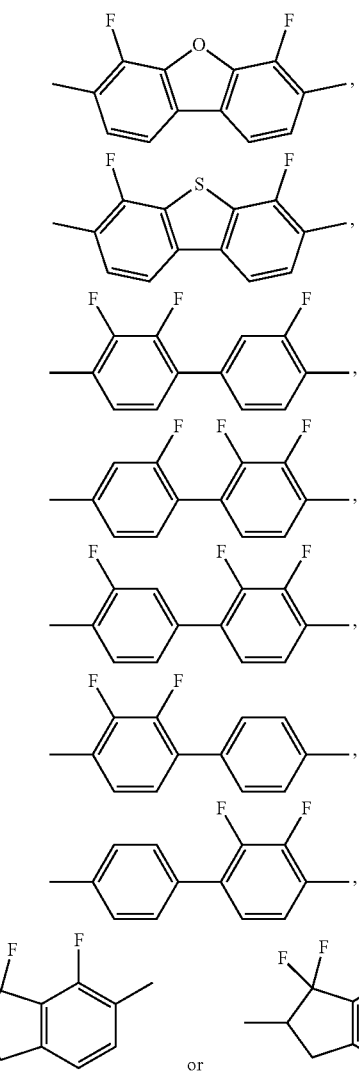

denotes

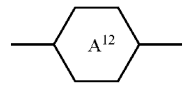

denotes

-continued

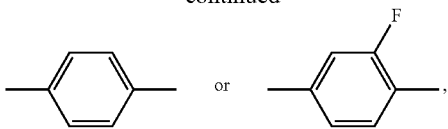

n denotes 0 or 1, $R^{11}$ and $R^{12}$ independently of each other denote alkyl, alkoxy, fluorinated alkyl or fluorinated alkoxy, alkenyl, alkenyloxy, alkoxyalkyl, or fluorinated alkenyl having 2 to 7 C atoms, and $R^{11}$ alternatively denotes $R^1$ and $R^{12}$ alternatively denotes $X^1$, $R^1$ denotes alkyl, alkoxy, fluorinated alkyl, or fluorinated alkoxy, or alkenyl, alkenyloxy, alkoxyalkyl, or fluorinated alkenyl having 2 to 7 C atoms, and $X^1$ denotes F, Cl, fluorinated alkyl, fluorinated alkenyl, fluorinated alkoxy, or fluorinated alkenyloxy.

4. The medium according to claim 1, further comprising one or more compounds selected from the group of compounds of formulae II and III

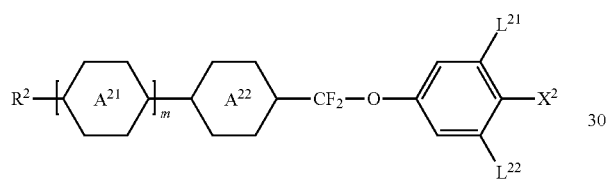 II

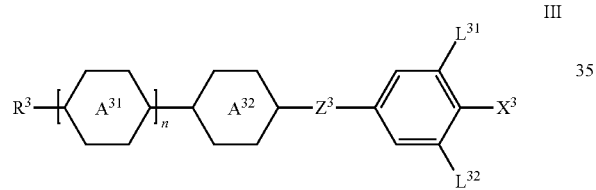 III in which $R^2$ denotes alkyl, alkoxy, fluorinated alkyl or fluorinated alkoxy having 1 to 7 C atoms, or alkenyl, alkenyloxy, alkoxyalkyl, or fluorinated alkenyl having 2 to 7 C atoms,

on each appearance, independently of one another, denote

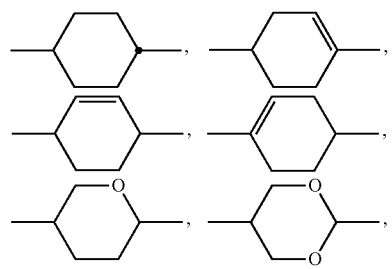

-continued

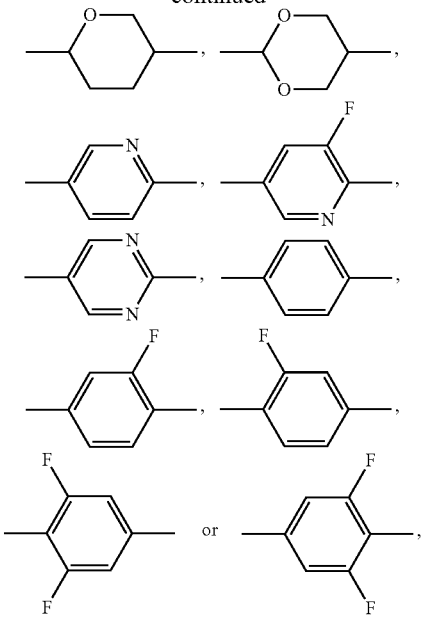

$L^{21}$ and $L^{22}$ denote H or F, $X^2$ denotes halogen, halogenated alkyl or alkoxy having 1 to 3 C atoms, or halogenated alkenyl or alkenyloxy having 2 or 3 C atoms, m denotes 0, 1, 2 or 3, $R^3$ denotes alkyl, alkoxy, fluorinated alkyl or fluorinated alkoxy having 1 to 7 C atoms, alkenyl, alkenyloxy, alkoxyalkyl, or fluorinated alkenyl having 2 to 7 C atoms,

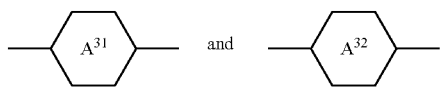

on each appearance, independently of one another, are

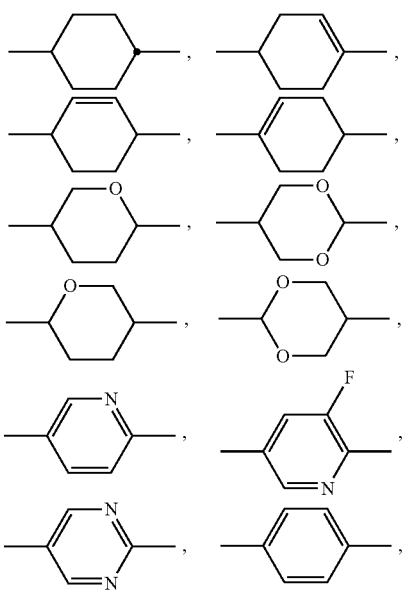

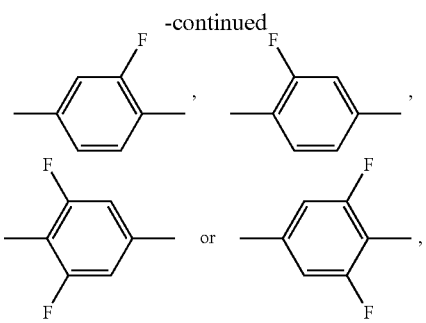

$L^{31}$ and $L^{32}$, independently of one another, denote H or F,
$X^3$ denotes halogen, halogenated alkyl or alkoxy having 1 to 3 C atoms, or halogenated alkenyl or alkenyloxy having 2 or 3 C atoms, F, Cl, —OCF$_3$, —OCHF$_2$, —O—CH$_2$CF$_3$, —O—CH=CF$_2$, —O—CH=CH$_2$, or —CF$_3$,
$Z^3$ denotes —CH$_2$CH$_2$—, —CF$_2$CF$_2$—, —COO—, trans-CH=CH—, trans-CF=CF—, —CH$_2$O— or a single bond, and
n denotes 0, 1, 2 or 3.

5. The liquid-crystalline medium according to claim 1, further comprising one or more dielectrically neutral compounds selected from the group of formulae IV and V:

IV

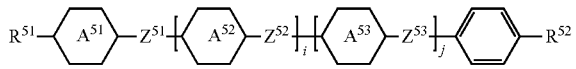

V in which
$R^{41}$ and $R^{42}$, independently of one another, denote alkyl, alkoxy, fluorinated alkyl, or fluorinated alkoxy having 1 to 7 C atoms, or alkenyl, alkenyloxy, alkoxyalkyl, or fluorinated alkenyl having 2 to 7 C atoms,

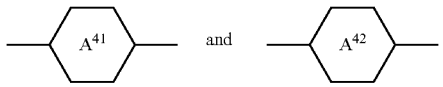

independently of one another and, if

occurs twice,
also these independently of one another, denote

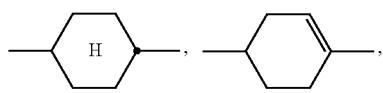

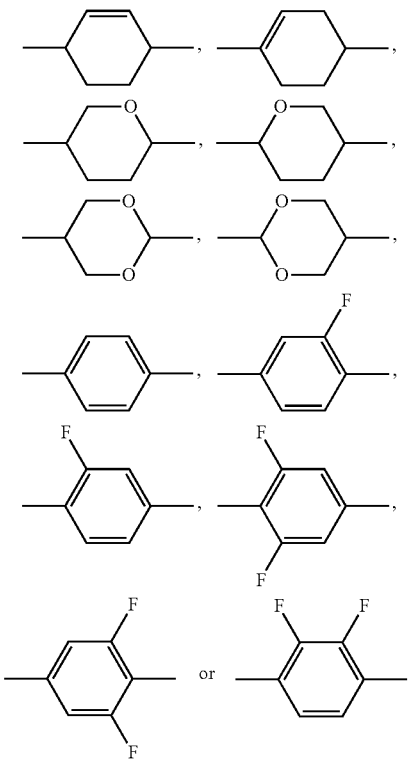

$Z^{41}$ and $Z^{42}$, independently of one another and, if $Z^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, p denotes 0, 1 or 2, $R^{51}$ and $R^{52}$, independently of one another, denote alkyl, alkoxy, fluorinated alkyl, or fluorinated alkoxy having 1 to 7 C atoms, or alkenyl, alkenyloxy, alkoxyalkyl, or fluorinated alkenyl having 2 to 7 atoms,

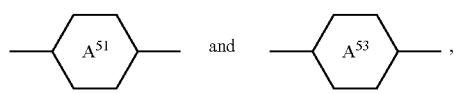

if present, each, independently of one another, denote

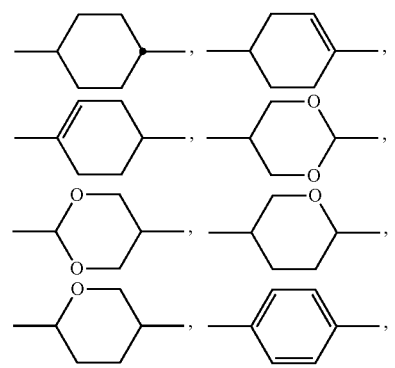

-continued

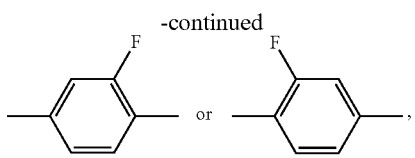

$Z^{51}$ to $Z^{53}$ each, independently of one another, denote —CH$_2$—CH$_2$—, —CH$_2$—O—, —CH=CH—, —C≡C, —COO— or a single bond, and i and j each, independently of one another, denote 0 or 1.

6. The liquid-crystalline medium according to claim 5, further comprising one or more compounds selected from the group of formulae VI to IX:

VI

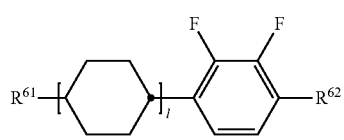

VII

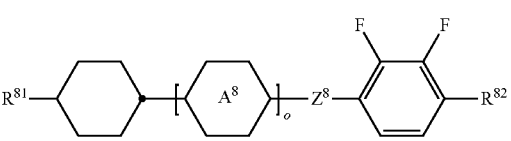

VIII

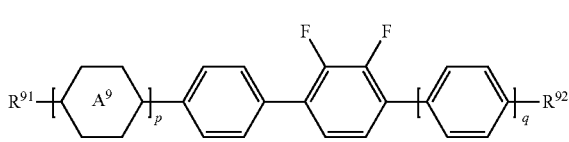

IX

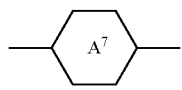

wherein
- $R^{61}$ denotes an unsubstituted alkyl radical having 1 to 7 C atoms, an unsubstituted alkenyl radical having 2 to 7 C atoms, an unsubstituted alkoxy radical having 1 to 6 C atoms, or an unsubstituted alkenyloxy radical having 2 to 6 C atoms,
- $R^{62}$ denotes an unsubstituted alkyl radical having 1 to 7 C atoms, an unsubstituted alkoxy radical having 1 to 6 C atoms, or an unsubstituted alkenyloxy radical having 2 to 6 C atoms, and
- l denotes 0 or 1,
- $R^{71}$ denotes an unsubstituted alkyl radical having 1 to 7 C atoms, or an unsubstituted alkenyl radical having 2 to 7 C atoms,
- $R^{72}$ denotes an unsubstituted alkyl radical having 1 to 7 C atoms, an unsubstituted alkoxy radical having 1 to 6 C atoms, or an unsubstituted alkenyloxy radical having 2 to 6 C atoms, denotes

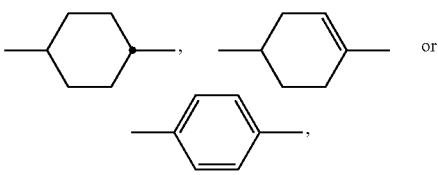

- $R^{81}$ denotes an unsubstituted alkyl radical having 1 to 7 C atoms, or an unsubstituted alkenyl radical having 2 to 7 C atoms,
- $R^{82}$ denotes an unsubstituted alkyl radical having 1 to 7 C atoms, an unsubstituted alkoxy radical having 1 to 6 C atoms, or an unsubstituted alkenyloxy radical having 2 to 6 C atoms,

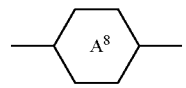

denotes

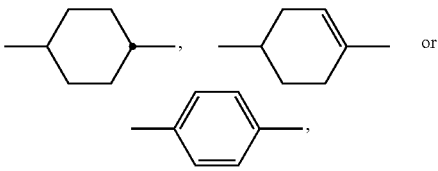

- $Z^8$ denotes —(C=O)—O—, —CH$_2$—O—, —CF$_2$—O— or —CH$_2$—CH$_2$—,
- o denotes 0 or 1,
- $R^{91}$ and $R^{92}$ independently of one another, denotes an unsubstituted alkyl radical having 1 to 7 C atoms, an unsubstituted alkoxy radical having 1 to 6 C atoms, or an unsubstituted alkenyloxy radical having 2 to 6 C atoms,

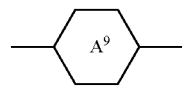

denotes

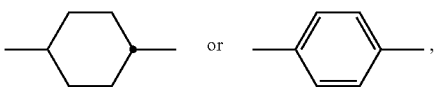

and
p and q independently of each other denote 0 or 1.

7. The medium according claim 2, wherein the total concentration of the compounds of formula B in the medium as a whole is 1% or more to 60% or less.

8. The medium according to claim 1, further comprising one or more chiral compounds and/or stabilizers.

9. An electro-optical display or electro-optical component, comprising a liquid-crystalline medium according to claim 1.

10. The display according to claim 9, wherein the display is based on the IPS- or FFS mode.

11. The display according to claim 9, wherein the display contains an active-matrix addressing device.

12. An electro-optical display or electro-optical component comprising a liquid-crystalline medium according to claim 2.

13. A process for preparation of a liquid-crystalline medium according to claim 1, comprising mixing one or more compounds selected from formulae X-2-2 and X-2-4 with said one or more additional compounds, wherein said one or more additional compounds are mesogenic compounds, and optionally one or more additives.

14. A compound selected from formulae X-2-2 and X-2-4

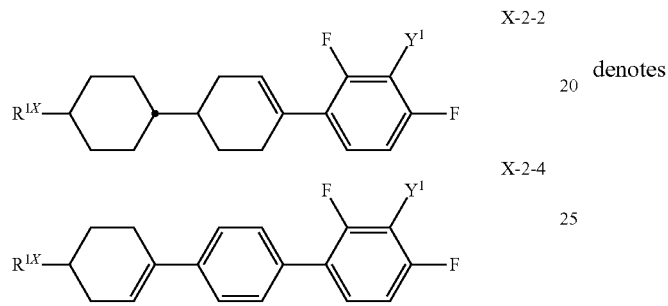

wherein
$R^{1X}$ denotes H, an alkyl radical having 1 to 15 C atoms, wherein one or more $CH_2$ groups in these radicals may each be replaced, independently of one another, by —C≡C—, —$CF_2$O—, —O$CF_2$—, —CH=CH—,

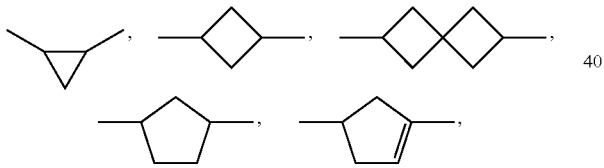

—O—, —CO—O— or —O—CO— in such a way that O atoms are not linked directly to one another, and in which one or more H atoms may each be replaced by halogen, and
$Y^1$ denotes Cl, $CF_3$, $CHF_2$, $OCF_3$, CN or NCS.

15. A process for the preparation of a compound of formula X according to claim 14, said process comprising:
reacting a building block 1-Hal-2-$Y^2$-3-$Y^1$-4-X-phenyl with a ketone by a metal-mediated coupling reaction to give the respective tertiary alcohol, and
subsequently dehydrating the tertiary alcohol to the corresponding stryrene derivative; or
reacting building block 1-Hal-2-$Y^2$-3-$Y^1$-4-X-phenyl with an aromatic boronic acid to give the corresponding biphenyl derivative,
wherein
Hal is halogen,
$X_2$ denotes H, F, Cl, $CF_3$ or $CHF_2$, and
C is F, Cl, CN, NCS, $SF_5$, fluorinated alkyl having 1 to 5 C atoms, alkoxy having 1 to 5 C atoms, alkenyl having 2 to 5 C atoms, or alkenyloxy having 2 to 5 C atoms.

16. The medium according to claim 2, further comprising one or more compounds of formula I:

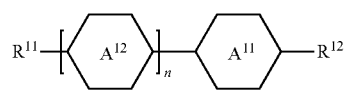

in which

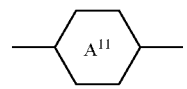

denotes

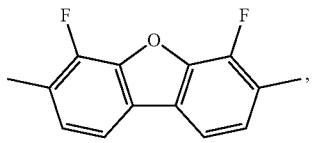

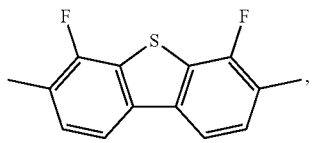

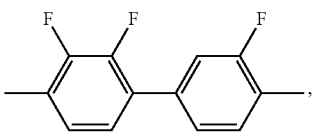

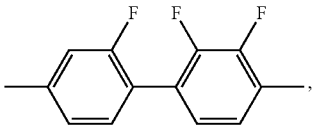

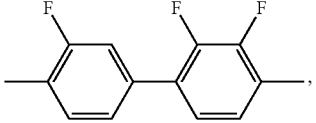

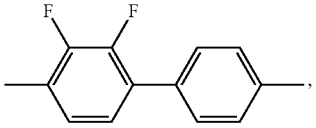

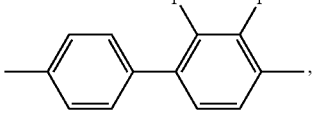

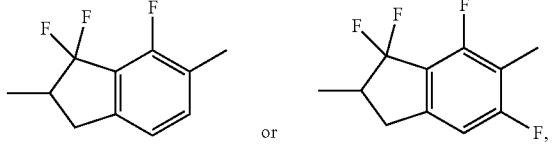

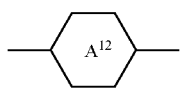

denotes

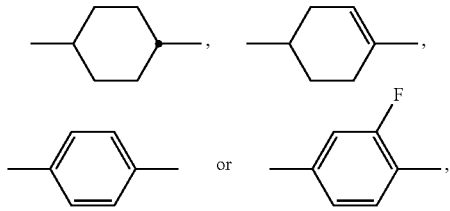

n denotes 0 or 1, $R^{11}$ and $R^{12}$ independently of each other denote alkyl, alkoxy, fluorinated alkyl or fluorinated alkoxy, alkenyl, alkenyloxy, alkoxyalkyl, or fluorinated alkenyl having 2 to 7 C atoms, and $R^{11}$ alternatively denotes $R^1$ and $R^{12}$ alternatively denotes $X^1$, $R^1$ denotes alkyl, alkoxy, fluorinated alkyl, or fluorinated alkoxy, or alkenyl, alkenyloxy, alkoxyalkyl, or fluorinated alkenyl having 2 to 7 C atoms, and $X^1$ denotes F, Cl, fluorinated alkyl, fluorinated alkenyl, fluorinated alkoxy, or fluorinated alkenyloxy, from which the compounds of formula B are excluded.

17. A liquid crystalline medium having a nematic phase and a dielectric anisotropy ($\Delta\epsilon$) of 0.5 or more, comprising:
one or more compounds of formula X

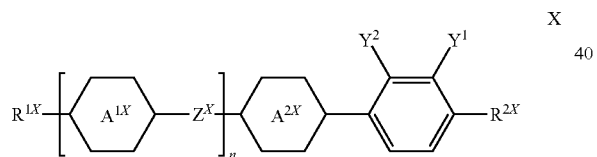

in which
n denotes 0, 1 or 2, $R^{1X}$ and $R^{2X}$ independently of each other denote H, an alkyl radical having 1 to 15 C atoms, wherein one or more $CH_2$ groups in these radicals may each be replaced, independently of one another, by —C≡C—, —$CF_2$O—, —O$CF_2$—, —CH=CH—,

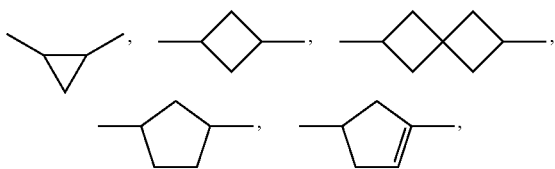

O—, —CO—O— or —O—CO— in such a way that O atoms are not linked directly to one another, and in which one or more H atoms may each be replaced by halogen, and $R^{2X}$ alternatively denotes $X^X$,

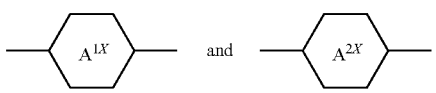

on each occurrence, identically or differently, denotes a radical selected from the following groups:
a) the group consisting of trans-1,4-cyclohexylene, 1,4-cyclo-hexenylene, and decaline-2,6-diyl, in which one or more non-adjacent $CH_2$ groups may each be replaced by —O— or —S— and in which one or more H atoms may each be replaced by F,
b) the group consisting of 1,4-phenylene and 2,6-naphthylene, in which one or two CH groups may each be replaced by N and in which, in addition, one or more H atoms may each be replaced by L,
c) the group consisting of 1,3-dioxane-2,5-diyl, tetrahydrofuran-2,5-diyl, cyclobutane-1,3-diyl, thiophene-2,5-diyl, selenophene-2,5-diyl, and 1,2,3,4-tetrahydronanaphthaline-2,6-diyl, each of which may be mono- or polysubstituted by L,
d) the group consisting of bicyclo[1.1.1]pentane-1,3-diyl, bicyclo[2.2.2]octane-1,4-diyl, and spiro[3.3]heptane-2,6-diyl, in which one or more H atoms may each be replaced by F, L each, identically or differently, denote halogen, cyano, alkyl, alkoxy, alkylcarbonyl or alkoxycarbonyl group with 1 to 7 C atoms, wherein one or more H atoms may each be substituted by F or Cl, $Z^X$ on each occurrence, identically or differently, denotes a single bond, —$CF_2$O—, —O$CF_2$—, —$CH_2CH_2$—, —$CF_2CF_2$—, —C(O)O—, —OC(O)—, —$CH_2$O—, —O$CH_2$—, —CF=CH—, —CH=CF—, —CF=CF—, —CH=CH— or —C≡C—, $Y^1$ denotes Cl, $CF_3$, $CHF_2$, $OCF_3$, CN or NCS,
$Y^2$ denotes H, F, Cl, $CF_3$ or $CHF_2$, and
$X^X$ denotes F, Cl, CN, NCS, $SF_5$, fluorinated alkyl having 1 to 5 C atoms, alkoxy having 1 to 5 C atoms, alkenyl having 2 to 5 C atoms, or alkenyloxy having 2 to 5 C atoms,
and
one or more compounds of formula B and/or formula S,

B

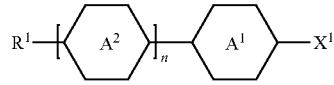

in which

denotes

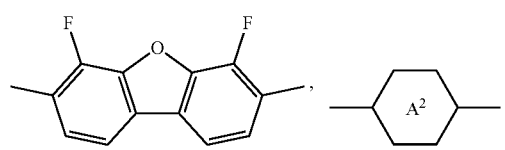

denotes

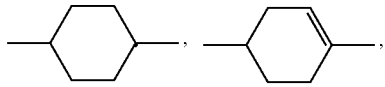

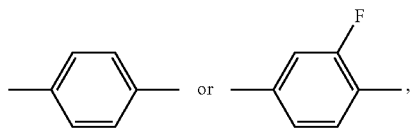

n denotes 1 or 2,

R¹ denotes alkyl, alkoxy, fluorinated alkyl, fluorinated alkoxy, alkenyl, alkenyloxy, alkoxyalkyl, or fluorinated alkenyl and X¹ denotes F, Cl, fluorinated alkyl, fluorinated alkenyl, fluorinated alkoxy, or fluorinated alkenlyoxy,

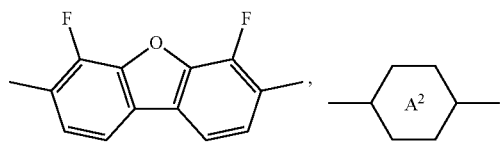

in which

denotes

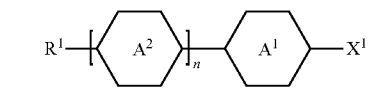

denotes

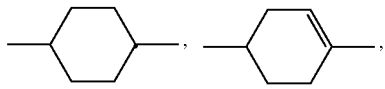

-continued

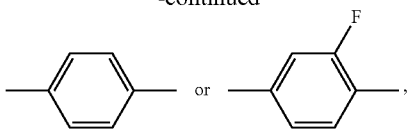

n denotes 1 or 2,

R¹ denotes alkyl, alkoxy, fluorinated alkyl, fluorinated alkoxy, alkenyl, alkenyloxy, alkoxyalkyl, or fluorinated alkenyl, and X¹ denotes F, Cl, fluorinated alkyl, fluorinated alkenyl, fluorinated alkoxy, or fluorinated alkenlyoxy.

18. The medium according to claim 3, wherein $R^1$ denotes alkyl having 1 to 7 C atoms or alkenyl having 2 to 7 C atoms.

19. The medium according to claim 6, wherein $R^{82}$ denotes an unsubstituted alkyl radical having 2 to 5 C atoms, an unsubstituted alkoxy radical having 1, 2, 3 or 4 C atoms or an unsubstituted alkenyloxy radical having 2, 3 or 4 C atoms.

20. The medium according to claim 1, wherein the one or more compound of formulae X-2-2 and X-2-4 are selected from one or more of the following:

CLX-n-F
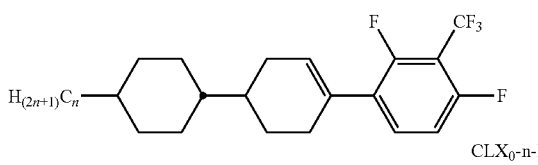

CLX₀-n-F
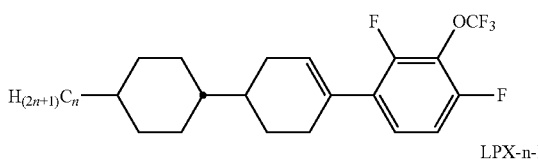

LPX-n-F
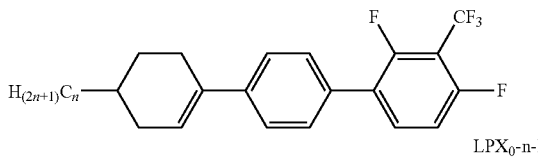

LPX₀-n-F
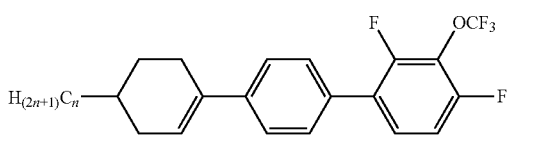

in which
n denotes an integer from 1 to 9.

* * * * *